US012801180B2

(12) United States Patent
Kim

(10) Patent No.: US 12,801,180 B2
(45) **Date of Patent: *Nov. 17, 2026**

(54) PORTABLE DISPLAY DEVICE

(71) Applicant: Folding All Inc., Seoul (KR)

(72) Inventor: Si-Han Kim, Gwangju-si (KR)

(73) Assignee: Folding All Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/285,392

(22) Filed: Jul. 30, 2025

(65) Prior Publication Data

US 2025/0355467 A1 Nov. 20, 2025

Related U.S. Application Data

(63) Continuation of application No. 18/775,213, filed on Jul. 17, 2024, now Pat. No. 12,399,533, which is a continuation of application No. 18/121,531, filed on Mar. 14, 2023, now Pat. No. 12,072,737, which is a continuation of application No. 17/362,847, filed on Jun. 29, 2021, now Pat. No. 11,640,186, which is a continuation of application No. 14/557,338, filed on Dec. 1, 2014, now abandoned, which is a (Continued)

(30) Foreign Application Priority Data

Jul. 9, 2010 (KR) ........................ 10-2010-0066332

(51) Int. Cl.
*G06F 1/16* (2006.01)

(52) U.S. Cl.
CPC .......... *G06F 1/1641* (2013.01); *G06F 1/1618* (2013.01); *G06F 1/1624* (2013.01); *G06F 1/1643* (2013.01); *G06F 1/1698* (2013.01)

(58) Field of Classification Search
CPC .... G06F 1/1698; G06F 1/1618; G06F 1/1641; G02F 1/13336
USPC .......................................................... 345/1.3
See application file for complete search history.

(56) References Cited

U.S. PATENT DOCUMENTS

| | | | | |
|---|---|---|---|---|
| 7,515,406 | B2 | 4/2009 | Kee et al. | 361/679.21 |
| 8,457,564 | B2 * | 6/2013 | Champion | G06F 1/1666 345/169 |

(Continued)

FOREIGN PATENT DOCUMENTS

| | | | |
|---|---|---|---|
| KR | 20-0387225 | Y1 | 6/2005 |
| KR | 10-2007-0097180 | A | 10/2007 |

(Continued)

OTHER PUBLICATIONS

International Search Report dated Dec. 19, 2011, issued to corresponding International Application No. PCT/KR2011/002980.

*Primary Examiner* — Calvin C Ma
(74) *Attorney, Agent, or Firm* — Stein IP, LLC

(57) ABSTRACT

A portable display device is provided in which two display panels are joined to each other to form a single screen when two panel housings are unfolded from a folded state. The portable display device includes at least two panel housings and display panels that are mounted on the panel housings, respectively. When the panel housings are unfolded, the display panels are joined to each other to form a single screen. The distance between the display panels when the display panels are contiguous to each other is less than 3 mm and the distance between input units or between input sensors is less than 3 mm.

10 Claims, 76 Drawing Sheets

Related U.S. Application Data continuation-in-part of application No. 13/809,355, filed as application No. PCT/KR2011/002980 on Apr. 25, 2011, now abandoned.

(56) References Cited

U.S. PATENT DOCUMENTS

| | | | | |
|---|---|---|---|---|
| 8,804,317 | B2 | 8/2014 | Watanabe | 361/679.06 |
| 8,804,324 | B2 | 8/2014 | Bohn | 361/679.55 |
| 12,399,533 | B2 * | 8/2025 | Kim | G06F 1/1641 |
| 2003/0026068 | A1 * | 2/2003 | Tsai | G06F 1/1616 361/679.04 |
| 2005/0231494 | A1 | 10/2005 | Kumada | 345/204 |
| 2008/0074345 | A1 * | 3/2008 | Lee | H10K 59/18 345/1.3 |
| 2008/0079656 | A1 | 4/2008 | Kee et al. | 345/1.3 |
| 2009/0002586 | A1 | 1/2009 | Kimura | 349/39 |
| 2009/0185763 | A1 | 7/2009 | Park et al. | 382/311 |
| 2010/0079355 | A1 | 4/2010 | Kilpatrick et al. | 345/1.3 |
| 2013/0187833 | A1 | 7/2013 | Kim | 345/1.3 |

FOREIGN PATENT DOCUMENTS

| | | |
|---|---|---|
| KR | 10-2008-0027715 A | 3/2008 |
| KR | 10-2009-0106944 A | 10/2009 |

* cited by examiner (A)

(B)

(A)

(B)

PORTABLE DISPLAY DEVICE

CROSS-REFERENCE TO RELATED APPLICATIONS

This application is a continuation of U.S. application Ser. No. 18/775,213, filed Jul. 17, 2024, which is a continuation of U.S. application Ser. No. 18/121,531, filed Mar. 14, 2023, now issued as U.S. Pat. No. 12,072,737 on Aug. 27, 2024, which is a continuation of U.S. application Ser. No. 17/362,847, filed Jun. 29, 2021, now issued as U.S. Pat. No. 11,640,186 on May 2, 2023, which is a continuation of U.S. application Ser. No. 14/557,338, filed Dec. 1, 2014, which is a continuation-in-part of U.S. application Ser. No. 13/809,355, filed Apr. 12, 2013, which is a national stage of International Application No. PCT/KR2011/002980, filed Apr. 25, 2011, which claims the benefit of priority to Korean Application No. 10-2010-0066332, filed Jul. 9, 2010 in the Korean Intellectual Property Office. All disclosures of the documents named above are incorporated herein by reference.

BACKGROUND OF THE INVENTION

Field of the Invention

The present invention relates to a structure for using two display panels as a single screen, and more particularly, to a structure for allowing panel housings to be unfolded from a folded state and strongly mounting display panels and input units on the panel housings.

Description of the Related Art

In order to enlarge a screen of a portable display device, two display panels can be joined to each other to form a single screen. Various flat display panels such as an LCD, an OLED, an FED, a PDP, and an electronic paper can be used for this purpose. This principle can be applied to any flat panel display device.

The portable display device includes plural panel housings that can be folded and unfolded and plural display panels mounted on the panel housings, respectively, and has a structure in which the display panels are contiguous to each other when the display panels are unfolded.

The area of a joint which is a non-display area formed between the display panels can be minimized by effectively designing sides of the display panels. That is, the joint is minimized by disposing the display panels, one side of which is effectively designed, to be contiguous to each other.

However, a strong shaft structure is required for effectively folding and unfolding the display panels of the portable display device and thus there is a need for a structure design for the strong shaft structure. The portable display device needs to further include an optical member for minimizing the joint and an input unit to be mounted thereon.

SUMMARY OF THE INVENTION

Technical Problem

An object of the invention is to provide a portable display device in which two display panels are joined to serve as a single screen when panel housings are unfolded, and a structure and a design of display panels and input units.

Solution to the Problem

According to an aspect of the invention, a portable display device may comprise at least two panel housings and at least two display panels, wherein at least one display panel is mounted on each of the panel housings, wherein the display panels are joined to each other to serve as a single screen, and wherein, when the display panels are contiguous to each other, the distance between the display panels is less than 3 mm and the distance between input units or between input sensors is less than 3 mm.

In the portable display device, the panel housing may be capable of being folded and unfolded, and the panel housings may be unfolded from a folded state. The portable display device may further include a terminal capable of performing a near field communication.

Advantageous Effects of the Invention

According to an aspect of the invention, it is possible to provide a portable display device in which two display panels are joined to serve as a single screen when panel housings are unfolded, and to further provide a structure in which input units or optical members can be reliably mounted on panel housings.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
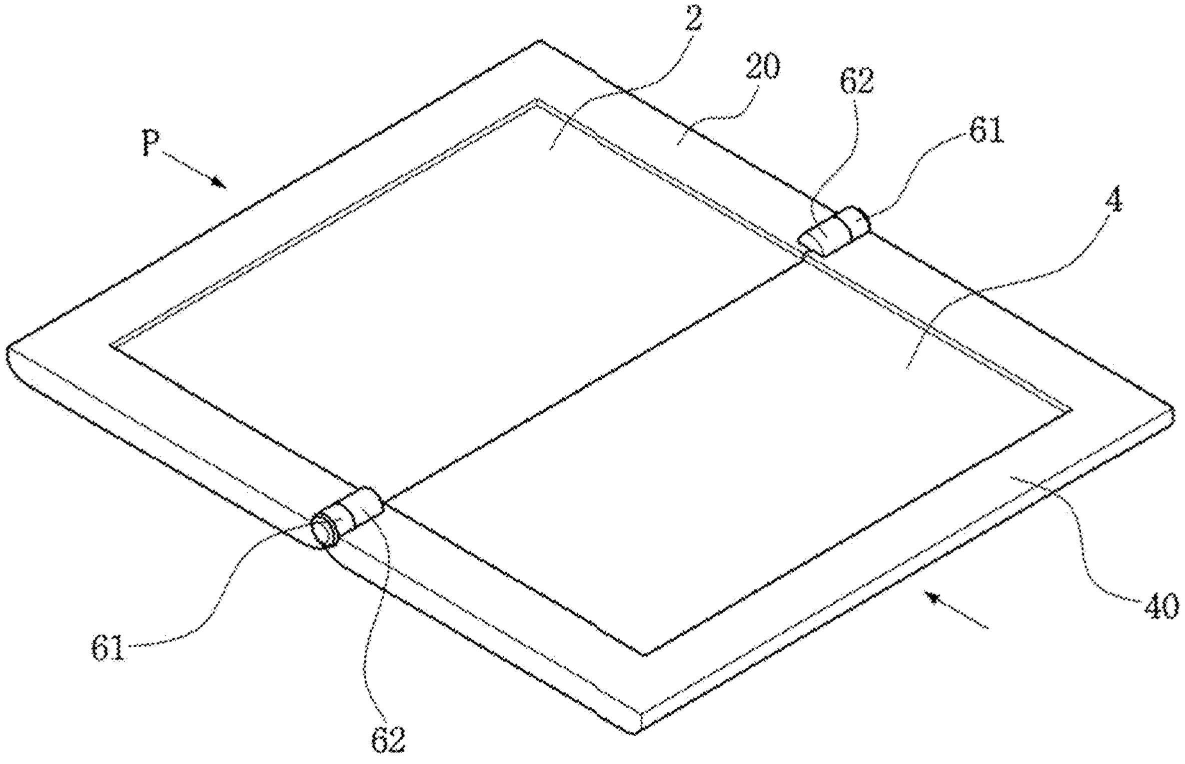
FIGS. 1 and 2 are diagrams illustrating a foldable type portable display device according to an embodiment of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the invention provide a portable display device in which at least two flat display panels are joined to each other to form a single screen. Possible flat display panels include but are not limited to an LCD, an OLED, an FED, a PDP, and an electronic paper. The principle of the invention can be applied to any display panel as long as it has a flat panel shape.

The following embodiments should not be viewed as limiting the scope of the invention, but merely as examples thereof.

Embodiment 1

Figure 2:
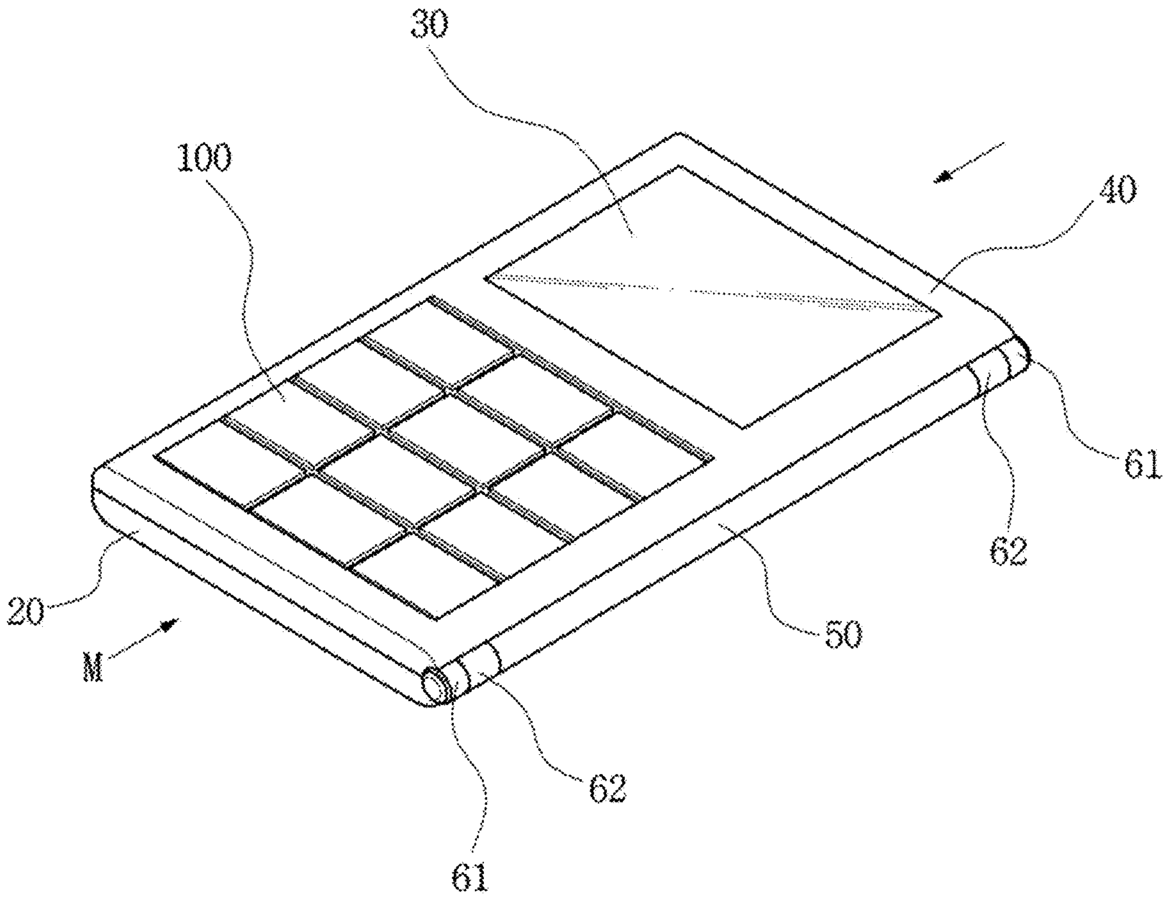

FIGS. 1 and 2 are diagrams illustrating a foldable type portable display device according to an embodiment of the invention.

According to the embodiment of FIG. 1, a foldable type portable display device includes two display panels 2 and 4 and two panel housings 20 and 40 on which the display panels are mounted, respectively. The panel housings 20 and 40 include circuits or components used to drive or mount the display panels.

The two panel housings 20 and 40 are joined to each other with connection shafts 61 and 62 so as to be foldable and unfoldable. The connection shafts employ a general shaft, and a hinge type may be used.

Additionally, according to the embodiment of FIG. 2, an auxiliary display panel 30 may be mounted on an outer surface when the display device is folded. The auxiliary display panel 30 may also be protected with a protective window.

A button type key input unit 100 for inputting characters or numerals is further disposed on the outer surface.

A side cover 50 is disposed on the side surface of the panel housings 20 and 40 which are folded. The side cover 50 covers the side surface of the display panels when the panel housings are folded. The side cover 50 also protects the side surface of an input unit when the input unit is mounted on the panel housings.

The side cover 50 is effective when protection means 14 for protecting the side surfaces of the display panels (to be depicted in later figures) is formed thinly.

FIGS. 3 to 9 are diagrams illustrating an input unit and a display panel according to various embodiments of the invention.

Figure 3:
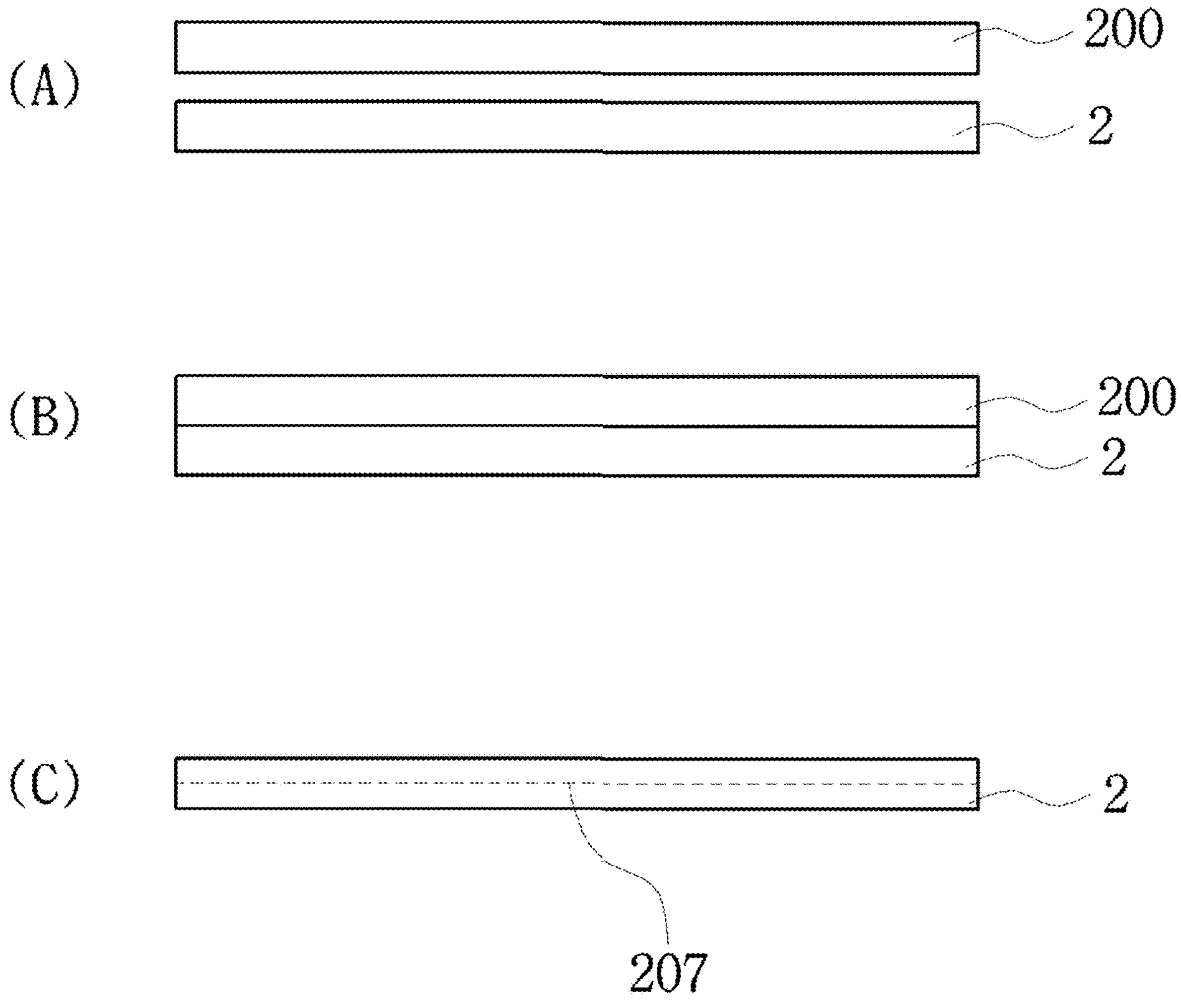
FIGS. 3 to 9 are diagrams illustrating an input unit and a display panel according to various embodiments of the invention.

Display devices can be classified into at least three types: an out-cell type in which an input unit 200 and a display panel 2 are separated from each other with a fixed gap interposed therebetween as shown in embodiment (A) of FIG. 3, an on-cell type in which the input unit 200 is located directly on the top of the display panel 2 as shown in embodiment (B) of FIG. 3, and an in-cell type in which a micro sensor 207 is inserted into the display panel 2 as shown in embodiment (C) of FIG. 3. Other configurations may also be possible without departing from the scope of the invention.

Figure 4:
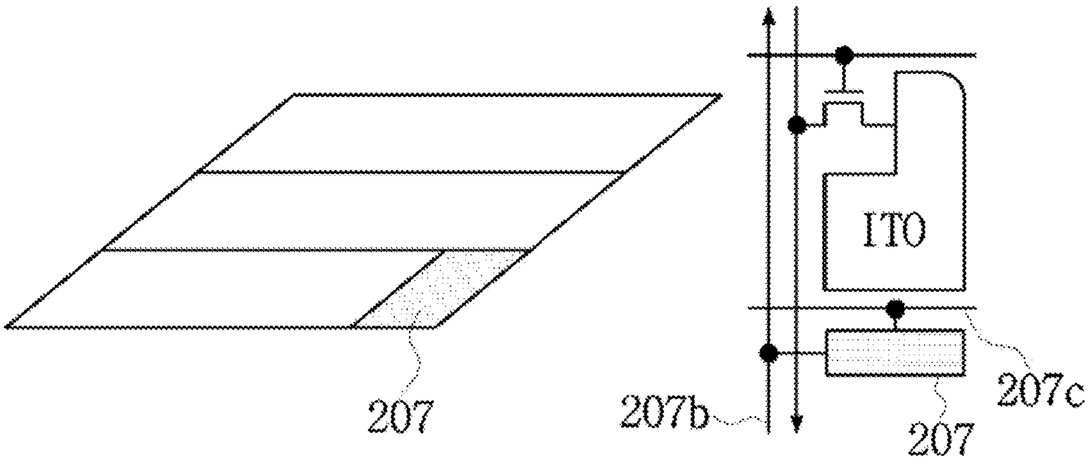
Figure 4:
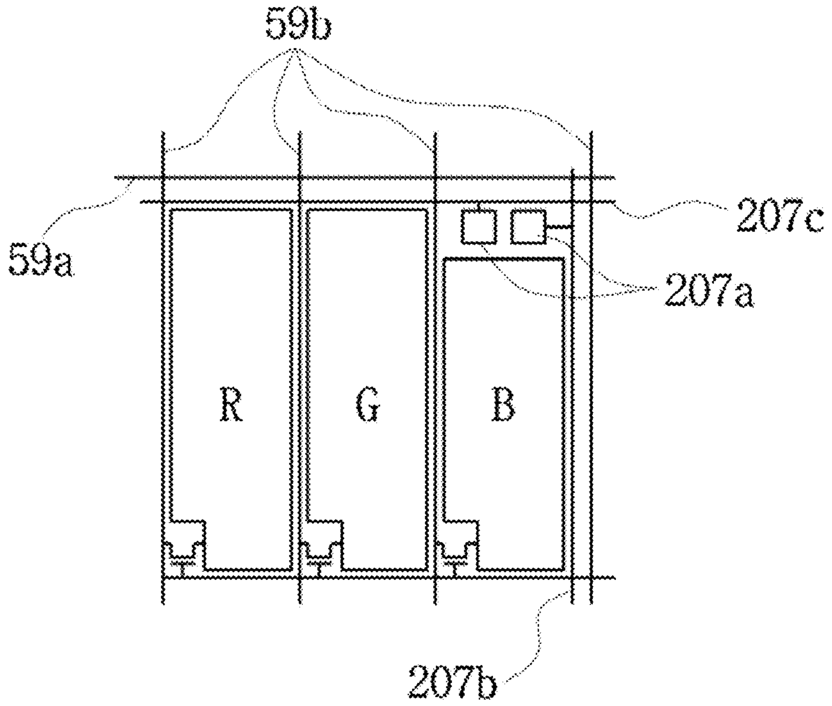

FIG. 4 is a diagram illustrating an in-cell type embodiment, where a pixel of the display panel 2 is shown. The pixel includes three sub pixels of R (Red), G (Green), and B (Blue). A TFT (Thin Film Transistor) along with a sensor is disposed in a part of the pixel.

(A) of FIG. 4 is a diagram illustrating an embodiment where a micro optical sensor 207 is built in the pixel. That is, the pixel includes the TFT and the micro optical sensor 207.

The optical sensor 207 is connected to an X line **207*b* and a Y line 207*c*, and thus the coordinates of a sensor sensing light in the display panels 2 and 4** can be acquired.

(B) of FIG. 4 is a diagram illustrating an embodiment where a sensor of a micro switch **207*a* type is built in a pixel. When a pressure is applied to a substrate of the display panel 2, the micro switch 207*a*** of the portion to which the pressure is applied is turned on.

Similarly to the optical sensor 207, the micro switch **207*a* is also connected to an X line 207*b* and a Y line 207*c*, and thus the coordinates of a sensor sensing pressure in the display panels 2 and 4** can be acquired.

In these embodiments of the invention, since a micro sensor is disposed in each pixel of the display panels, a set of the micro sensors disposed in a first display panel is referred to as a first input sensor and a set of the micro sensors disposed in a second display panel is referred to as a second input sensor. The first input sensor has a fixed area and the second input sensor also has a fixed area.

Figure 5:
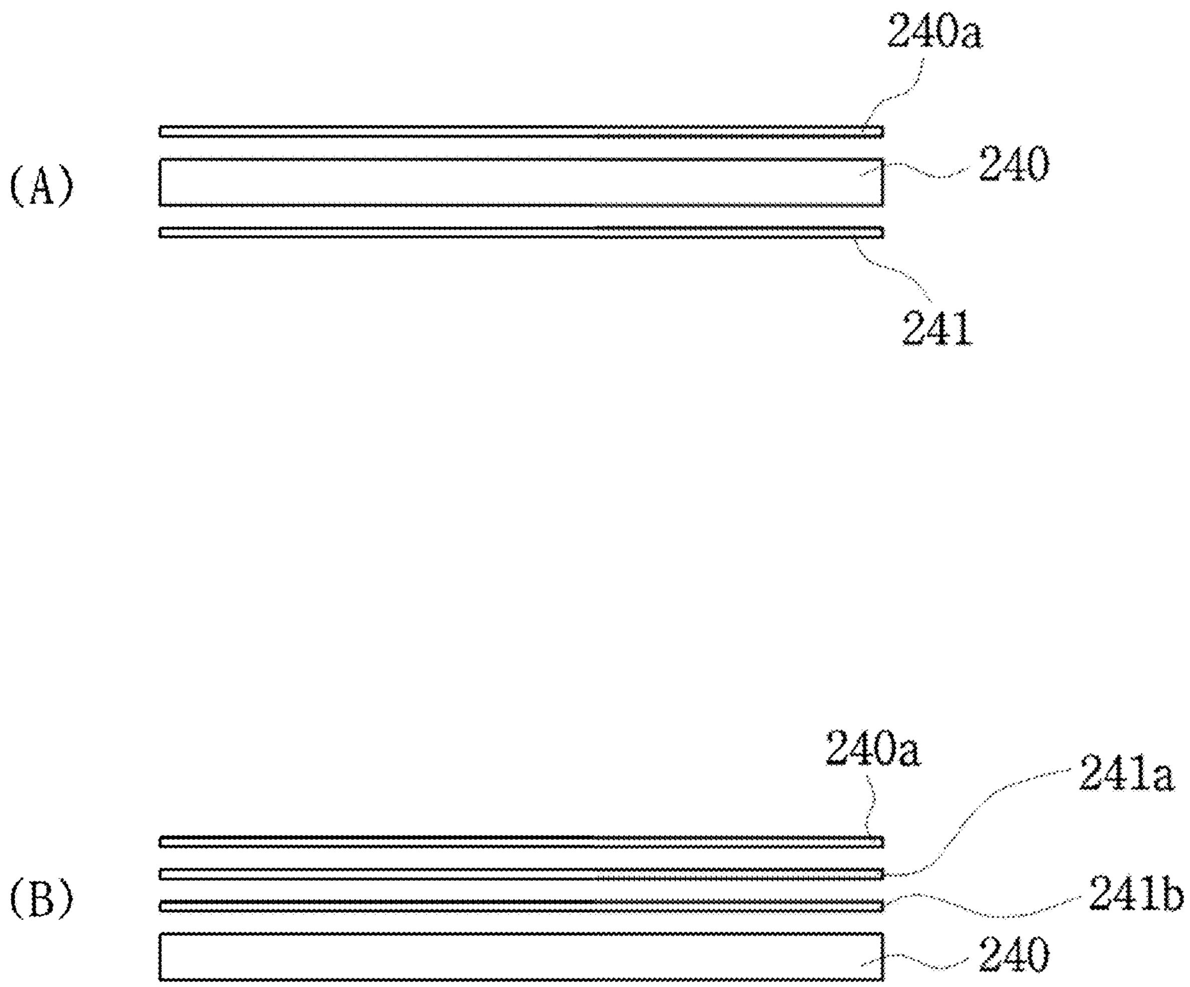

FIG. 5 is a cross-sectional view schematically illustrating embodiments of an input unit, where (A) of FIG. 5 shows a capacitance type and (B) of FIG. 5 shows a resistive film type.

According to embodiment (A) of FIG. 5, an electrode plate 241 coated with a transparent electrode is disposed below a protective plate 240, and the electrode plate 241 includes one or two films coated with a transparent electrode.

According to embodiment (B) of FIG. 5, two films 241*a* and 241*b* coated with a transparent electrode are disposed above the protective plate 240 with a fixed gap held therebetween.

A protective film (or a decoration plate) 240*a* may be further disposed on the top of the input unit. The protective film 240*a* is coated with a desired pattern.

Figure 6:
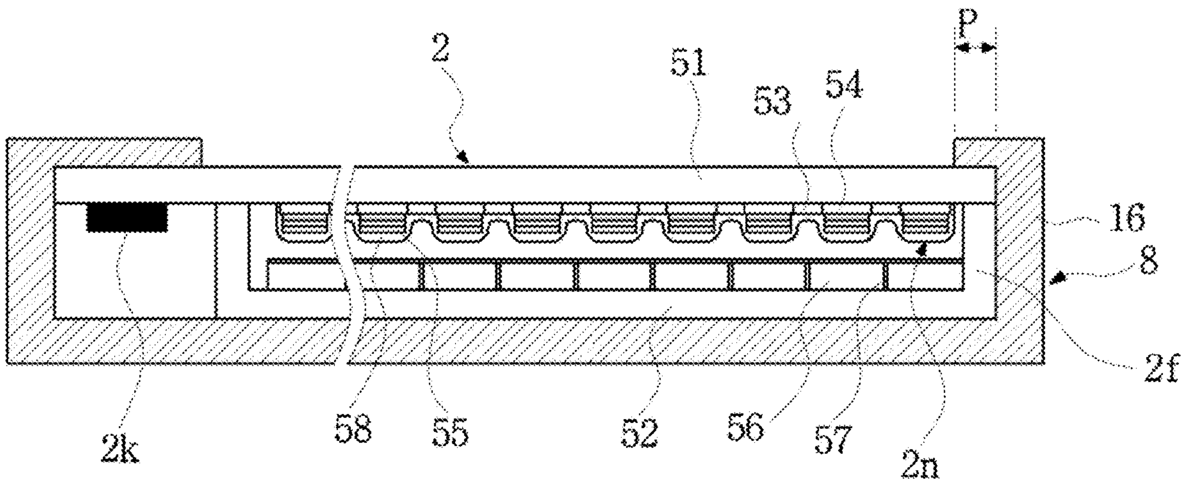

FIG. 6 is a cross-section illustrating a display panel according to an embodiment of the invention, where pixel electrodes are located closer to the joint 8. That is, an active area which is a display area is located closer to the joint.

The portable display device according to the embodiment of FIG. 6 is an OLED type, and a cross-section thereof is shown. However, similar principles, including the distance between the boundary of the display panel and a closest pixel 2*n* in the joint 8 can be applied to all flat panel display devices.

In the embodiment of FIG. 6, each of the display panels 2 and 4 includes an insulating layer 53, electrodes 54, a coating electrode 58, and an organic multi-layered film 53 on a substrate 51, and may further include a moisture-absorbing layer 56 into which separation films 57 are inserted.

The substrate 51 is covered with a cover substrate 52. A partition wall 2*f* may be formed of a sealant such as an adhesive, and the partition wall may be formed through different processes or may be formed of the substrates 51 and 52.

When the display panel 2 is mounted on the chassis 16, the chassis 16 may cover only the side surface of the display panel in the joint or may cover only an upper part P of the display panel corresponding to a non-display area.

As already noted, this structure of the joint is not limited only to the OLED type, but can be applied to all types of flat panel display devices.

Figure 7:
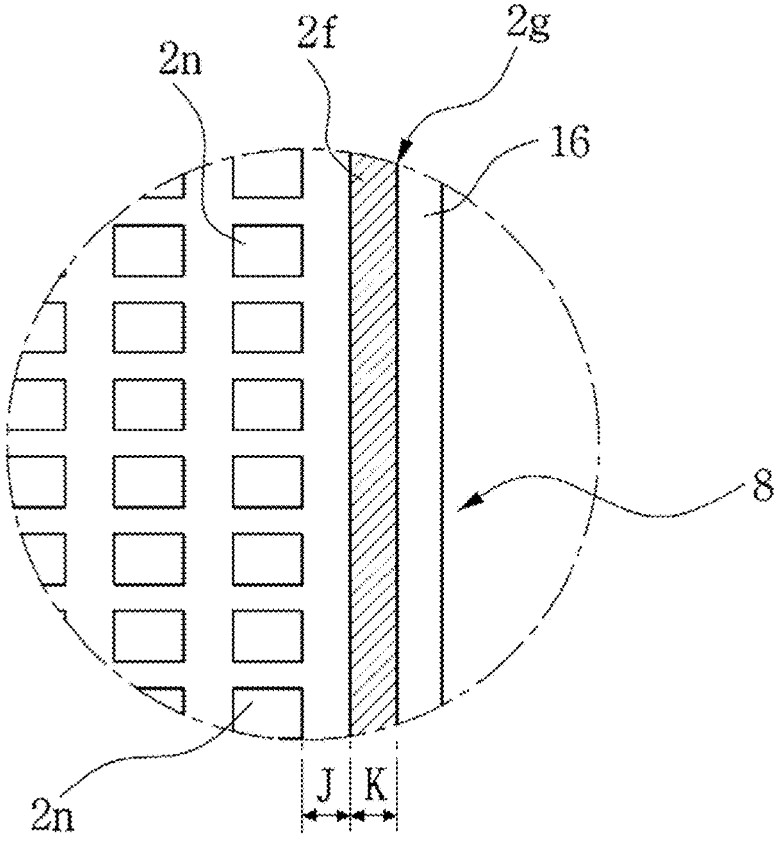

FIG. 7 is an enlarged view of a joint 8 and surroundings according to one embodiment of a display panel. The display panels 2 and 4 should be designed to reduce the joint (non-display area).

When a pixel 2*n* closest to the joint 8 is considered as shown in FIG. 7, the distance J between the closest pixel 2*n* and the partition wall 2*f* is set to be less than 1 mm. The value of J may be 0 mm.

The thickness K of the partition wall 2*f* is set to be in a range of 0.01 mm to 1 mm. The distance between the pixel 2*n* closest to the joint and the boundary 2*g* of each display panel 2 or 4 is set to 2 mm or less.

The partition wall 2*f* generally indicates the boundary edge portion between the inside and the outside of each display panel 2 or 4.

The display panels 2 and 4 and relevant components (including but not limited to a backlight unit or driving circuit components) are mounted on the chassis 16. The chassis is formed of metal such as aluminum or alloy or plastic material.

The width of the chassis 16 in the joint 8 is set to a range of 0.01 mm to 1 mm.

The boundary 2*g* of the display panel and the boundary of the partition wall 2*f* do not have to be matched with each other, and the partition wall 2*f* may be disposed within 0.5 mm from the boundary 2*g*.

That is, the width of the non-display area of the joint 8 in this embodiment of the invention is the total sum of the value of J, the value of K, and the thickness of the chassis 16. The maximum of this value is 3.0 mm, 6 mm when two display panels are joined to each other.

The chassis 16 in the joint 8 may be opened.

Figure 8:
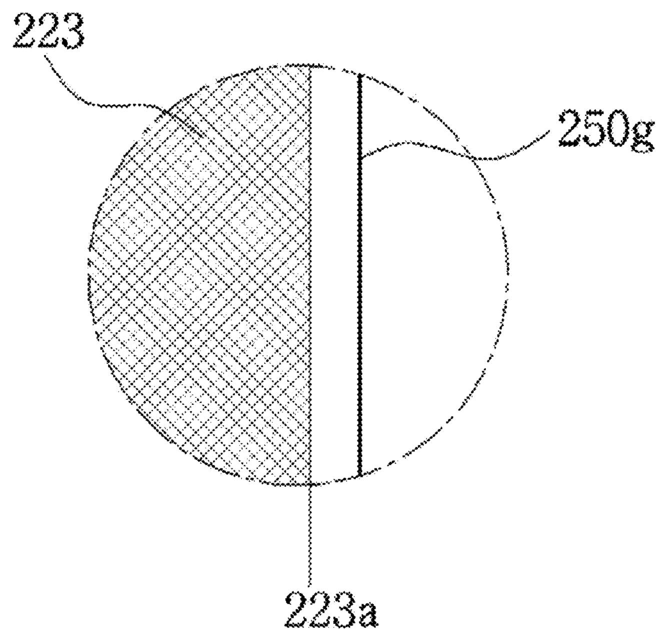

FIG. 8 is an enlarged view of a joint of an input unit of a capacitance type embodiment. According to the embodiment of FIG. 8, the distance between the boundary 223*a* of an active area 223 which is an input area and the boundary 250*g* of the input unit is set to less than 3 mm and may be set to less than 2 mm.

Figure 9:
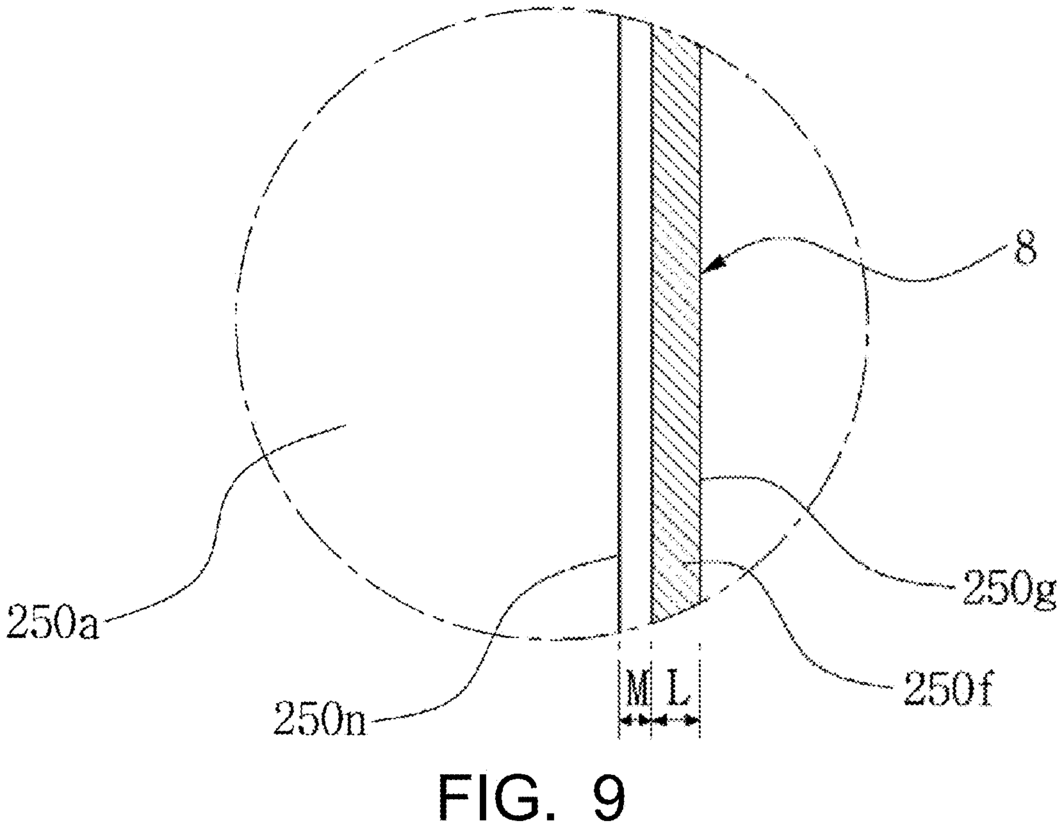

FIG. 9 is an enlarged view of a joint of an input unit of a resistive film type embodiment.

According to the embodiment of FIG. 9, the gap M between the bus 250*n* and the partition wall 250*f* in the joint 8 is set to be less than 1 mm, and the thickness L of the partition wall 250*f* is set to a range of 0.01 mm to 1 mm. The gap M may be 0 mm.

The partition wall is used to couple conductor films or other plates in the input units to each other.

The distance between an electrode line 250*n* and the boundary 250*g* of the input unit 200 (or 400) is set to be less than 2 mm. Alternatively, the distance between the boundary of the active area 250*a* and the boundary 250*g* of the input unit 200 (or 400) is set to be less than 2 mm (or less than 2 mm).

The boundary 250*g* of the joint 8 and the boundary of the partition wall 250*f* do not have to be matched with each other, and the partition wall 250*f* may be disposed within 0.5 mm from the boundary 250*g*.

In the embodiment of FIG. 9, the input unit 200 or 400 is formed of a flat plate of plastic or glass, and can comprise all types of input units receiving information through the flat plate.

Figure 10:
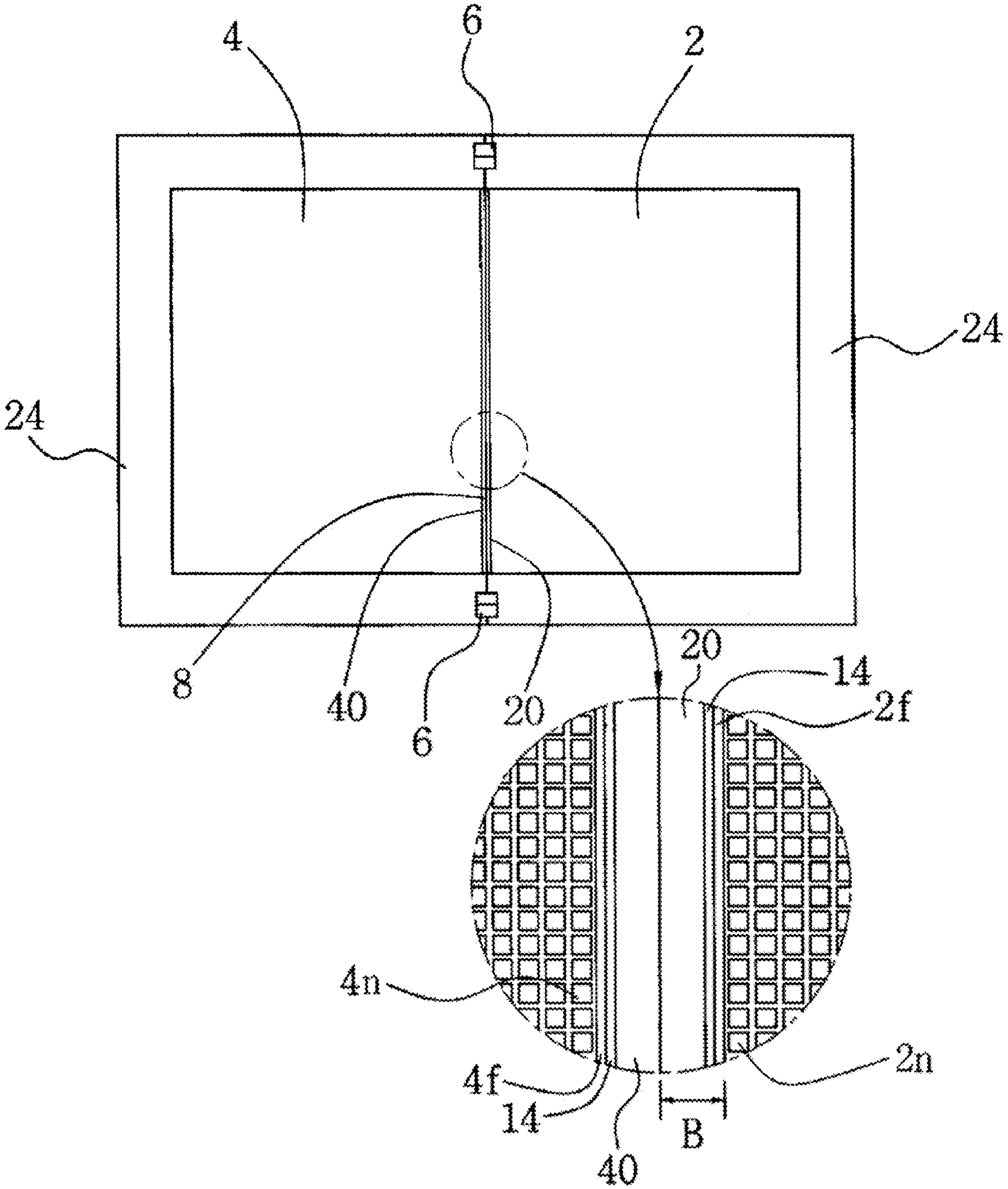
FIG. 10 is a diagram specifically illustrating a boundary of display panels according to an embodiment of the invention.

FIG. 10 is a diagram illustrating the boundary between the display panels, according to an embodiment of the invention. Details are shown in the enlarged circle.

According to the embodiment of FIG. 10, the non-display area in the joint 8 includes the side walls of the panel housings 20 and 40, protective films 14 and 16 (where the side walls of the chasses or members may be used instead of the protective films), and the partition walls 2*f* and 4*f*. The non-display area for display panel 2 is represented by B in the drawing and the entire non-display area doubles the area of B.

In another embodiment (not depicted), the side walls of the panel housings 20 and 40 may be removed leaving only the protective film 14.

The thickness of the protective film 14 is generally set to be less than or equal to 0.5 mm though it may be set to be less than or equal to 1 mm in some cases.

The thickness of the partition wall is generally set to be less than or equal to 1 mm, preferably to be less than or equal to 0.5 mm, and more preferably to be less than or equal to 0.3 mm.

The distance between the partition walls 2*f* or 4*f* and the closest pixels 2*n* or 4*n* is set to a range of 0.1 mm to 0.3 mm.

In the joint 8, the display panel may be in close contact with the side wall of the panel housing or the distance between the display panel and the side wall of the panel housing may be set to be less than 1 mm.

In this embodiment of the invention, the distance between the display panels 2 and 4 and the distance between the input units 200 and 400 are minimized. A structure in which a micro sensor is built in each pixel of the display panels 2 and 4, instead of using the input units 200 and 400, may also be employed. That is, in the case of an embodiment with an in-cell type input unit, the distance between the micro sensors in the joint 8 can be minimized.

A sensing area for sensing an input in the input units or the input sensors can be considered.

Therefore, when an area in the first display panel 2 is defined as a first sensing area and an area in the second display panel 4 is defined as a second sensing area, the distance between the first sensing area and the second sensing area in the joint 8 is not greater than the width of the non-display area. An error therebetween may be less than 1 mm.

Embodiment 2

Figure 11:
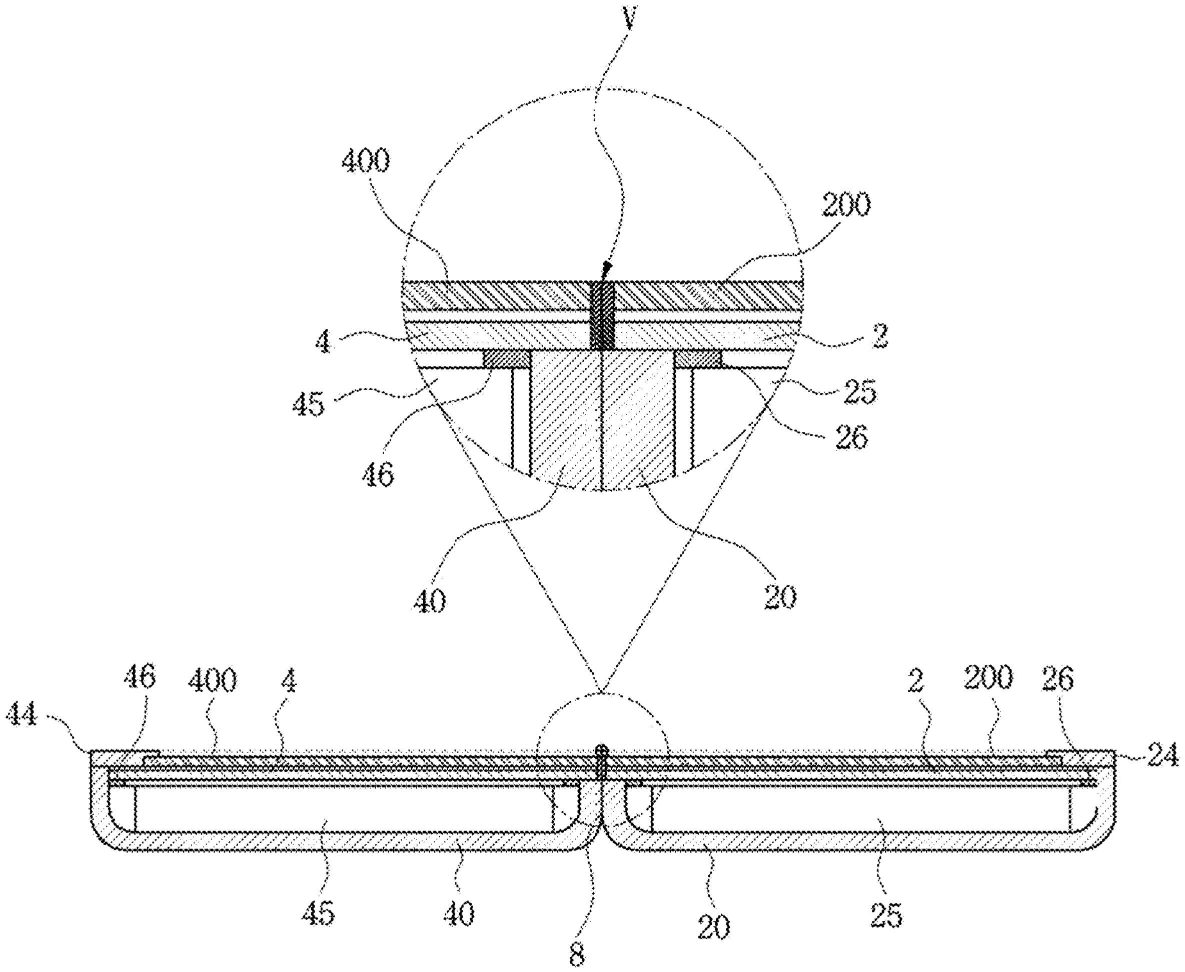
FIGS. 11 and 12 are diagrams illustrating a structure on which display panels, input units, or optical members are arranged according to two possible embodiments of the invention.
Figure 12:
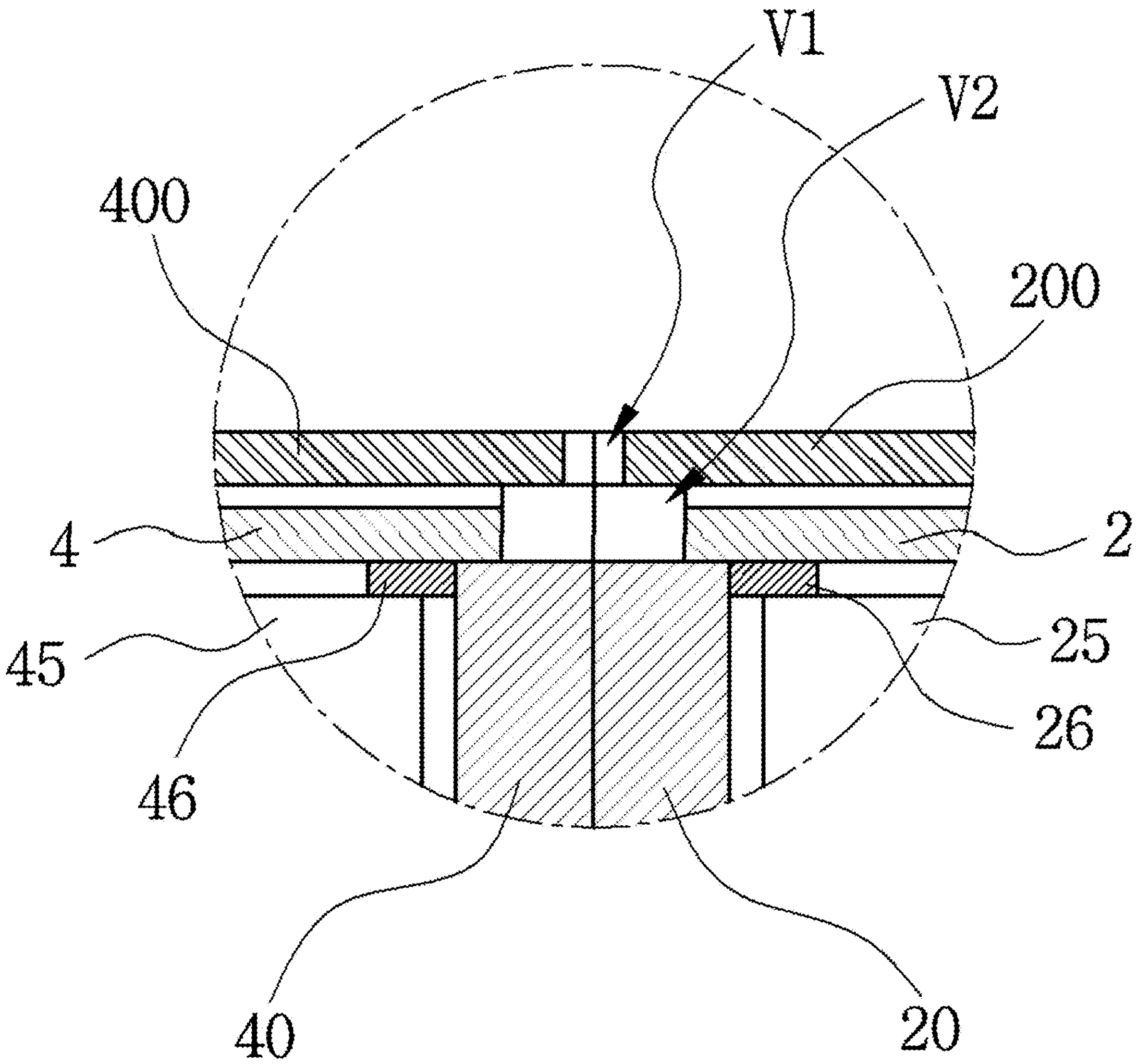

FIGS. 11 and 12 are diagrams illustrating a structure in which display panels and input units or optical members are arranged, according to two possible embodiments of the invention.

The optical members in the embodiments of FIGS. 11 and 12 are optical plates having a function of reducing a non-display area in the boundary portion between two display panels. A lens, a micro lens, a micro prism, or any other structure which refracts light can be used as an optical member. That is, any means for shifting an optical path of light to the boundary of the display panels can be used as optical members.

FIG. 11 is a diagram illustrating an embodiment where the distance between the display panels and the distance between the input units are equal to each other.

According to the embodiment of FIG. 11, a part defined as “V” is disposed between the display panels 2 and 4 or between the input units 200 and 400. This part “V” may be protective member such as a film, which protects the side surfaces of the display panels and the side surfaces of the input units.

Alternatively, the part “V” may have a thickness similar to that of the side walls 20 and 40 of the panel housings, and may form a body along with the side walls of the panel housings. The thickness of the part “V” is set to be less than 1.5 mm.

When the part “V” is a protective film, the protective film may be formed of metal or resin. When the protective film is formed of resin, the resin film is coated with metal or inorganic material. In this case, the thickness of the part “V” as the protective film is preferably set to a range of 0.005 mm to 0.5 mm. When the protective film is formed of metal, the thickness is preferably set to a range of 0.2 mm to 1.5 mm, On the other hand, the protective film may be a coating film formed on the side surfaces of the display panels or on the side surfaces of the input units. In this case, the thickness thereof may be set to be less than several tens of micro meters.

The distance between the part “V” and the display panels may be set to 0 mm or may be set to about 1.5 mm.

Therefore, when the thickness of the part “V” is 1.5 mm and the panel housings are unfolded, the distance between the display panels and the distance between the input units are 3 mm. However, even when the thickness of the part “V” does not reach 1.5 mm, the distance between the display panels and the distance between the input units may be 3 mm. In this case, there is a gap between the part “V” and the display panels and there is a gap between the part “V” and the input units.

FIG. 12 is a diagram illustrating an embodiment where the distance between the input units is smaller than the distance between the display panels.

When a part disposed between the input units 200 and 400 is defined as “V1” and a part disposed between the display panels 2 and 4 is defined as “V2”, the thickness of the part “V1” is smaller than the thickness of the part “V2”.

The parts “V1” and “V2” may form a body along with the side walls of the joint of the panel housings 20 and 40.

Alternatively, only the part “V2” may form a body along with the side wall of the joint of the panel housings 20 and 40, and the part “V1” may form a separate protective film or protection means. When the part “V1” is a protective film or protection means, the protection means or the protective film described in the embodiment of FIG. 11 is employed.

As yet another alternative, the parts “V1” and “V2” may both form protection means separated from the panel housings.

The maximum thickness of the part “V2” is set to be less than 1.5 mm, and the thickness of the part “V1” may be set even smaller. That is, when the distance between the display panels 2 and 4 is less than 3 mm, the distance between the input units 200 and 400 may be smaller than the distance between the display panels.

The thickness of the part “V1” may be 0 mm. That is, when the panel housings are unfolded, the input units 200 and 400 may come in contact with each other. Since the input units 200 and 400 may include a protective plate 240 (see FIG. 5), this structure can be embodied by forming the protective plate out of reinforced glass or crystal.

Embodiment 3

Figure 13:
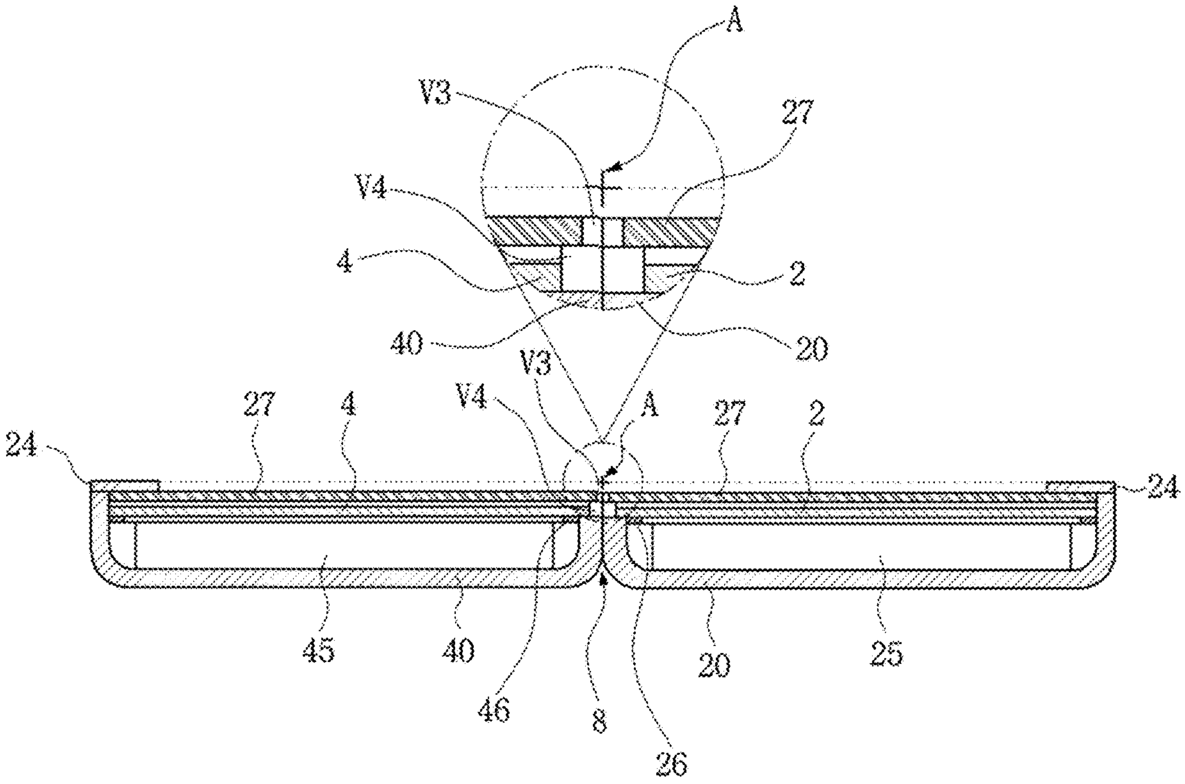
FIGS. 13 and 14 are diagrams illustrating an embodiment of the invention where optical members are provided.
Figure 14:
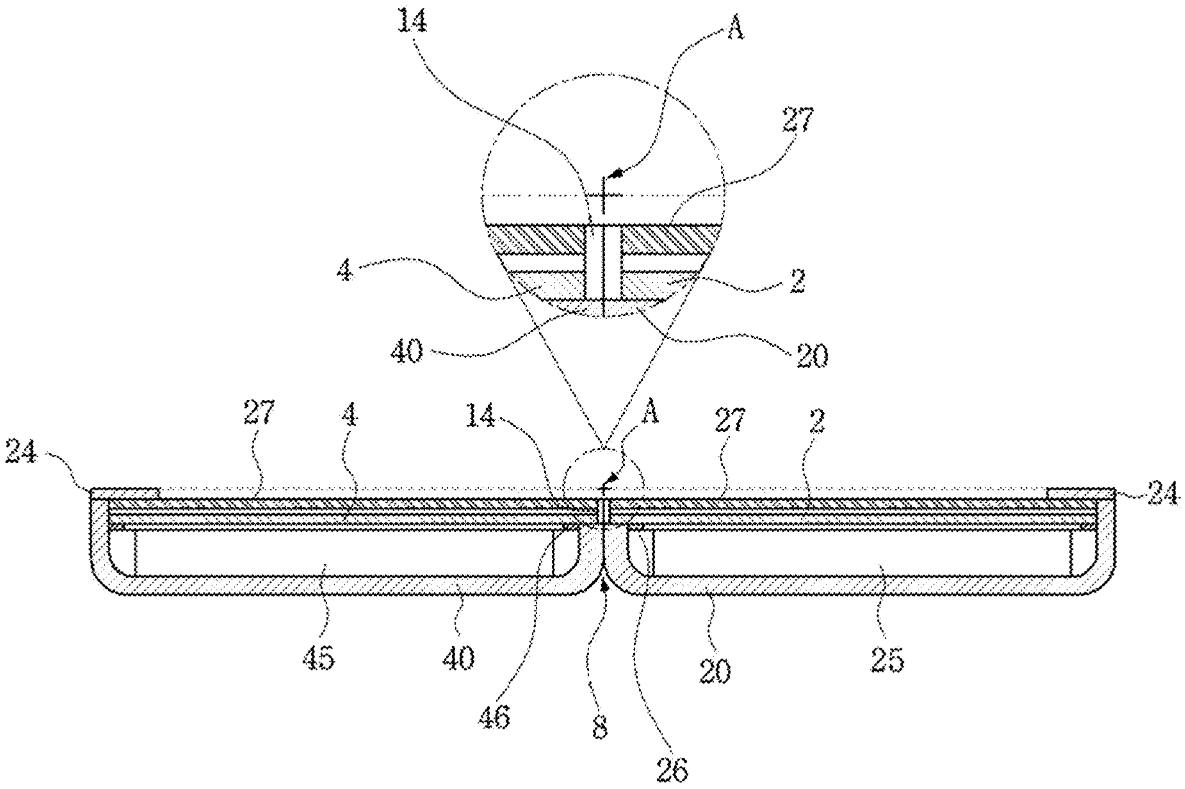

FIGS. 13 and 14 show an embodiment where an optical member is provided.

According to the embodiment of FIG. 13, parts “V3” and “V4” are disposed between the optical members 27 and between the display panels 2 and 4 and serve to protect the side surfaces of the display panels and the optical members. The parts “V3” and “V4” may be formed in a body along with the side walls of the panel housings 20 and 40, only the part “V4” may be formed in a body along with the panel housings, or both parts may be formed as protective members separated from the panel housings 20 and 40.

The protective members are formed of transparent or opaque plastic resin or metal such as alloys.

The possible thickness of the part “V4” is the same as that of part “V2” in the embodiment of FIG. 12, and the possible thickness of the part “V3” is the same as that of part “V1”. That is, the distance between the display panels is preferably 3 mm and the distance between the optical members 27 is less than 3 mm.

FIG. 14 shows an embodiment where protection means 14 is disposed between the display panels 2 and 4 and between the optical members 27. According to the embodiment of FIG. 14, the distance between the display panels 2 and 4 is equal to the distance between the optical members 27.

As shown FIG. 14, protective films are used as the protective means 14 to reduce the distance as much as possible. The thickness of the protective film is less than 0.5 mm, that is, the same as that of part "V" in the embodiment of FIG. 11.

Embodiment 4

Figure 15:
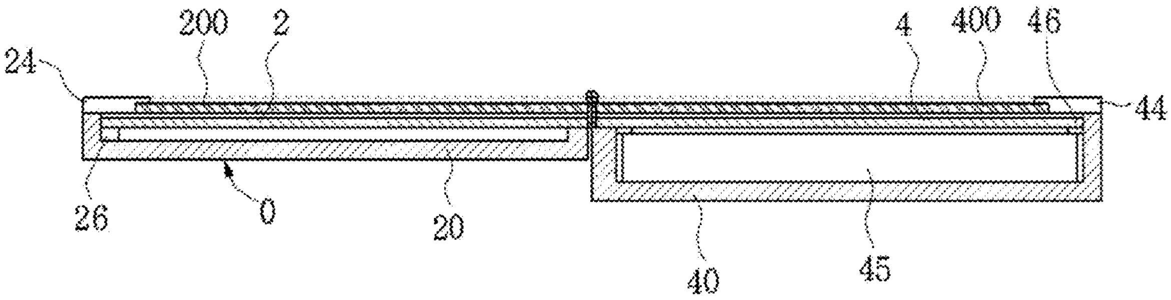
FIGS. 15 and 16 are diagrams illustrating another embodiment of the invention where display panels and components are arranged.
Figure 16:
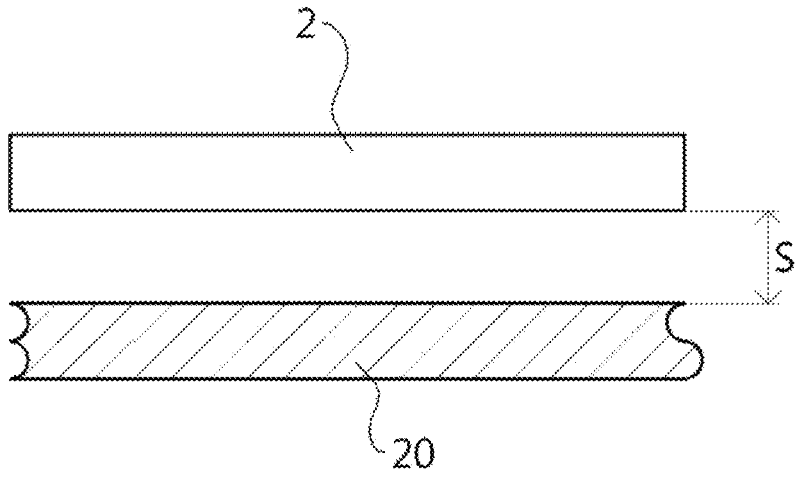

FIGS. 15 and 16 show another embodiment of the arrangement of the display panels and the components.

According to the embodiment of FIG. 15, the thicknesses of the panel housings 20 and 40 (which mean display device cases in the invention) may be different from each other.

Out of two display panels 2 and 4, a bottom plate (which is indicated by "0" in the drawing) of the panel housing 20 is located just below one display panel 2 and a main controller, a central processing unit, and a battery are disposed below the other display panel 4.

The input units 200 and 400 or the optical members 27 are disposed above the display panels 2 and 4.

According to the embodiment of FIG. 16, a gap exists between the bottom plate and the display panel. The gap may be 0 when the bottom plate is disposed just below the display panel 2, but a fixed distance may be provided therebetween. The distance "S" is preferably set to be less than 2.0 mm.

Although not shown in the drawing, a display panel support or a sheet-like shock absorbing plate absorbing impact may be inserted into the gap between the display panel and the bottom plate. In FIG. 15, by contrast, only a support 26 is shown.

Embodiment 5

FIGS. 17 to 21 show embodiments where an input unit and an optical member are disposed on a display panel.

Figure 17:
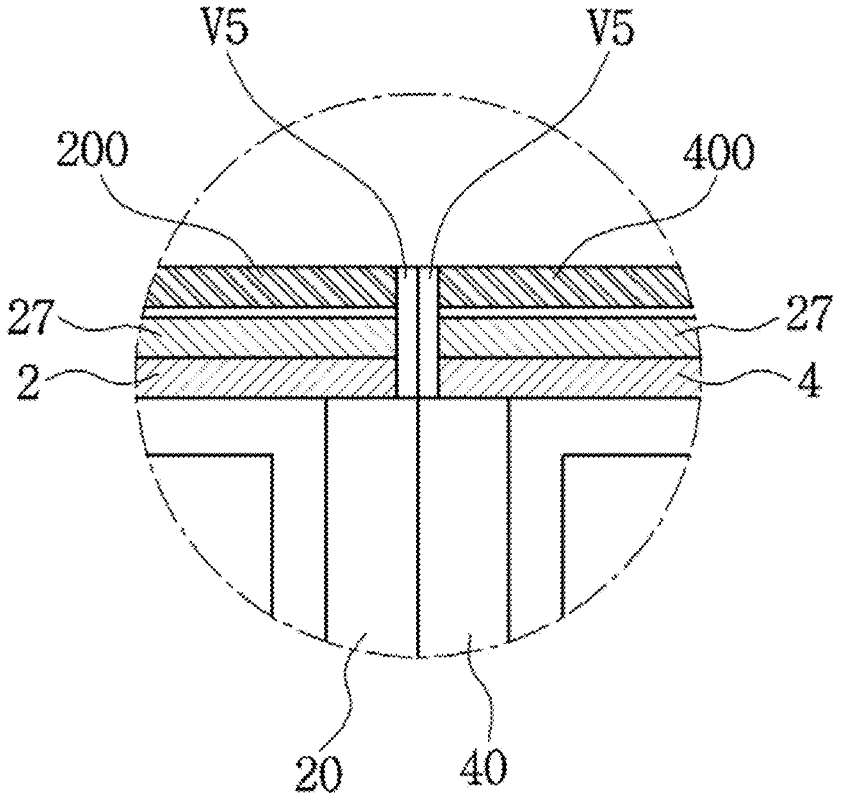
FIGS. 17 to 21 are diagrams illustrating embodiments of the invention where an input unit and optical members are disposed on display panels.
Figure 18:
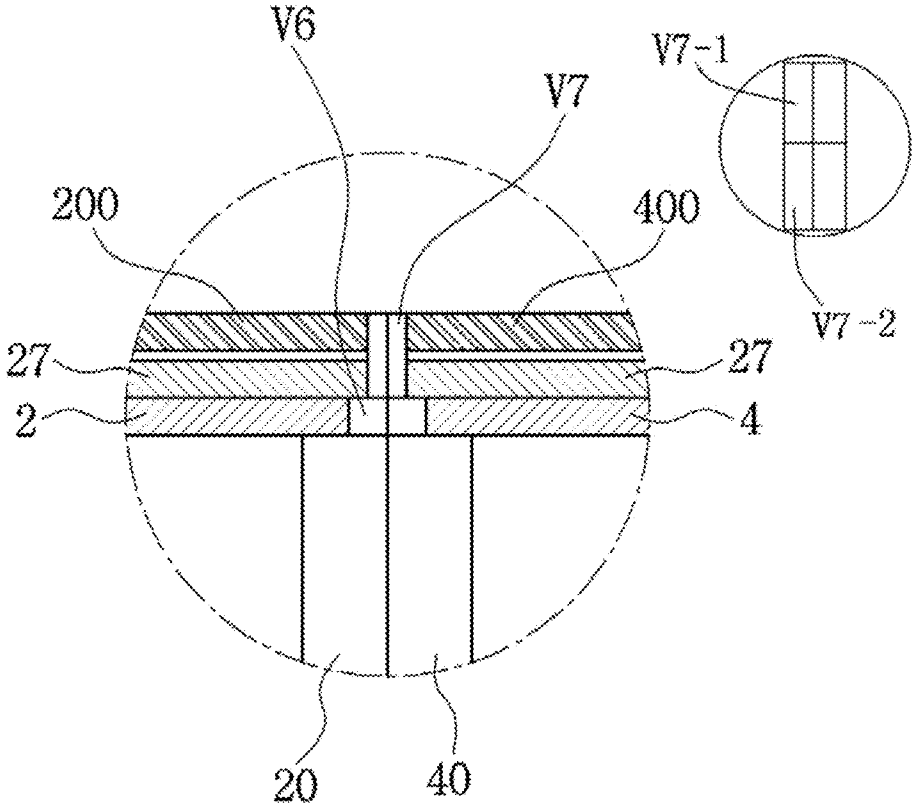

FIGS. 17 and 18 show an embodiment where the optical members 27 are disposed on the display panels 20 and 40 and the input units 200 and 400 are disposed thereon.

According to the embodiment of FIG. 17, a part "V5" is disposed between the display panels 2 and 4, between the optical members 27, and the input units 200 and 400.

The possible thickness and material of the part "V5" are the same as that of part "V" in the embodiment of FIG. 11.

FIG. 18 shows an embodiment where protection means having a different thickness is provided. According to the embodiment of FIG. 18, a part "V6" is disposed on the side surfaces of the display panels 2 and 4 and a part "V7" is disposed on the side surface of the input units 200 and 400 and the optical members 27.

The possible materials and thicknesses of the parts "V6" and "V7" are the same as those of parts "V1" and "V2" in the embodiment of FIG. 12. The distance between the input units is smaller than the distance between the display panels, and the distance between the optical members is smaller than the distance between the display panels.

According to FIG. 18, the part "V7" can be separated into a part "V7-1" disposed on the side surfaces of the input units 200 and 400 and a part "V7-2" disposed on the side surfaces of the optical members 27. The thicknesses of the parts "V7-1" and "V7-2" may be different from each other.

Figure 19:
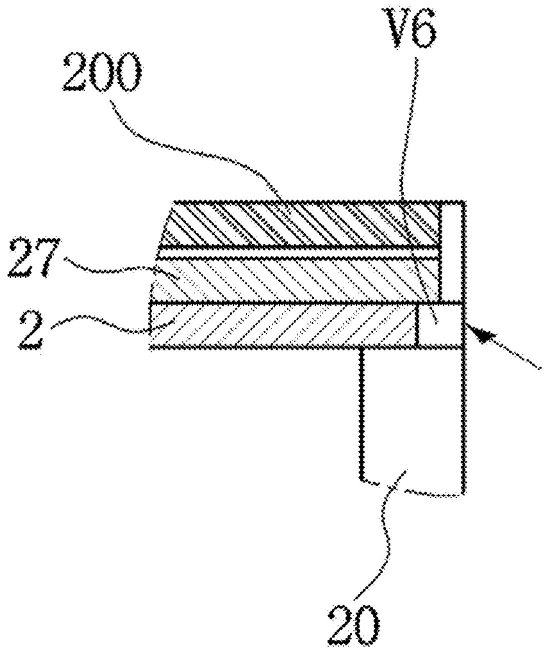

FIG. 19 is a diagram illustrating the side surface of the protection means according to an embodiment of the invention.

According to the embodiment of FIG. 19, the outer surface (which is indicated by an arrow in the drawing) of the protection means or the protective film protecting the sides surfaces of the display panels 2 and 4, the input units 200 and 400, and the optical members 27 may be coated with a colorant.

That is, a color film may be attached to the outer surface (which is indicated by an arrow in the drawing), or the outer surface may be coated with a colorant. The same color as the panel housings may be selected.

Figure 20:
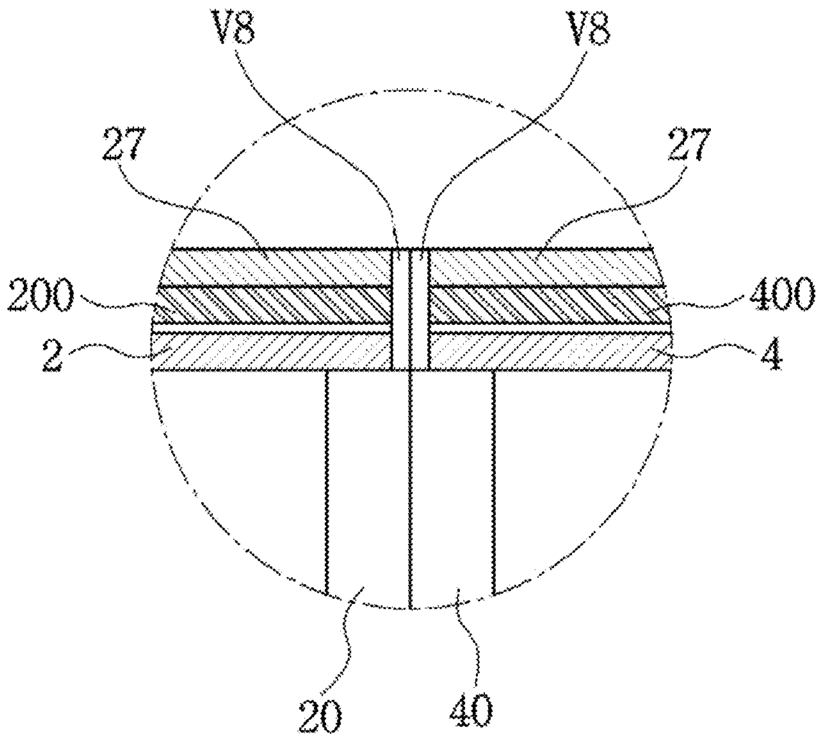
Figure 21:
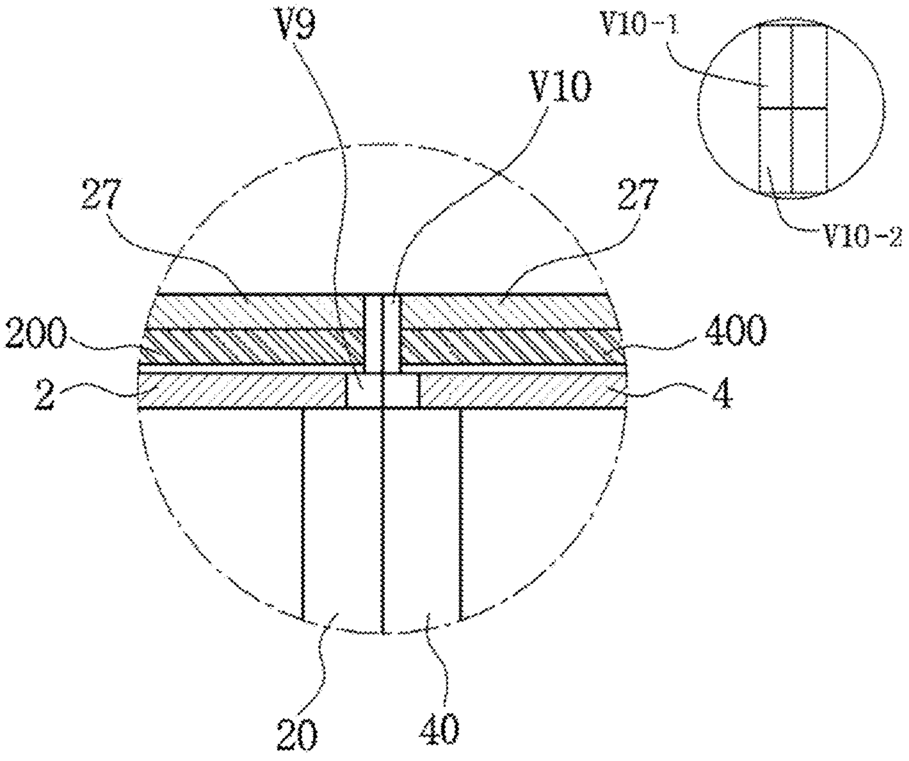

FIGS. 20 and 21 show embodiments where the optical member is disposed on the uppermost surface.

According to the embodiment of FIG. 20, a part "V8" is the same as part "V5" in the embodiment of FIG. 17, except that the optical members 27 are disposed on the top of the input units 200 and 400.

According to the embodiment of FIG. 21, parts "V9" and "V10" are the same as parts "V7" and "V6" in the embodiment of FIG. 18, except that the positions of the optical members 27 and the input units 200 and 400 are exchanged.

The distance between the display panels 2 and 4, the distance between the optical members 27 and 27, and the distance between the input units 200 and 400 are the same as in the above embodiments.

The part "V10" can be separated into a part "V10-1" disposed on the side surfaces of the optical members 27 and a part "V10-2" disposed on the side surfaces of the input units. The thicknesses of the parts "V10-1" and "V10-2" may be different from each other.

Embodiment 6

FIGS. 22 to 27 are diagrams illustrating the structure of a display module according to an embodiment of the invention.

Figure 22:
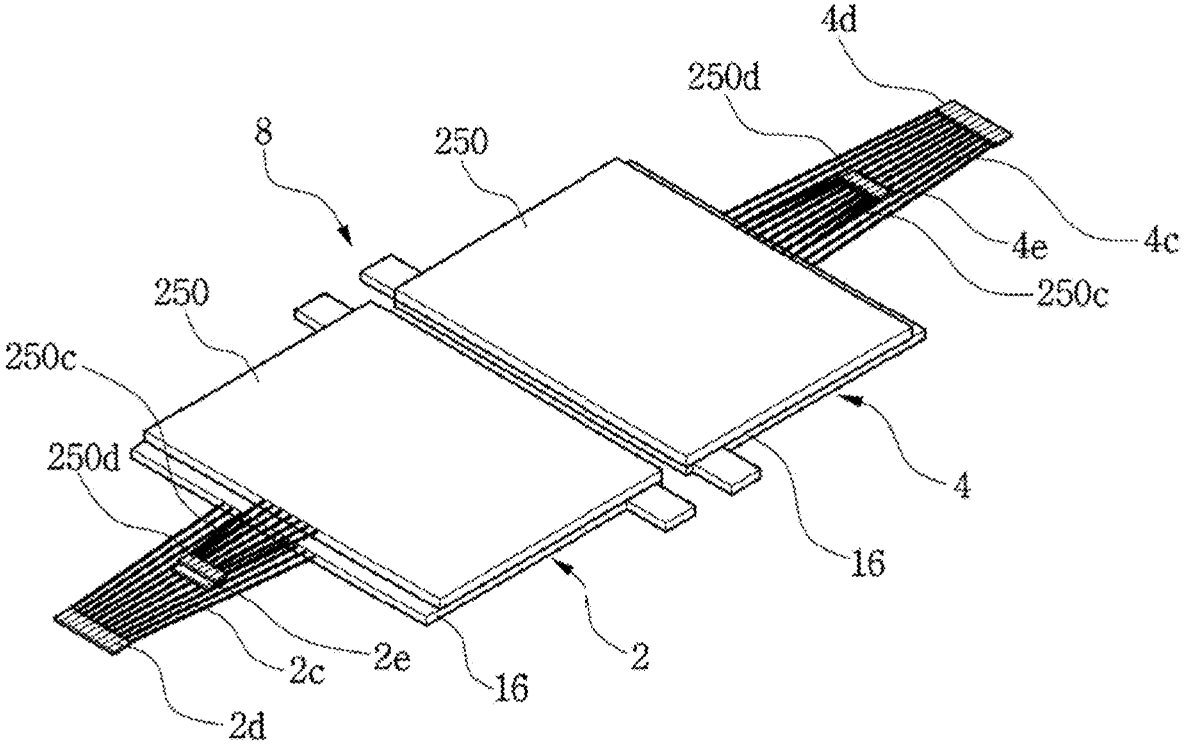
FIGS. 22 to 27 are diagrams illustrating the structure of a display module according to an embodiment of the invention.

FIG. 22 is a diagram illustrating a possible arrangement of the display panels and the input units. FIG. 22 shows an on-cell type embodiment (see FIG. 3), where the input units 200 and 400 are disposed just above the display panels 2 and 4. The same principle may be applied to an out-cell type.

According to the embodiment of FIG. 22, flexible printed circuits (FPC) 2*c*, 4*c*, and 250*c* are disposed to connect the display panels and the input devices to connectors 2*d*, 4*d*, and 250*d*. The FPCs 2*c*, 4*c*, and 250*c* are disposed on a side opposite to the joint.

The connector 250*d* of the input unit 200 can be electrically connected to junctions 2*e* and 4*e* of the display panels 2 and 4. Accordingly, both the display panels 2 and 4 and the input units 200 and 400 can be controlled by a main unit (including a central processing unit and the like).

The display signal line FPC may be located on the side opposite to the joint, or the signal line (FPC) of the input unit 200 may be located on one side among three sides other than the joint 8.

Figure 23:
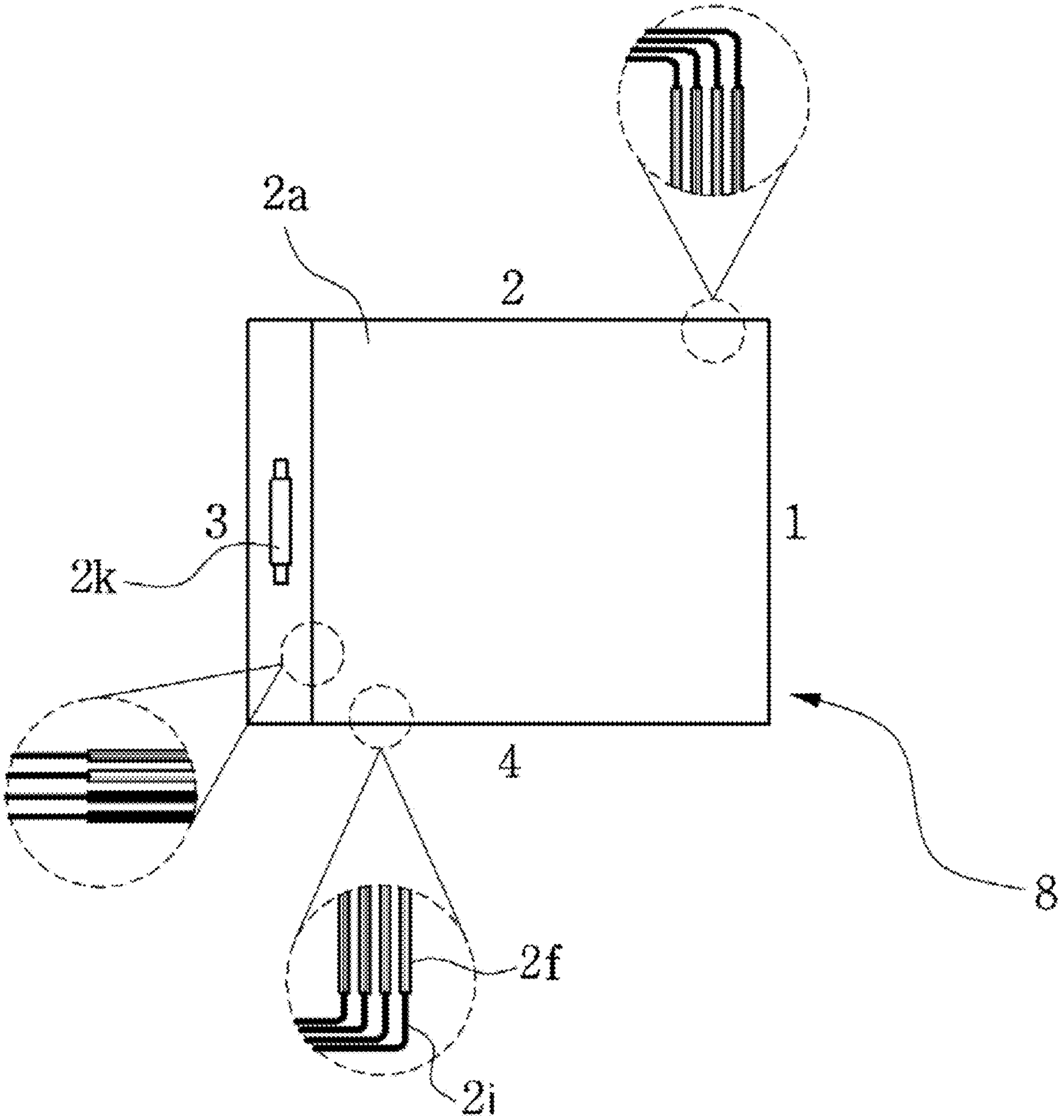

FIG. 23 is a diagram illustrating a possible electrode structure of a display panel.

According to the embodiment of FIG. 23, when four sides of the display panel are defined as first, second, third, and fourth sides and the first side is used as the joint, a driver 2*k* is mounted on the third side opposite to the joint.

When a signal supply line 2*i* connected to a panel electrode 2*f* is drawn out from the second side or the fourth side, the signal supply line is connected to the third side via the edge of the display panel. The signal supply line drawn out from the third side is connected to the third side.

Accordingly, signals can be sent to the display panel through the use of only the driver 2*k* mounted on the third side.

Figure 24:
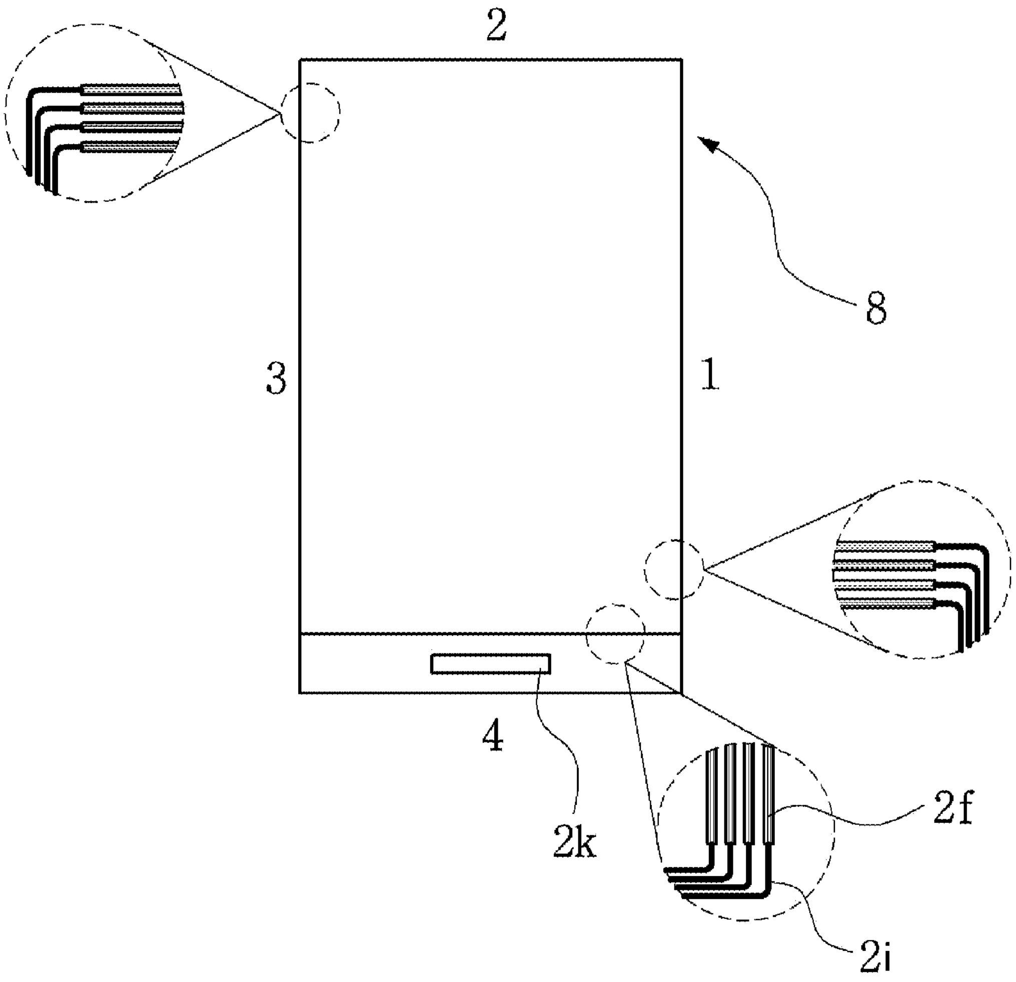
Figure 25:
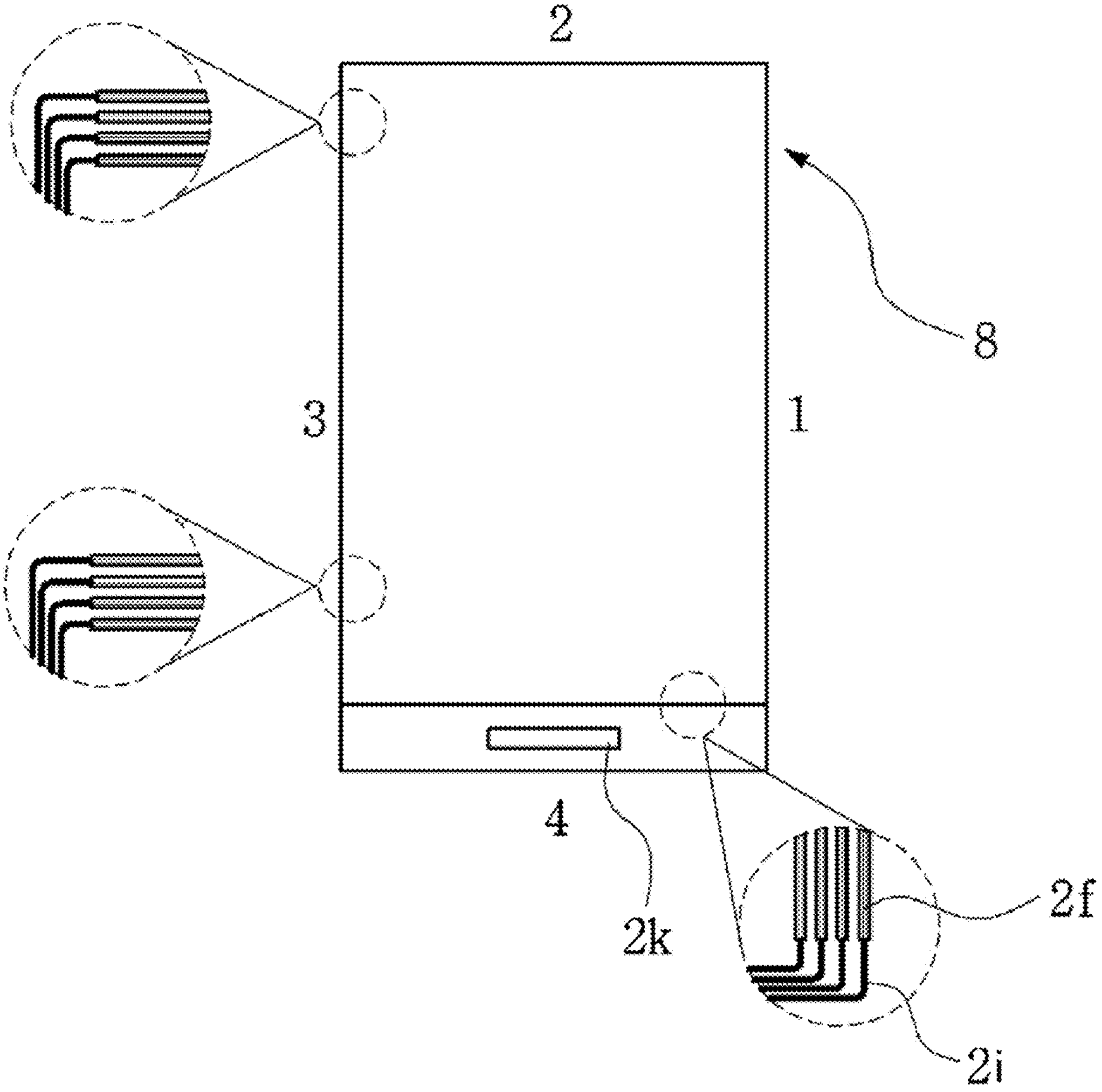
Figure 26:
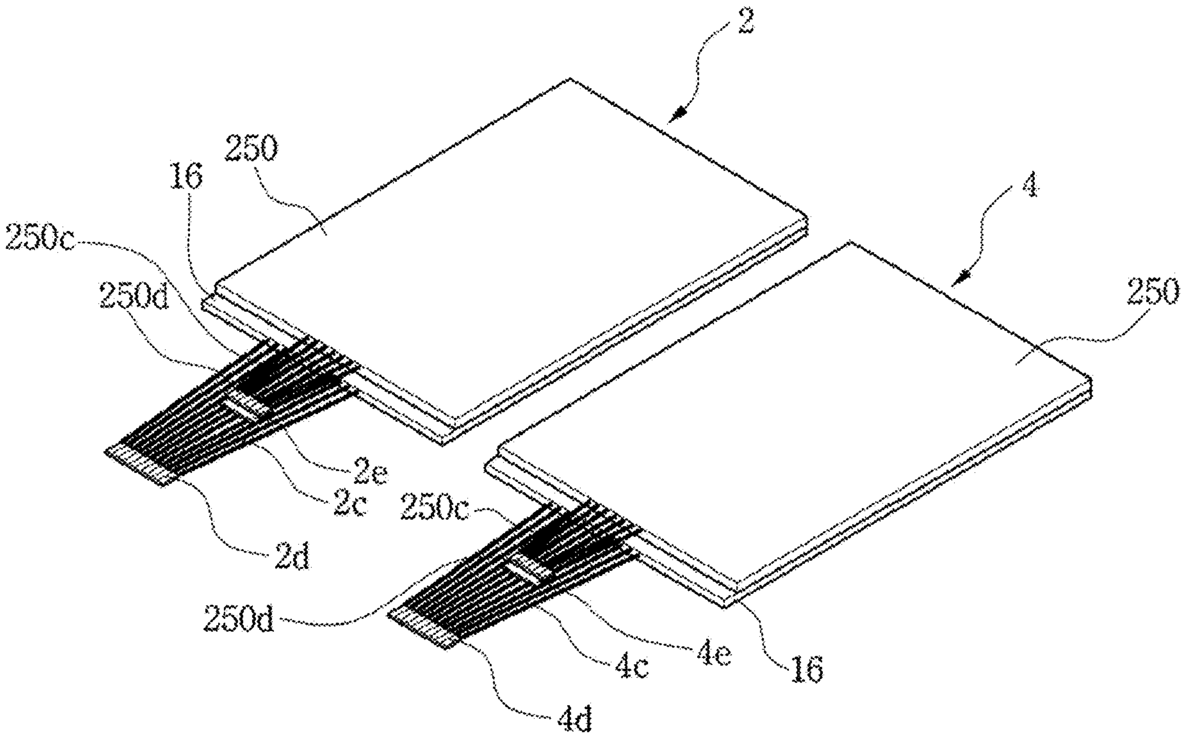

FIGS. 24 to 26 are diagrams illustrating other embodiments of the display panel.

According to the embodiment of FIG. 24, when the first side is used as the joint, the driver 2*k* is disposed on the fourth side. When the joint is disposed on the right side (left side in some cases), the driver 2*k* is disposed on the upper side or the lower side.

When a signal supply line 2*i* connected to a panel electrode 2*f* is drawn out from the first side or the third side, the signal supply line is drawn to the fourth side via the edge of the display panel. The signal supply line drawn out from the fourth side is connected to the fourth side.

Accordingly, by mounting the driver on the fourth side, the display panel can be driven.

The numbers of signal supply lines drawn out from the first side and the third side may not be equal to each other. For example, the number of signal supply lines drawn out from the third side may be more. This is to further reduce the width of the joint. In some cases, the number of signal supply lines drawn out from the first side may be more.

FIG. 25 shows an embodiment which is similar to the embodiment shown in FIG. 24 and in which signal supply lines are drawn out from only the third side and no signal supply line is drawn out from the joint (the first side).

According to the embodiment of FIG. 25, a signal supply line 2*i* is an electrical wire connected to the driver 2*k* so as to supply a drive signal therefrom. In the invention, the electrode 2*f* may be a pixel electrode supplying a drive signal to a TFT (Thin Film Transistor).

FIG. 26 is a diagram illustrating an embodiment where two display panels are arranged. FIG. 26 shows an in-cell type embodiment in which the joint 8 is located on the right side (left side in some cases) and the FPCs 2*c* and 4*c* or the external connectors 2*d* and 4*d* connected to the driver are located on the lower side (upper side in some cases). Similarly, the FPC 250*c* and the connector 250*d* for connection of the input unit are located on the lower side. The connector for connection of the input unit may be mounted on three sides other than the joint.

According to the embodiment of FIG. 26, the driver is installed on one selected side of the display panel. For example, the driver may be disposed on two sides out of three sides other than the joint.

Figure 27:
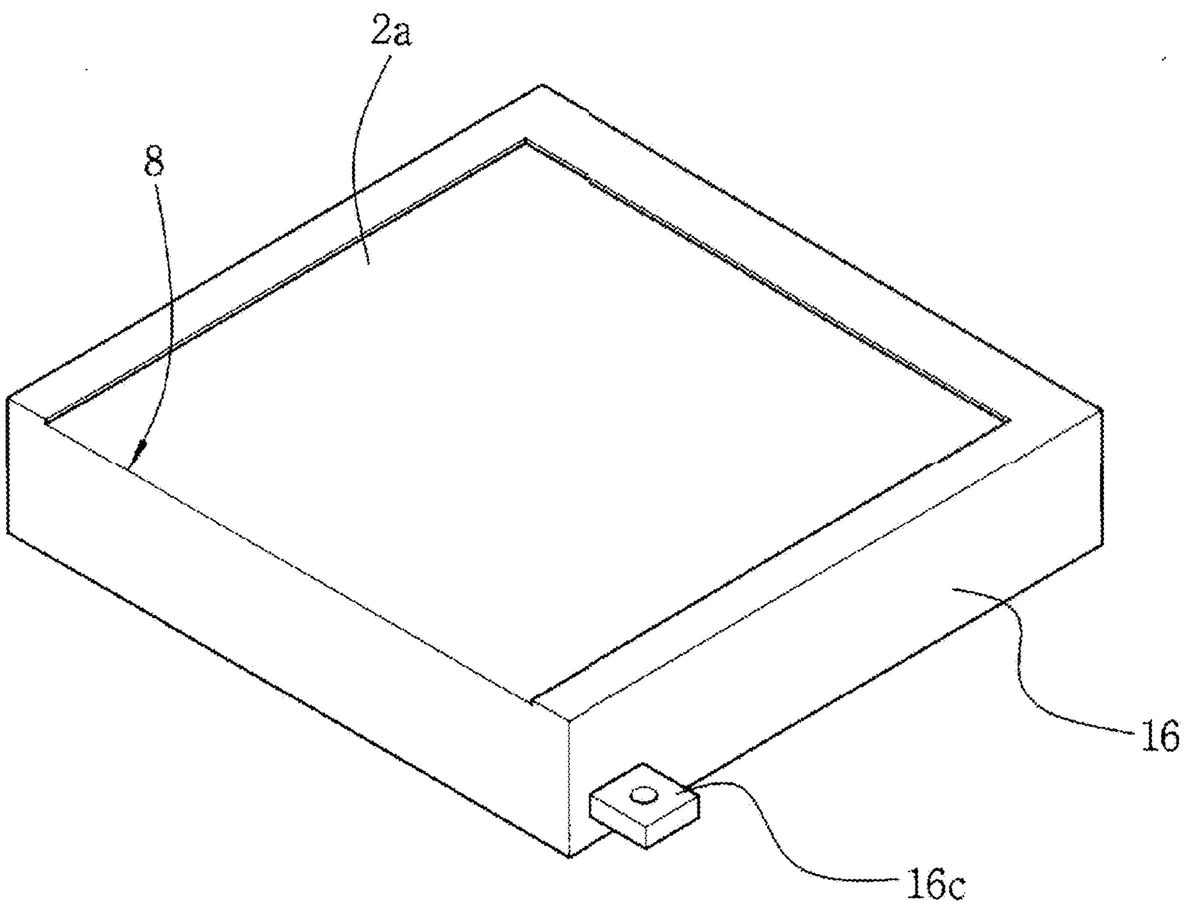

FIG. 27 is a diagram illustrating an embodiment where a display panel is mounted on a chassis.

According to the embodiment of FIG. 27, the display panel 2 is mounted on the chassis 16, and the connectors and the signal lines are not shown for the purpose of convenience.

A fixing portion 16*c* is disposed in the chassis 16 so as to strongly fix the chassis to the panel housing 20. Two display panels are symmetric in a state where they are mounted on the chasses.

Embodiment 7

FIGS. 28 to 36 are diagrams illustrating a mounting structure of the panel housings 20 and 40, according to the embodiment of the invention.

Figure 28:
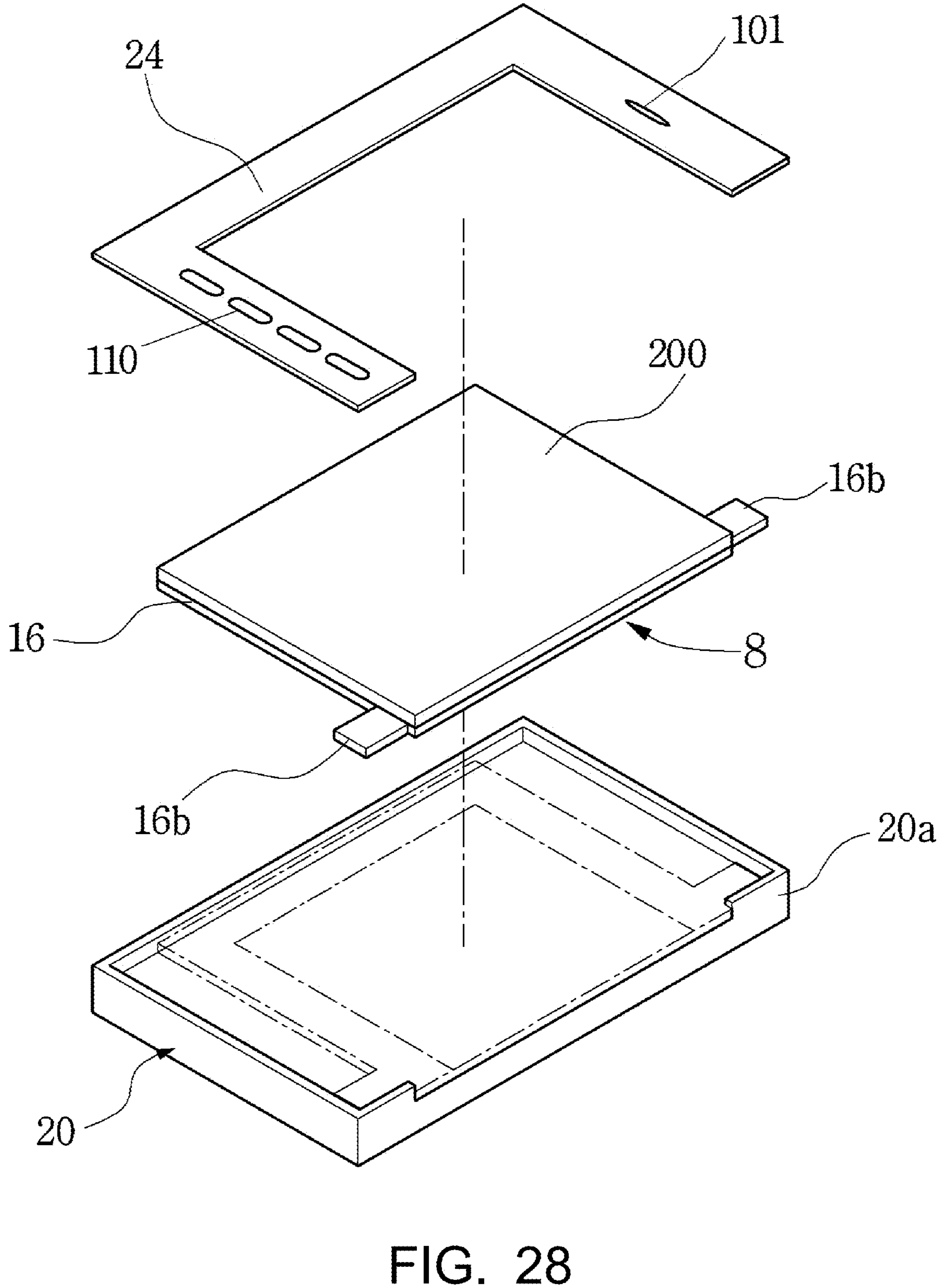
FIGS. 28 to 36 are diagrams illustrating a mounting structure of panel housings according to an embodiment of the invention.

FIG. 28 shows an on-cell type embodiment.

According to the embodiment of FIG. 28, the display panels 2 and 4 and the input units 200 and 400 are mounted on the panel housing in a state where an input unit is located just on a display panel.

As shown in the drawing, the display panel 2 or 4 is mounted on the panel housing, and the result is covered with a cover frame 24 having a shape in which one side of a rectangle is opened. That is, the edges which are a non-display area of the display panel 2 or 4 is covered with the cover frame. Input buttons 110 or a speaker 101 may be mounted on the cover.

FIGS. 29 to 32 are diagrams illustrating an embodiment where an input unit is mounted on the cover frame.

Figure 29:
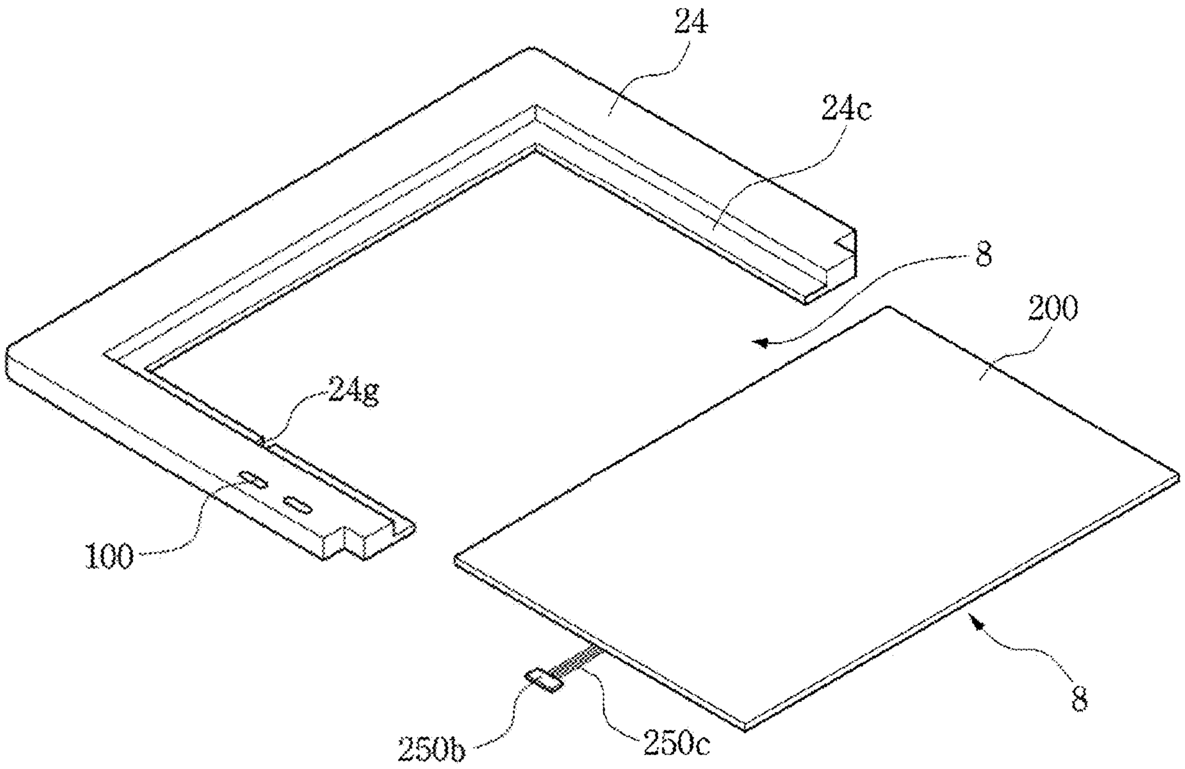
Figure 30:
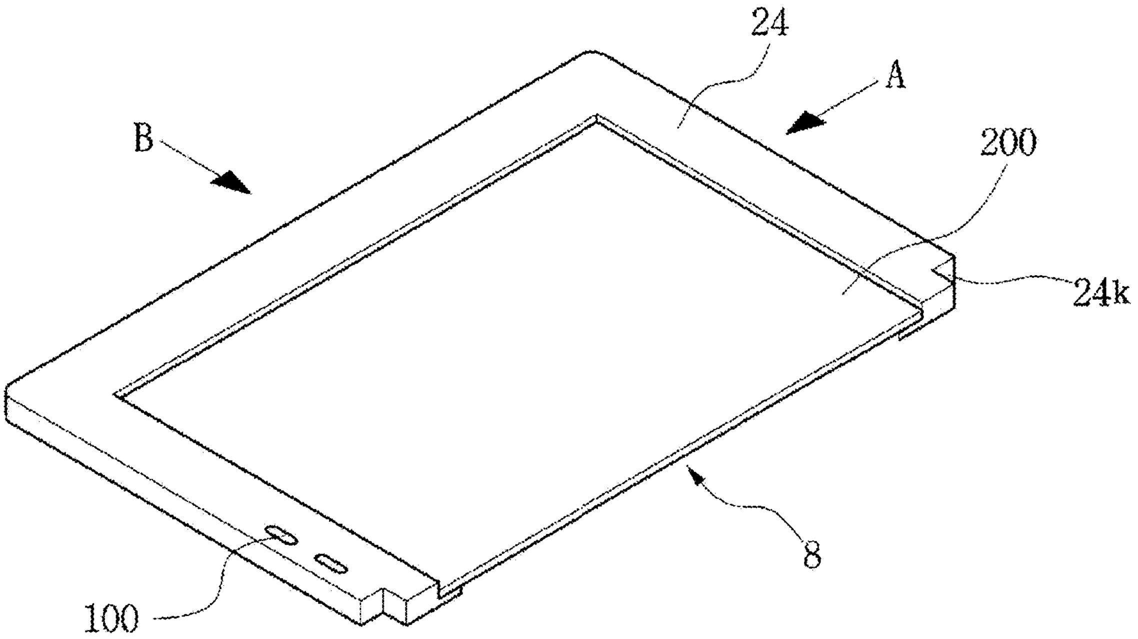

According to the embodiment of FIGS. 29 and 30, the cover frame 24 has a shape in which one side of a rectangle is opened, and the joint 8 is located on the opened side.

The input unit includes signal supply lines 250*c* and a connector 250*b*. A groove 24*g* is formed at a position corresponding to the signal supply lines and the connector.

The input unit 200 is mounted on a support 24*c* disposed in the cover frame 24. FIG. 29 is a disassembled view of this embodiment, and FIG. 30 is an assembled view in which the input unit is mounted on the support 24*c*.

When the input unit 200 is mounted on the cover frame 24, the height of the surface of the cover frame 24 is larger than the height of the surface of the input unit 200. The difference therebetween is preferably set to be less than 1.5 mm.

A cutout 24*k* is formed to fit a shaft.

Figure 31:
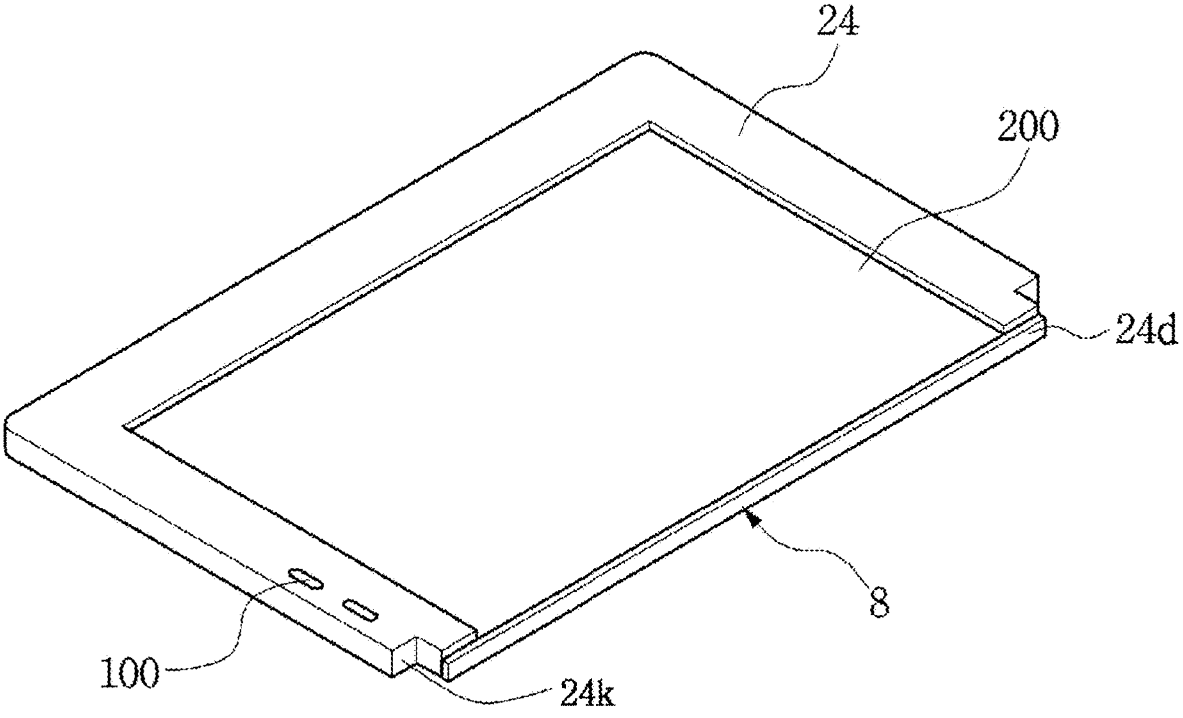

According to the embodiment of FIG. 31, a cover side wall 24*d* may be attached to the opened portion (the joint 8) of the cover frame 24. The cover side wall 24*d* protects the side surface of the input unit. The height of the cover side wall 24*d* may be equal to or less than the height of the cover frame 24. When the cover side wall is lower than the cover frame, the difference therebetween is preferably set to be greater than or equal to 2 mm.

The thickness of the cover side wall 24*d* is preferably set to be greater than or equal to 2 mm.

The cover side wall has the same function as the protection means or the side wall of the panel housing in the embodiments of FIGS. 17 to 21. The height of the cover side wall 24*d* may be equal to the height of the surface of the cover frame 24. The height of the cover side wall may be equal to the height of the input unit.

The cover frame 24 and the cover side wall 24*d* may be formed as a single body. A shaft is disposed in the cutout 24*k*.

Figure 32:
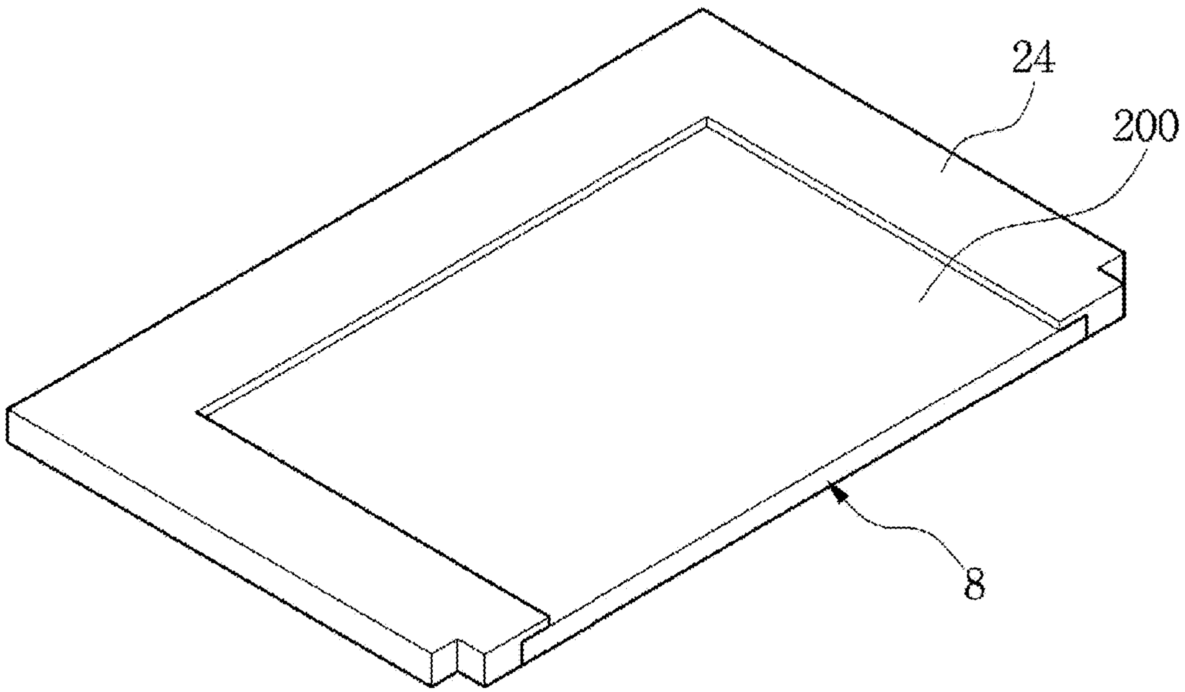

FIG. 32 shows an embodiment where the input unit 200 is mounted from the downside of the cover frame 24. Such a portable display device might not include an input unit. In this case, a protective plate is disposed at the position corresponding to the input unit.

Figure 33:
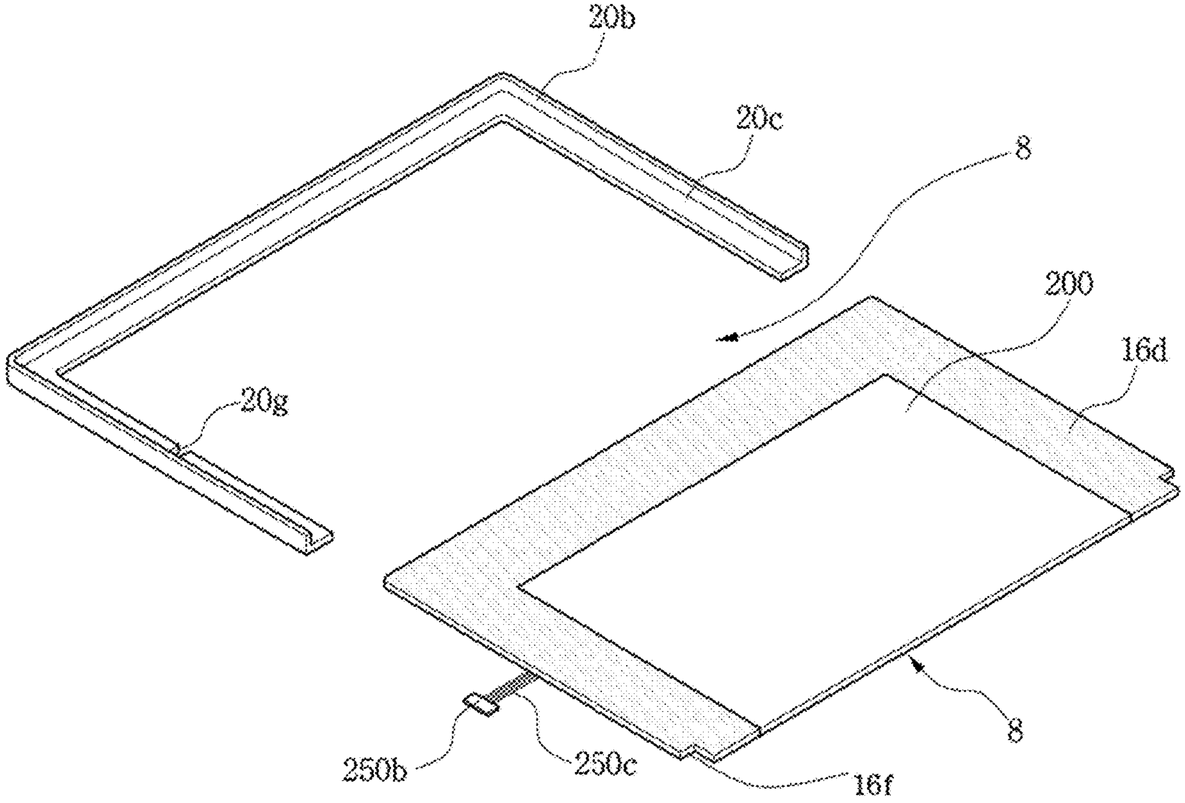
Figure 34:
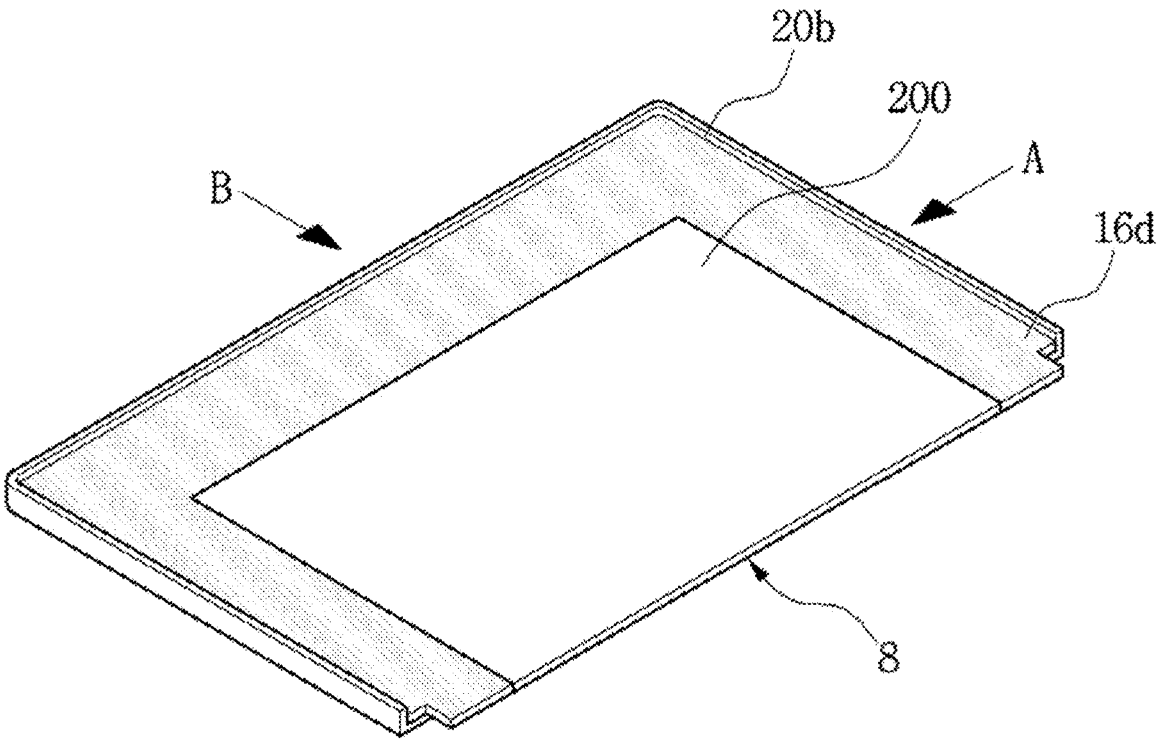
Figure 35:
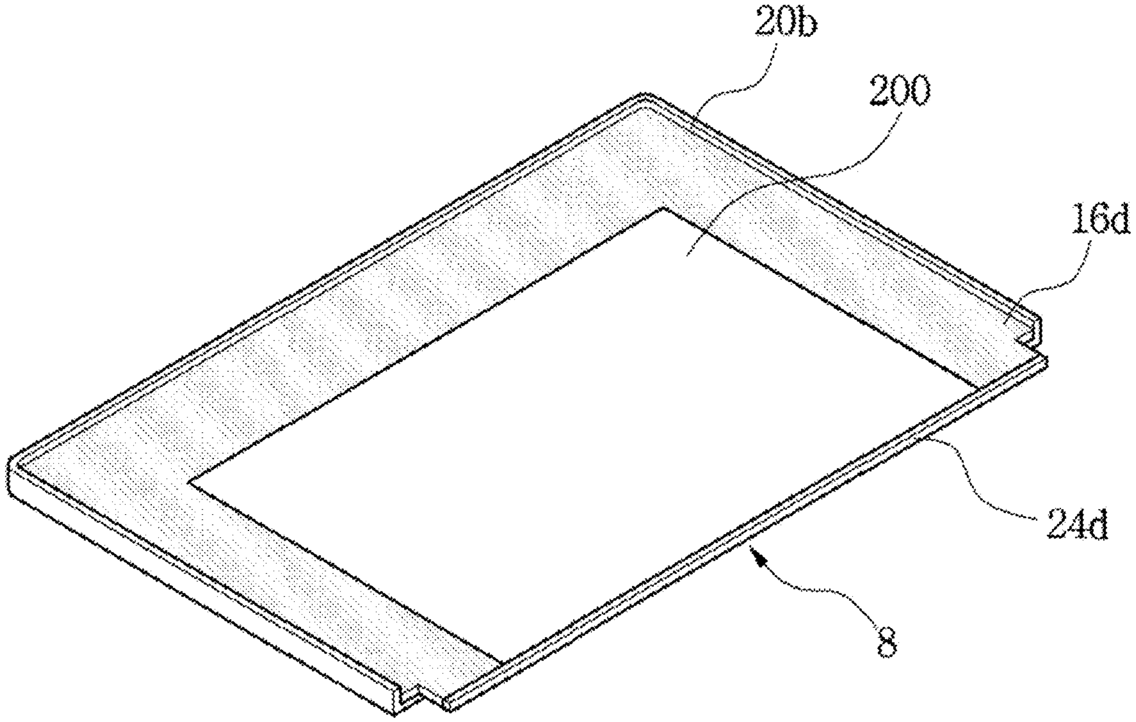

FIGS. 33 to 35 are diagrams illustrating an embodiment where an input unit is mounted on a frame.

According to the embodiment of FIG. 33, a frame 20*b* includes a frame support 20*c* and the input unit 200 is mounted on the frame support 20*c*. Similarly, the frame 20*b* has a shape in which one side is opened. The joint 8 is disposed in this opened portion.

A mask print 16*d* is formed in the input unit 200 mounted on the frame 20*b*. The mask print 16*d* has an effect of causing the edge of the input unit to be opaque. The mask print may be formed on a protective film disposed on the input unit. The protective film and the input unit may be formed as a single body.

The mask print 16*d* serves to cause the edges other than the edge corresponding to the joint to be opaque. Holes in which an opening for a camera or a speaker may be located in the mask print.

A cutout 16*f* is disposed at both corners (or one corner) of each input unit 200 or 400. A connection shaft is disposed in the cutout 16*f*.

FIG. 34 is a diagram illustrating an embodiment where the input unit 200 is mounted on the frame 20*b*, and FIG. 35 is a diagram illustrating an embodiment where a frame side wall 24*d* is disposed in the side of the frame 24 corresponding to the joint 8. The thickness of the frame side wall 24*d* is equal to that of the cover side wall described in the above-mentioned embodiment.

In a display device not including the input unit 200, a protective plate formed of glass or plastic may be disposed in place of the input unit 200.

Figure 36:
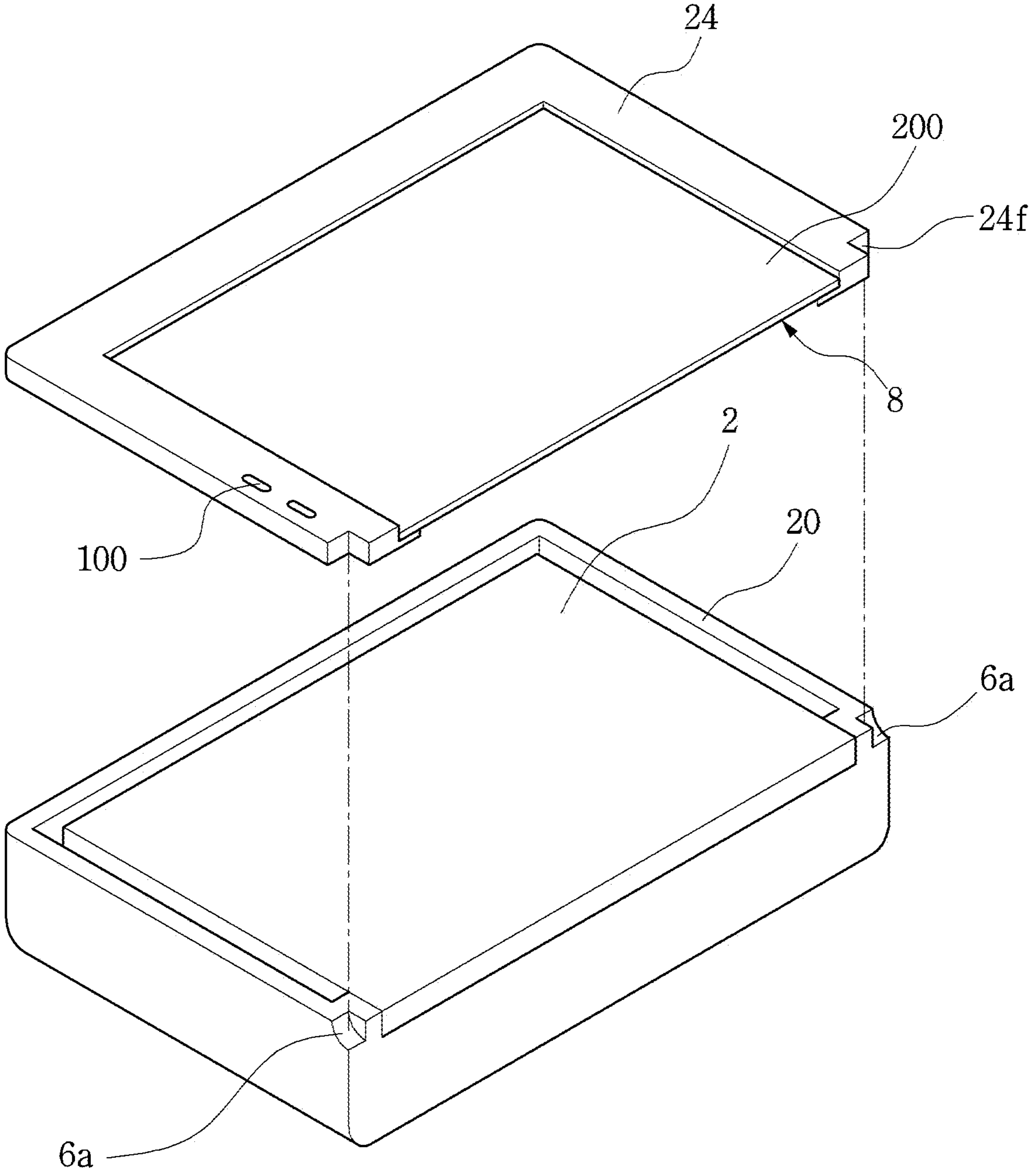

FIG. 36 shows the mounting of the frame on a panel housing, according to an embodiment of the invention.

According to the embodiment of FIG. 36, the cover frame 24 including the input unit 200 is mounted on the panel housing 20. When a shaft is disposed in the panel housing, the cover frame 24 includes cutouts 24*k*.

The opened side of the cover frame 24 is located to correspond to the joint 8 of the display panel 2.

The opened side of the frame 20*b* and the joint of the input unit 200 are located to correspond to the joint 8 of the display panel 2.

Embodiment 8

Figure 37:
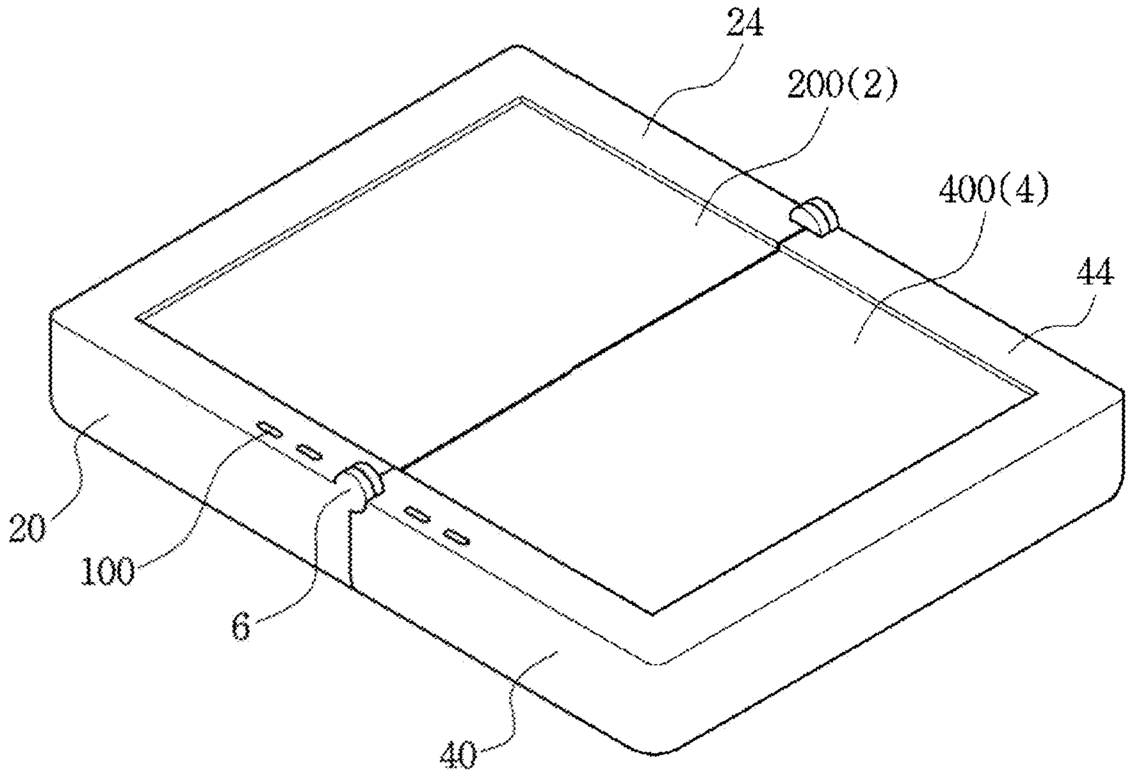
FIGS. 37 and 38 are diagrams illustrating panel housings on which a cover or a frame is mounted according to embodiments of the invention.
Figure 38:
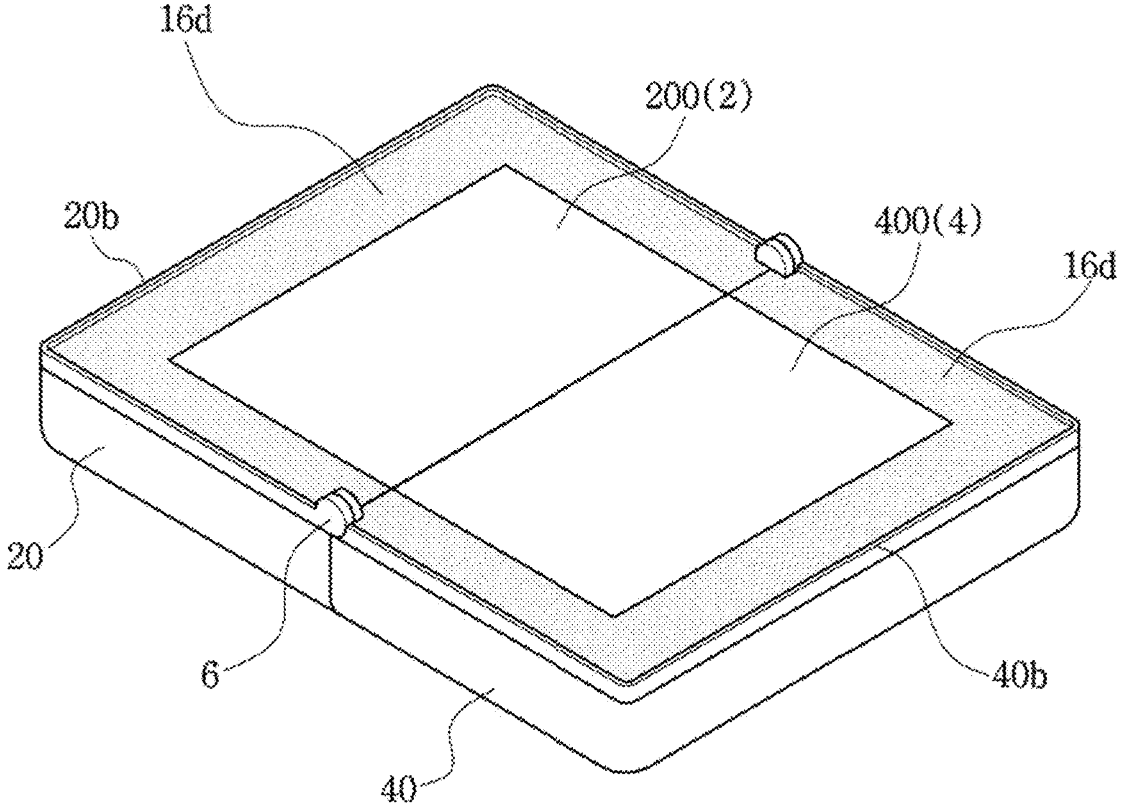

FIGS. 37 and 38 are diagrams illustrating panel housings having a cover or a frame mounted thereon, according to embodiments of the invention.

FIG. 37 shows an embodiment where two covers 24 and two input units 200 and 400 are mounted. FIG. 38 shows an embodiment where two frames 20*b* and 40*b* are mounted.

According to the embodiments of FIGS. 37 and 38, when two panel housings 20 and 40 are unfolded, the display panels 2 and 4 are made to be contiguous to each other and the input units 200 and 400 on the display panels are made to be contiguous to each other.

The panel housings 200 and 400 can be folded and unfolded through the use of a shaft 6.

FIGS. 39 to 43 are diagrams illustrating mask prints according to embodiments of the invention.

Figure 39:
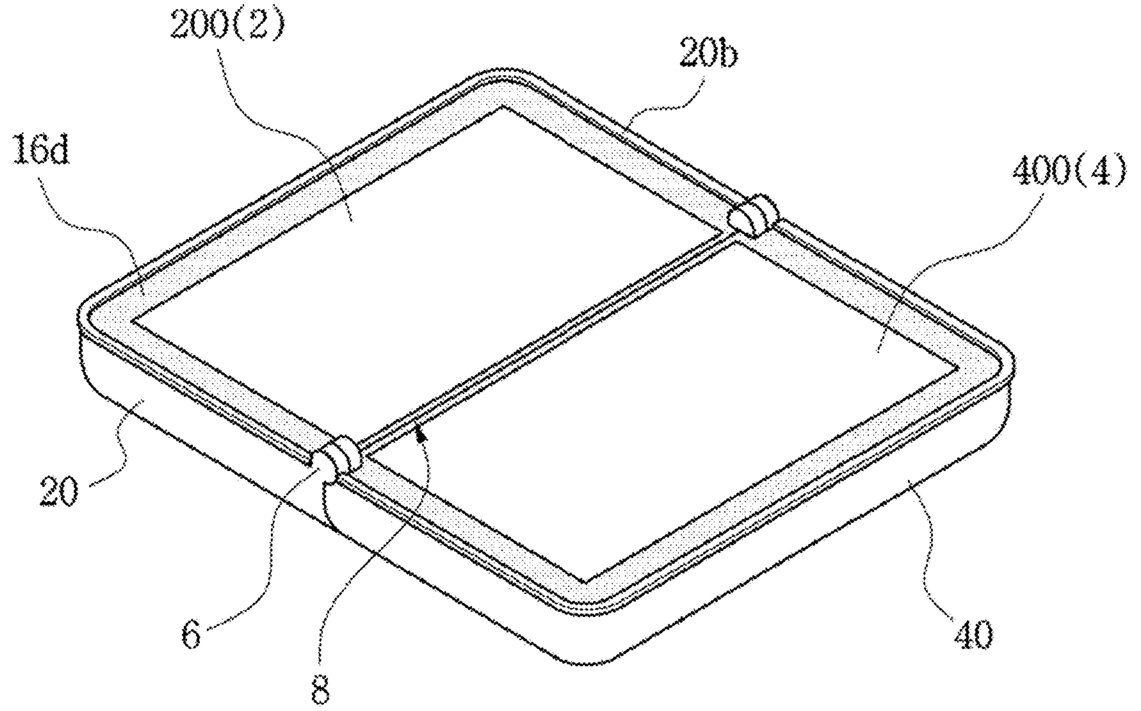
FIGS. 39 to 43 are diagrams illustrating mask prints according to embodiments of the invention.

FIG. 39 shows an embodiment where a mask print 16*d* is formed on the joint 8. The width of the mask print corresponding to the joint is larger than that on the side opposite to the joint. The width of the mask print 16*d* to be formed on the joint 8 should not be greater than 3 mm.

Figure 40:
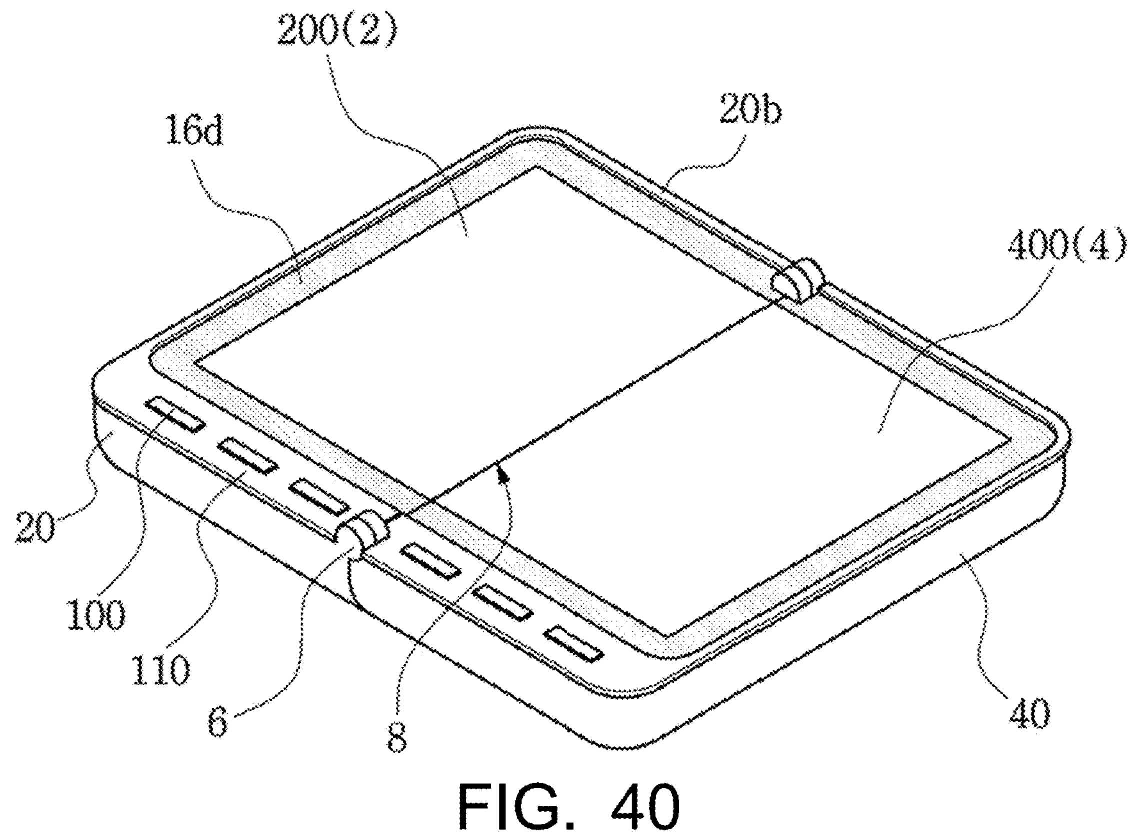
Figure 41:
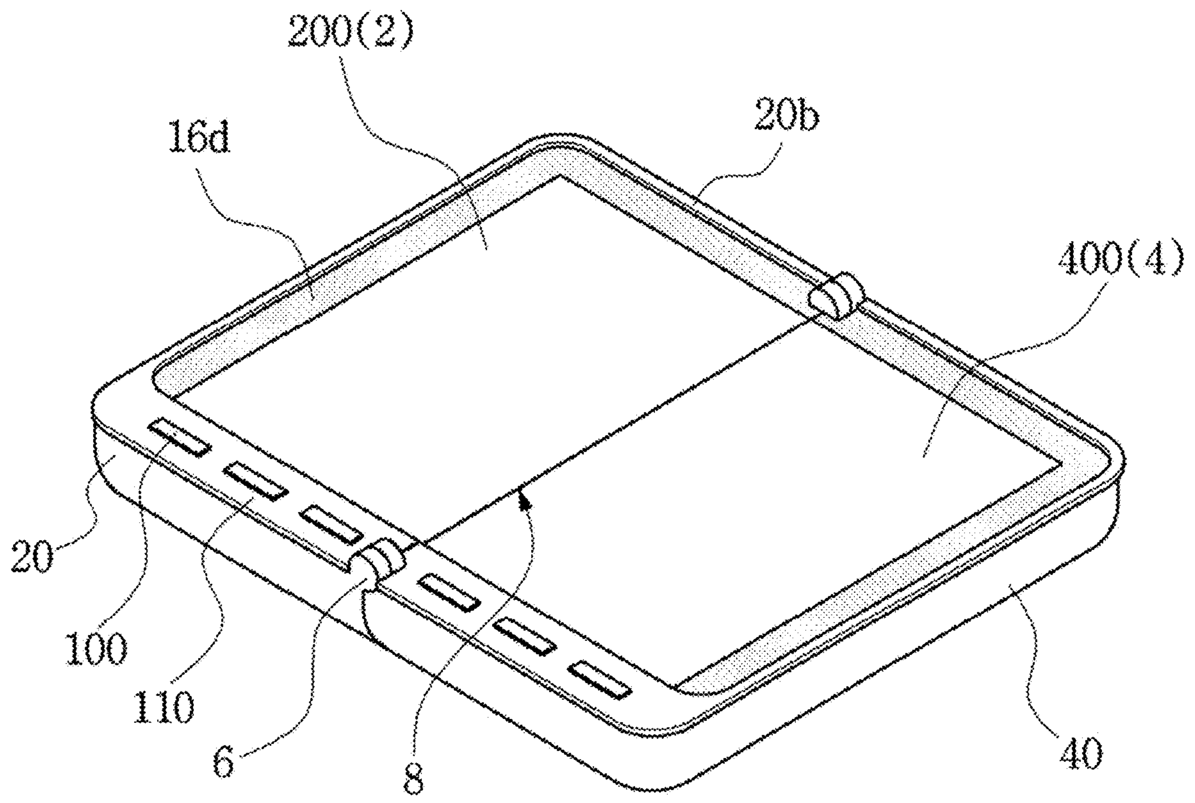

FIGS. 40 and 41 are diagrams illustrating an embodiment where buttons are disposed in a frame.

According to the embodiment of FIG. 40, a button plate 110 is formed in the frame 20*b* and buttons 100 are disposed in the button plate. The buttons 100 are connected to a central processing unit 105 to control the portable display device.

Cutouts on which a shaft 6 is mounted are formed in the button plate 110. The shaft is attached to the button plate and the input units 200 and 400.

FIG. 41 shows another embodiment of the mask print 16*d* of the input unit.

According to the embodiment of FIG. 41, when the button plate 110 is provided, the mask print 16*d* may be formed on only the side opposite to the joint 8 and the upper side in the input unit 200.

The mask print 16*d* may be formed in the joint. In this case, the width of the mask print formed in the joint is set to be less than 3 mm.

Figure 42:
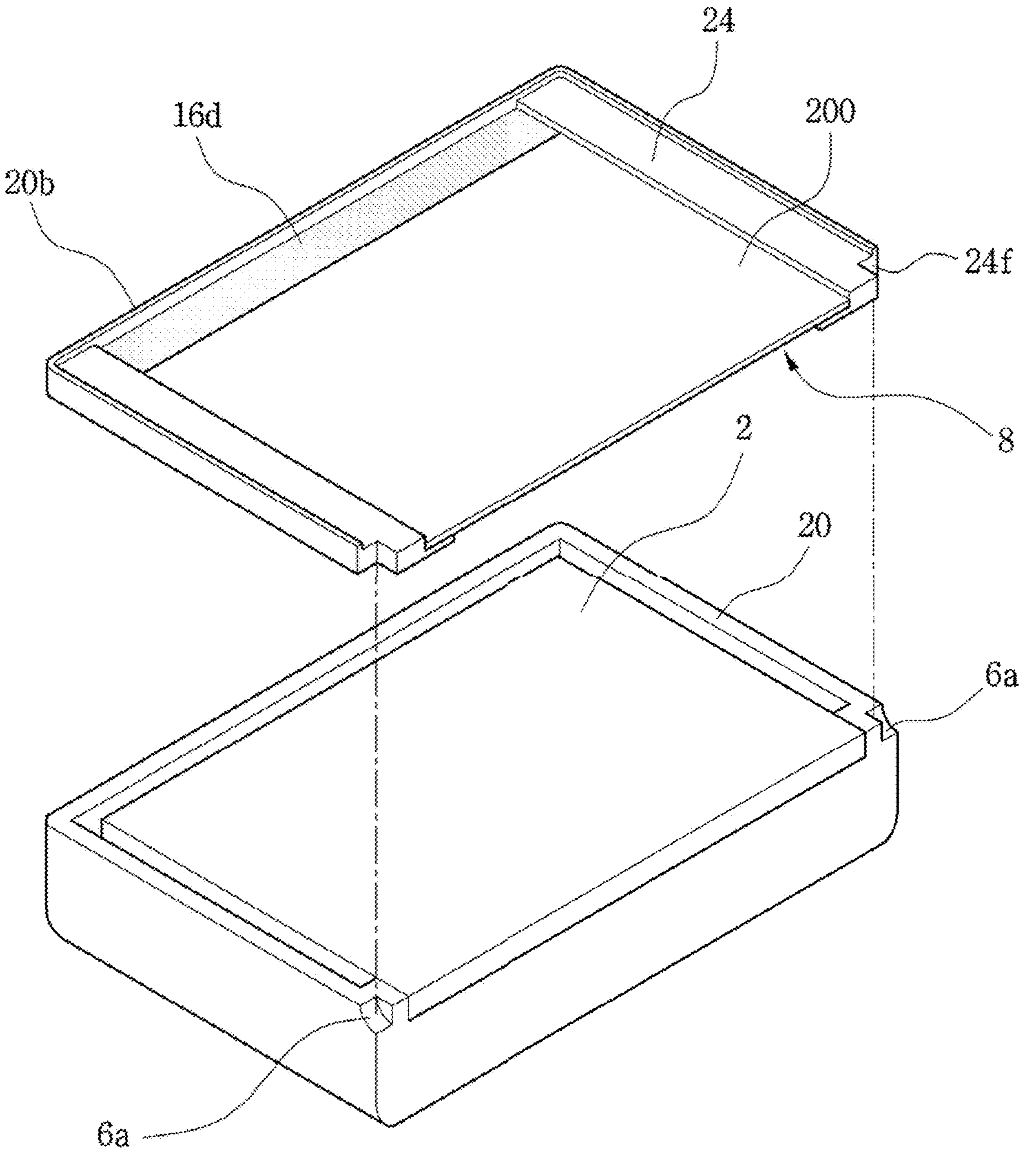

FIG. 42 is a diagram illustrating an embodiment where the mask print 16*d* is formed on only the side opposite to the joint and a cover 24 is formed on the upper side and the lower side of the frame 20*b*.

Figure 43:
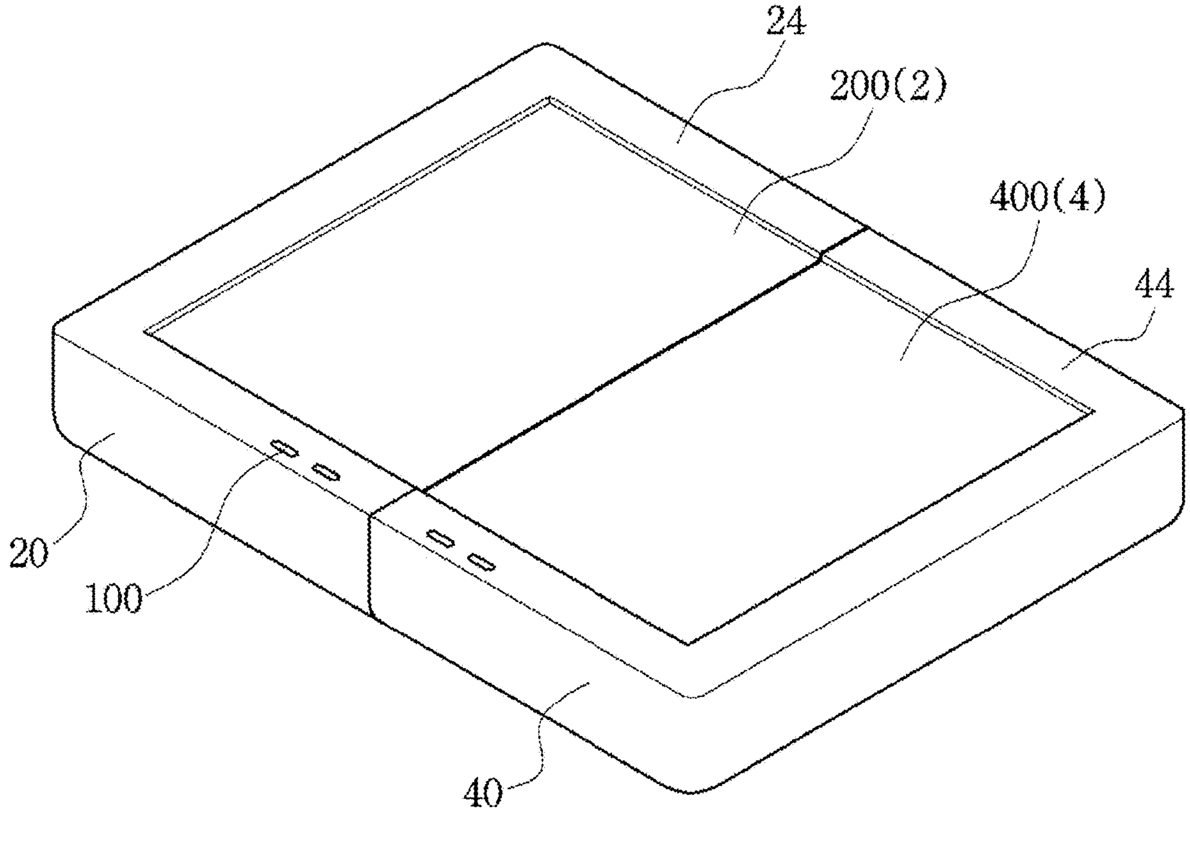

FIG. 43 is a diagram illustrating an embodiment of a structure in which a shaft is not used. FIG. 43 shows an embodiment of the cover 24, but various structures in which no shaft is formed in the frames 20*b* described above in the invention can be provided.

Figure 44:
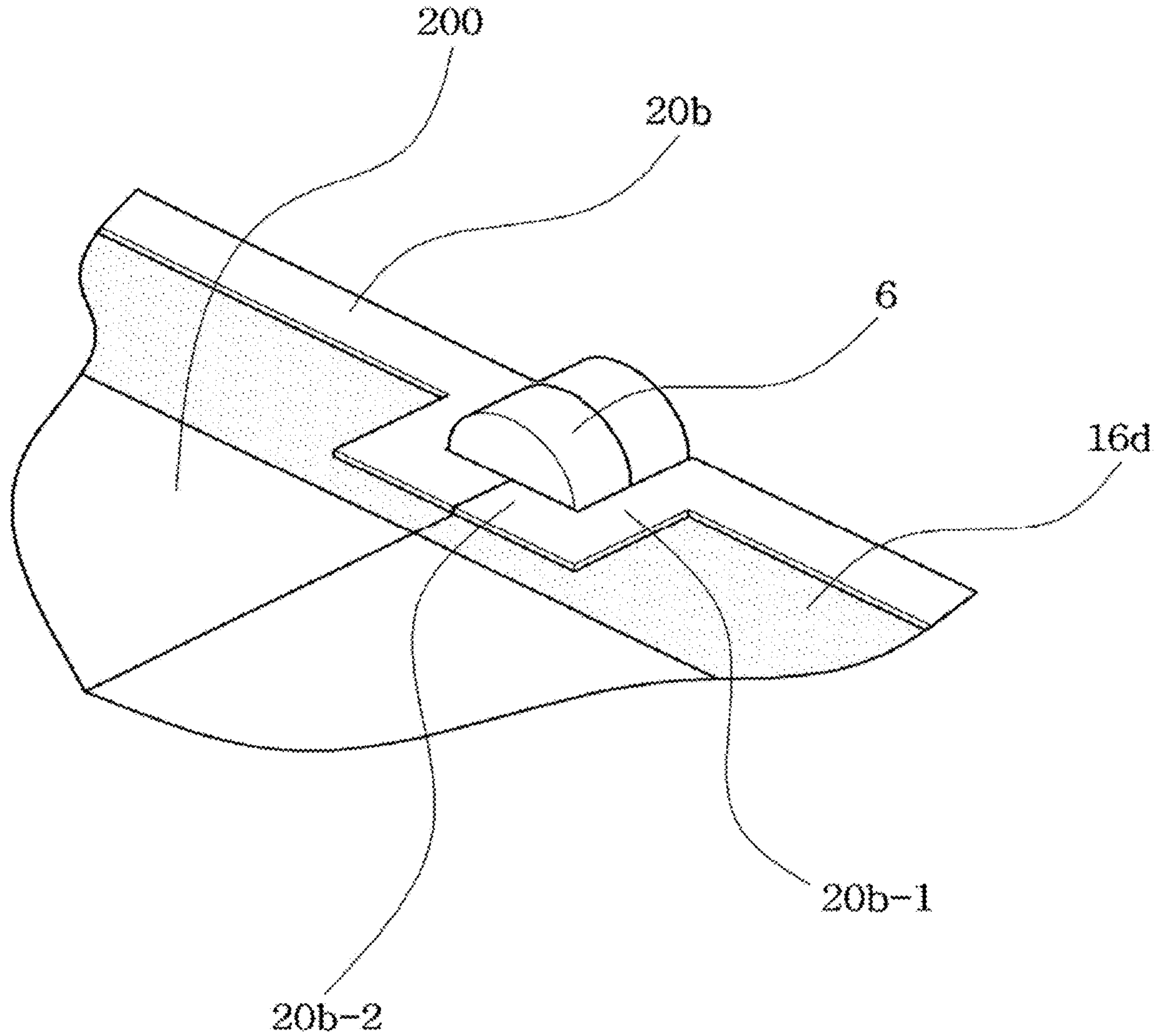
FIG. 44 is a diagram illustrating an embodiment of the invention where a frame is formed around a shaft.

FIG. 44 is a diagram illustrating an embodiment where a frame is formed around a shaft.

According to the embodiment of FIG. 44, frames 20*b*-1 and 20*b*-2 are formed around a shaft. In the frame 20*b* of which the side corresponding to the joint 8 is opened, the coupling force between the frame 20*b* and the panel housing 20 in the joint may be weakened. The frame is formed to extend around the shaft for the purpose of the weakening of the coupling force.

Embodiment 9

FIGS. 45 to 49 are diagrams illustrating embodiments where a side wall is formed in a frame. These figures show a cross-sectional view taken along a direction B as shown in FIGS. 30 and 34. The cover side wall 24*d* further extends in direction B.

Figure 45:
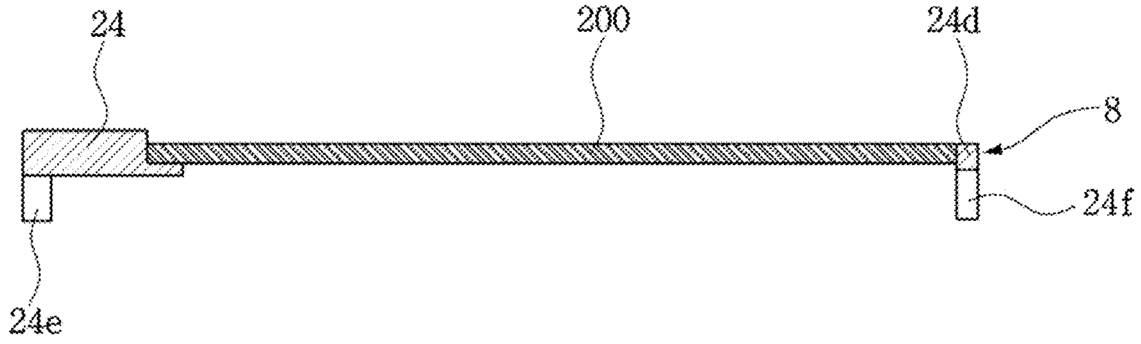
FIGS. 45 and 46 are diagrams illustrating an embodiment of the invention where a side wall extends from the frame.

According to the embodiment of FIG. 45, a joint side wall 24*f* extending from the cover side wall 24*d* is formed in the joint and an extension side wall 24*e* is formed on the side wall opposite to the joint.

The joint side wall 24*f* extending in the joint cover a part or all of the side surface of the display panel 2.

Only one of the extension side wall 24*e* and the joint side wall 24*f* may be formed.

The extension side wall 24*e* may be formed as a single body along with the cover and the joint side wall 24*f* may be formed as a single body along with the cover side wall 24*d*.

Figure 46:
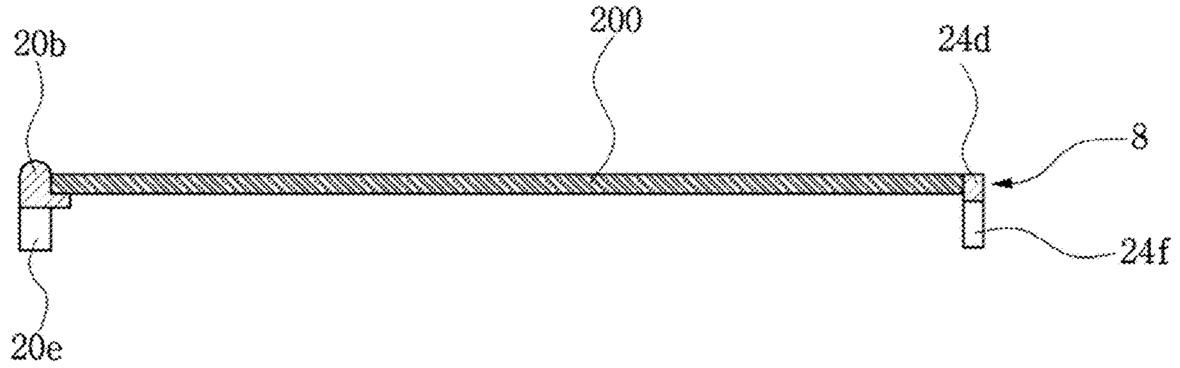

According to the embodiment of FIG. 46, an extension side wall 20*e* and a joint side wall 24*f* are formed in the frame 20*b* and may have the same structure as shown in FIG. 45.

Figure 47:
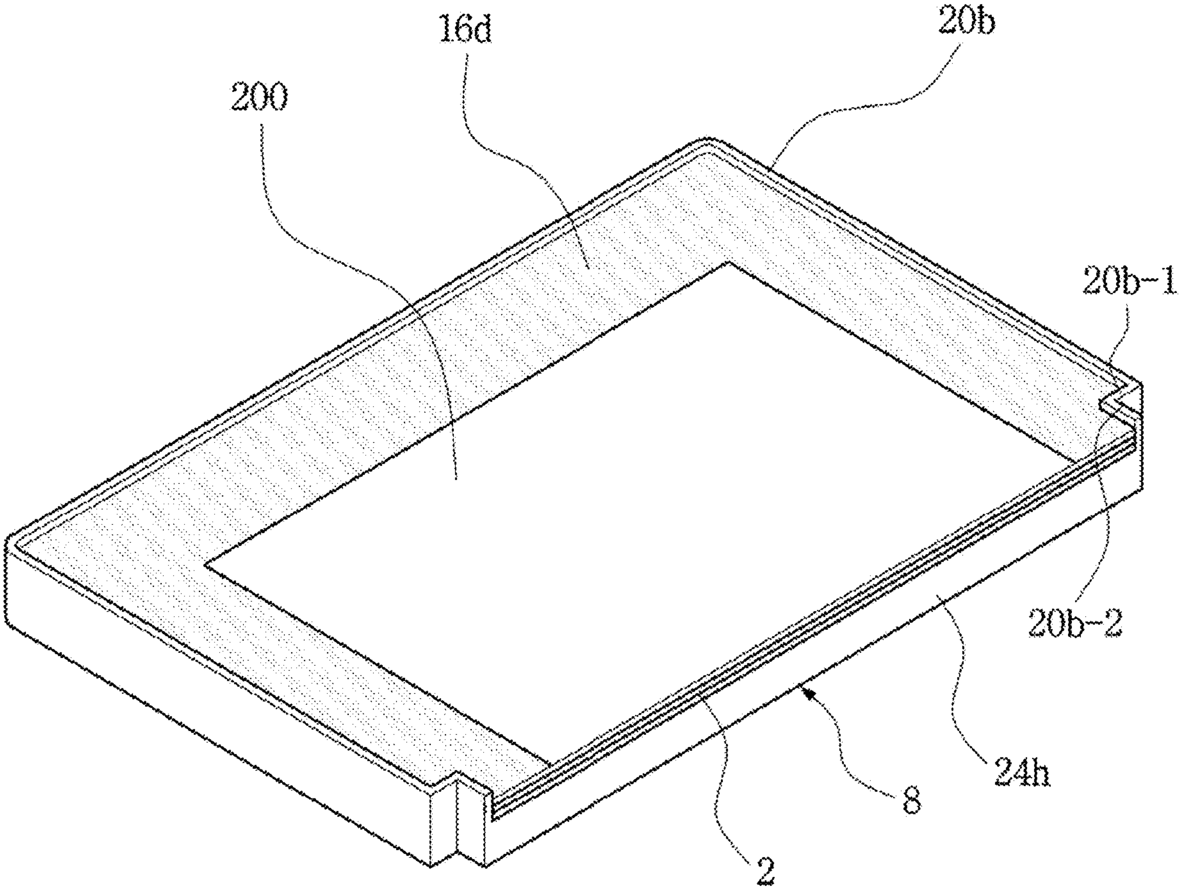
FIGS. 47 to 49 are diagrams illustrating an embodiment of the invention where a cover and a frame have a side wall portion.
Figure 48:
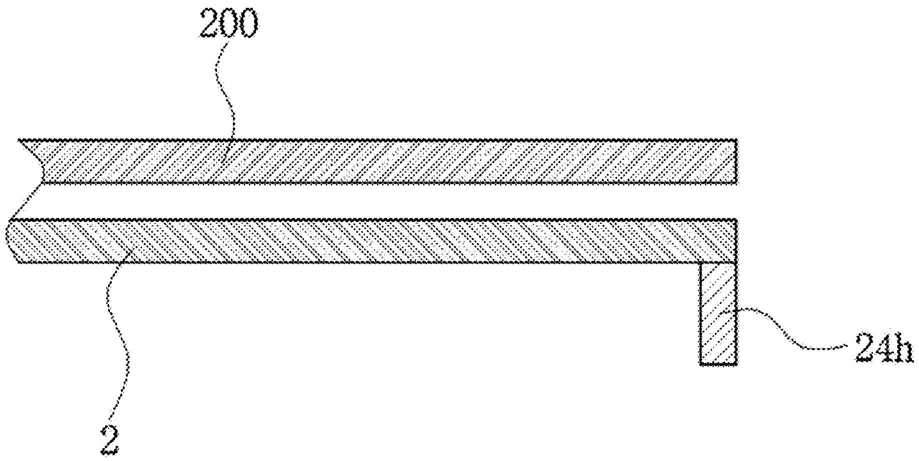
Figure 49:
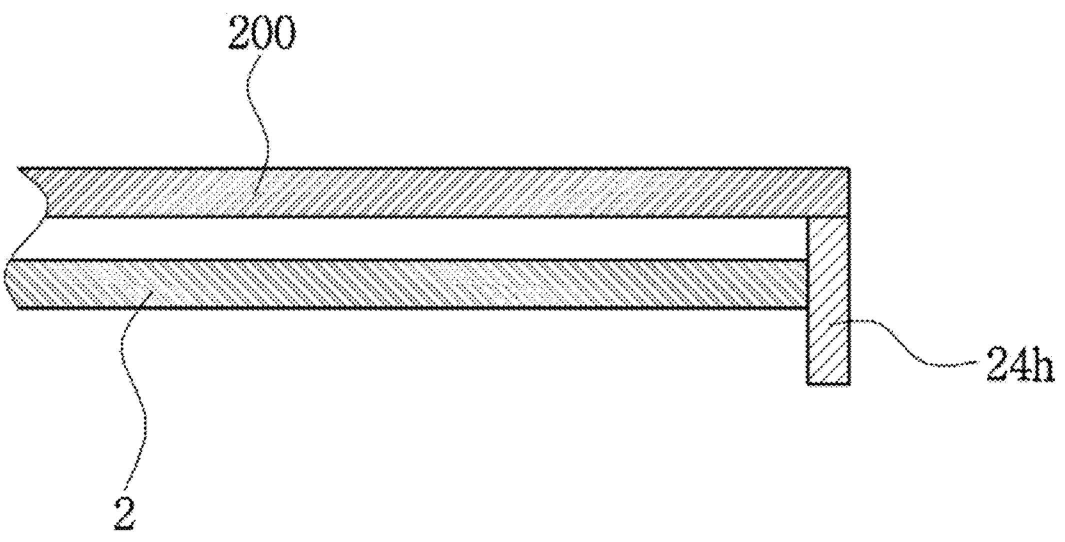

FIGS. 47 to 49 are diagrams illustrating an embodiment where a side wall is formed in the cover and the frame.

According to the embodiment of FIGS. 47 to 49, the sides of the cover frame 24 and the frame 20*b* corresponding to the joint may be opened. Accordingly, the coupling force to the panel housing may be weakened and the frame side wall 24*h* is provided to solve this problem. The frame side wall 24*h* is formed as a single body along with the frame.

According to the embodiment of FIG. 47, the side wall 24*h* is formed in the cover frame 24.

According to the embodiment of FIG. 48, a display panel is mounted on the side wall 24*h* of the frame 20*b*.

According to the embodiment of FIG. 49, a display panel is disposed on the side surface of the side wall 24*h* of the frame 20*b*.

The thickness, material, level difference, and the like of the side walls of the panel housings 20 and 40 in the joint can be applied to the side wall of the embodiment of FIGS. 45 to 49.

Embodiment 10

FIGS. 50 to 54 are diagrams illustrating an embodiment where an optical member is disposed on an input unit.

Figure 50:
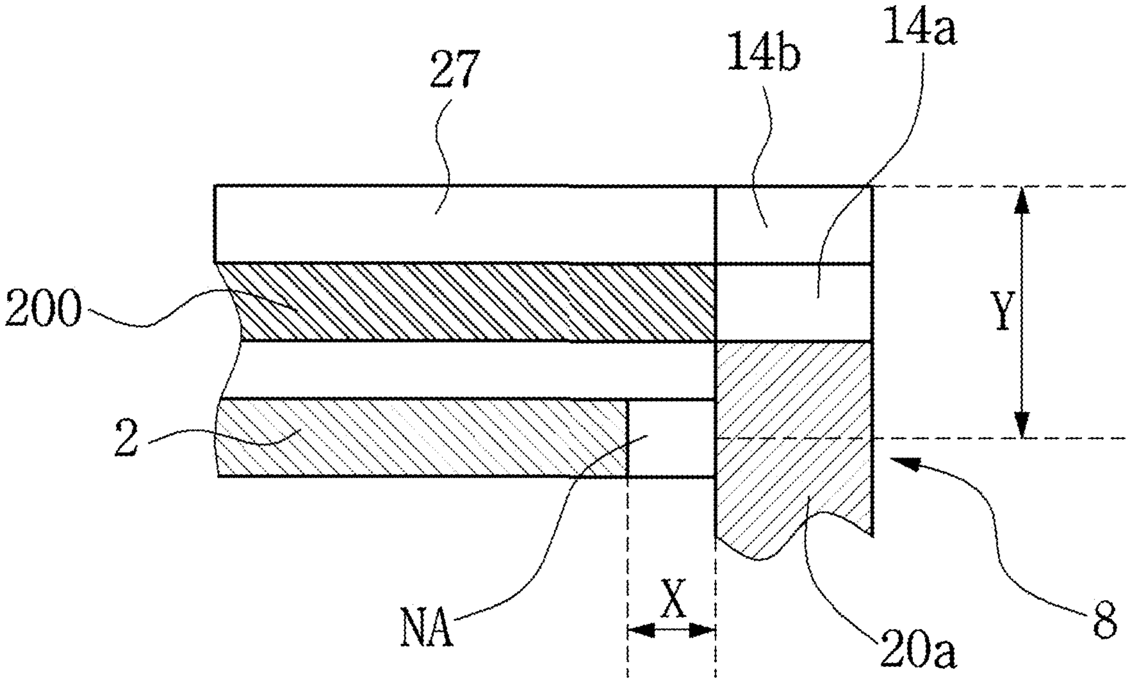
FIGS. 50 to 54 are diagrams illustrating an embodiment of the invention where an optical member is disposed on an input unit.

According to the embodiment of FIG. 50, a non-display area (represented by NA in the drawing) is shown in the display panel 2. The non-display area of the joint in the portable display device includes the non-display area NA in the display panel 2 or 4 and a joint portion 20*a* (which may further include a chassis or protection means which is excluded to explain an embodiment where the non-display area is optically compensated for).

The non-display area of the portable display device is compensated for by the optical member 27.

In FIG. 50, the non-display area of the display panel 2 is compensated for.

Figure 51:
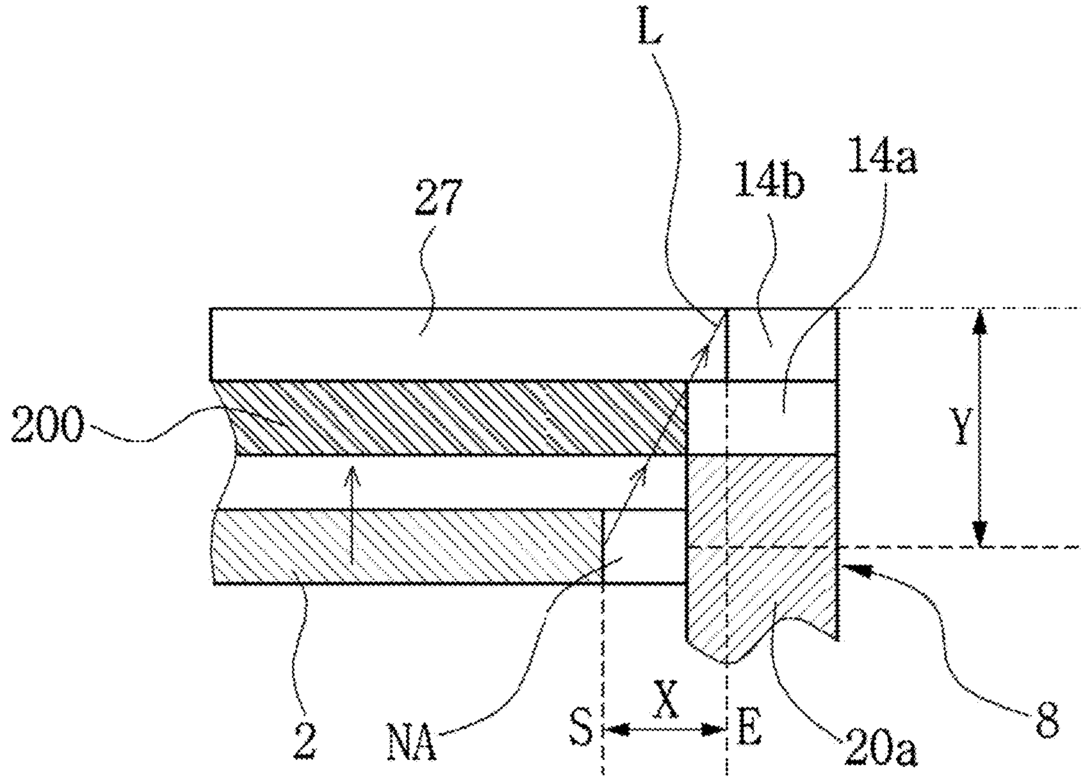
Figure 52:
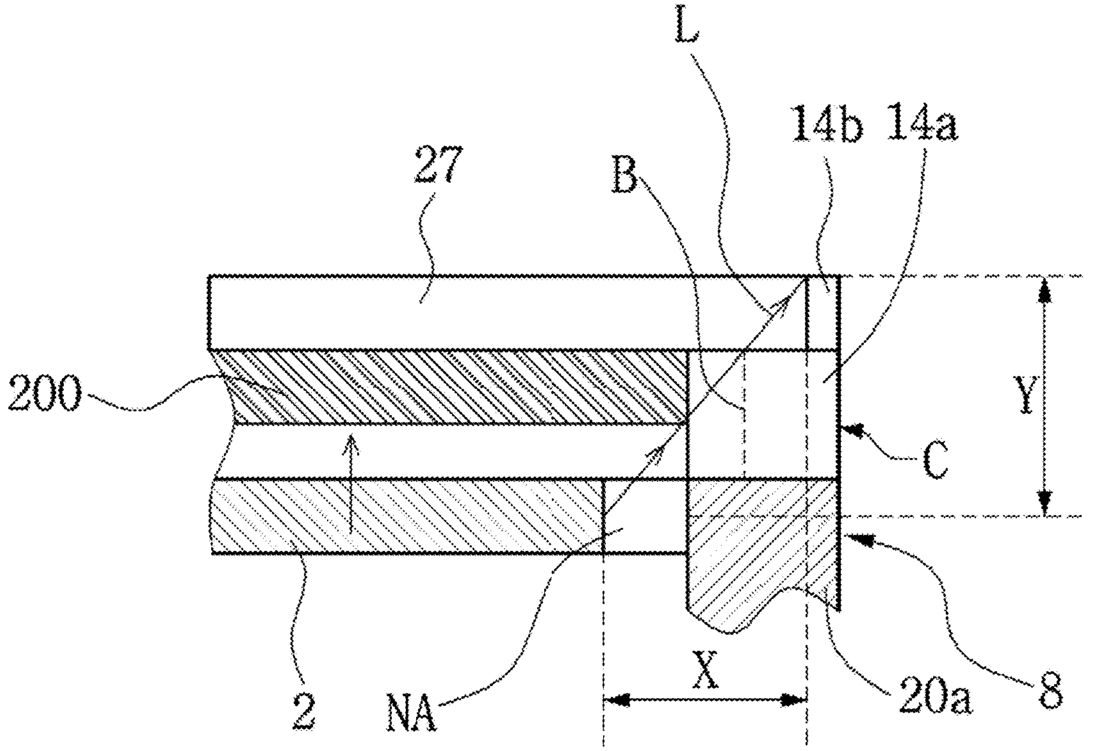

FIGS. 51 and 52 show an embodiment where the thickness of the protection means 14*b* protecting the side surface of the optical member is further reduced.

According to the embodiment of FIG. 51, a path L of light is shown.

The non-display area of the display panel 2 and a part of the joint portion 20*a* (which may further include the side wall of a panel housing, protection means, and an extension of a cover or a frame) are compensated for.

The distance between the display panel and the optical member is defined as Y. Since an image is displayed at the center of the display panel, the distance Y is measured from the center of the display panel. X is a value compensated for by the optical member. Conclusively, the optical member is designed on the basis of the X value and the Y value.

According to the embodiment of FIG. 52, the protection means 14*a* for protecting the side surface of the input unit 200 is formed of a transparent material. Here, a light path L passes through the protection means 14*a* for protecting the side surface of the input unit. Then, the distance X compensated for by the optical member 27 is as shown in the drawing.

When the protection means 14*a* is formed of a transparent material, the side surface (represented by C in the drawing) of the protection means is coated with a specific colorant or a thin film having a specific color. The color with which the side surface of the protection means 14*a* is coated is preferably similar to the color of the side wall of the panel housings, but may be different therefrom depending on the design.

The part (represented by a boundary B in the drawing) of the protection means 14*a* through which the light path L passes can be formed of a transparent material such as reinforced glass or reinforced plastic and the other part can be formed of a reinforcement material such as alloy, thereby enhancing the reliability.

Figure 53:
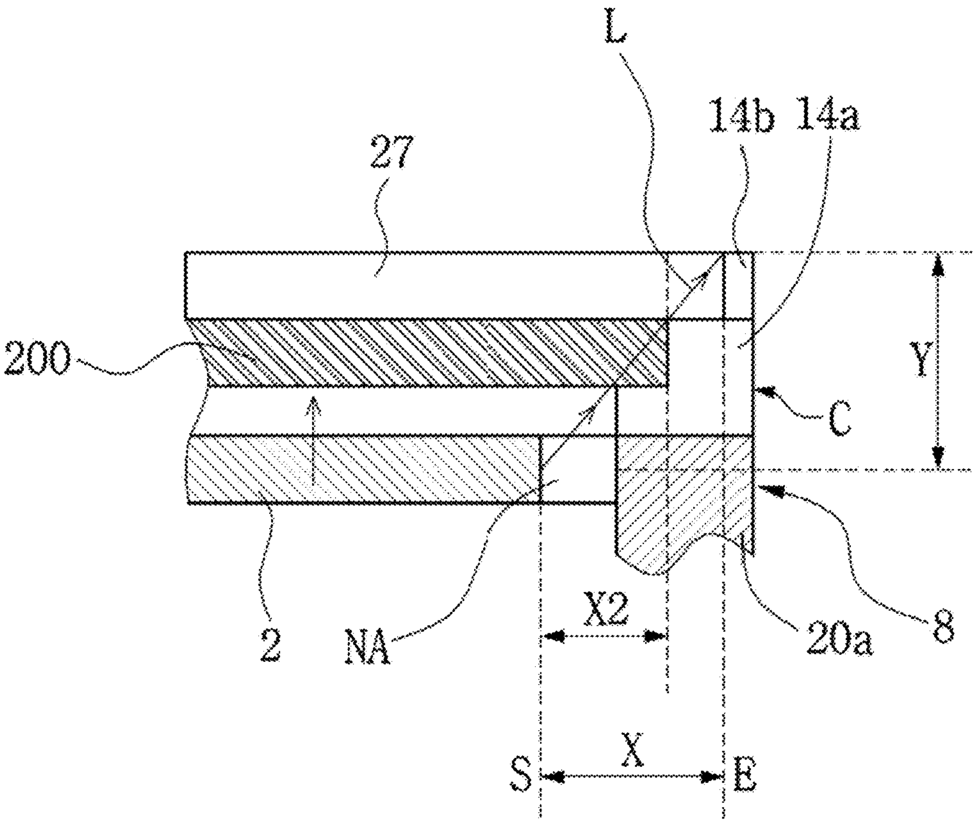

FIG. 53 shows an embodiment where the protection means 14*a* for protecting the side surfaces of the input units 200 and 400 is thinner. That is, the protection means 14*b* for protecting the side surface of the optical member 27 is thinner than the protection means 14*a* for protecting the input unit 200. In this case, the X value and the Y value are the same as shown.

When the thickness of the protection means 14*b* for protecting the optical member 27 is equal to the thickness of the protection means 14*a* for protecting the input unit 200, the X value is X2.

Figure 54:
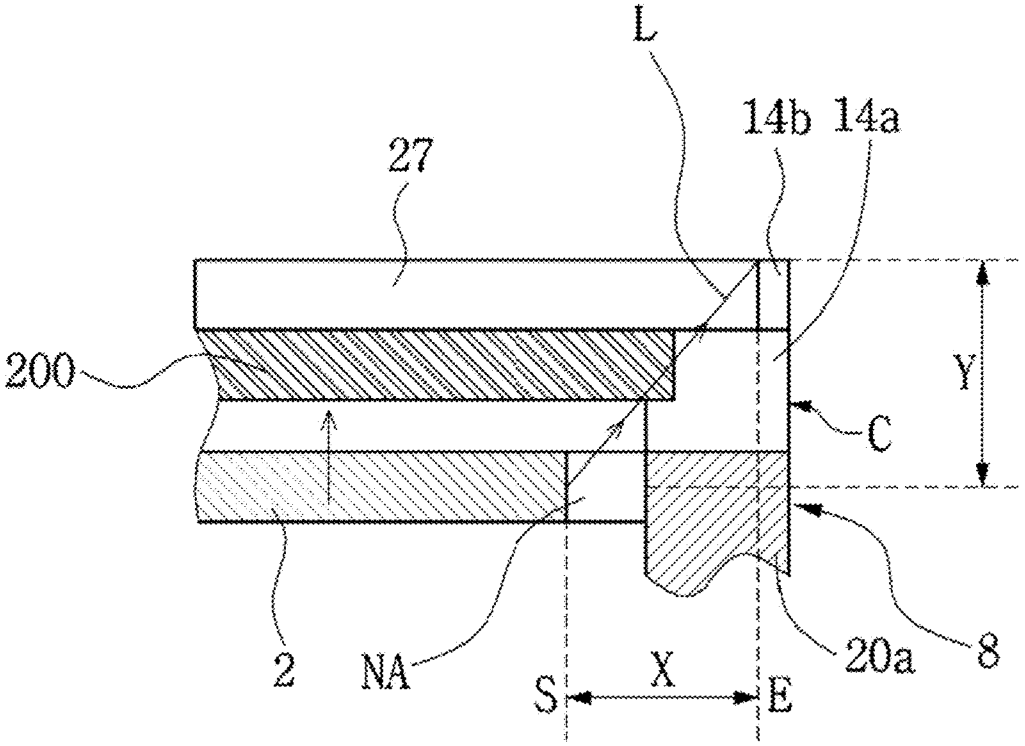

FIG. 54 is a diagram illustrating an embodiment where the light path L passes through the protection means 14*a* for protecting the input unit 200. In this embodiment, the X value and the Y value are the same.

The protection means 14*a* may again be transparent, similarly to the above-mentioned embodiments.

Figure 55:
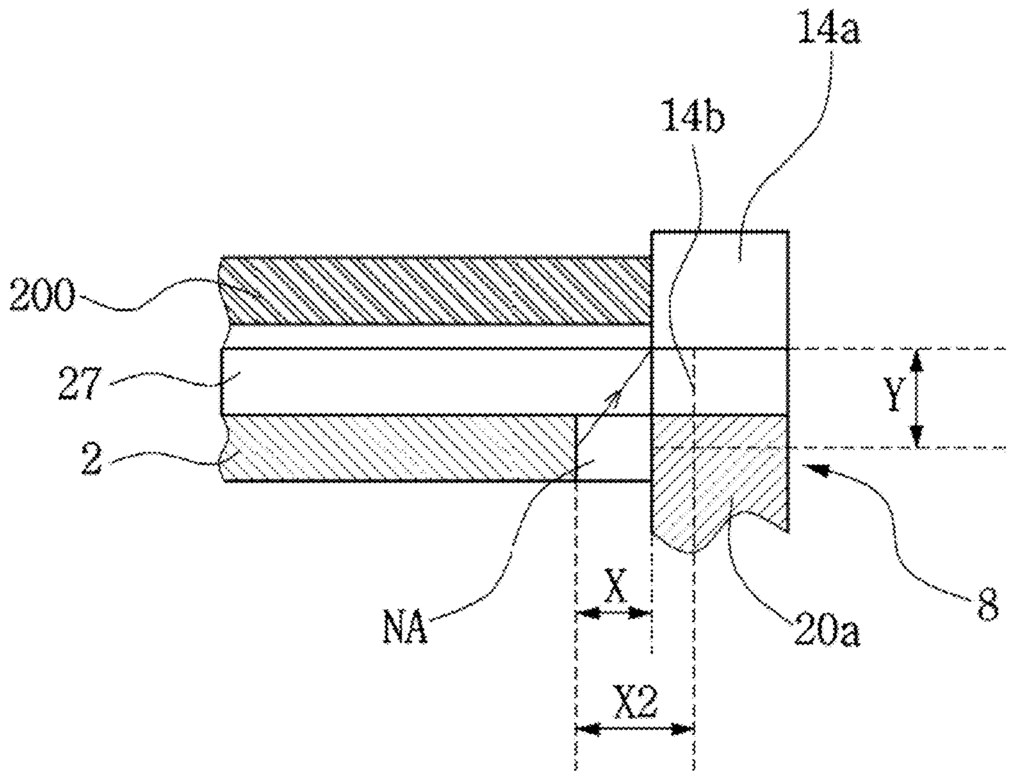
FIGS. 55 and 56 are diagrams illustrating an embodiment of the invention where an optical member is disposed between a display panel and an input unit.
Figure 56:
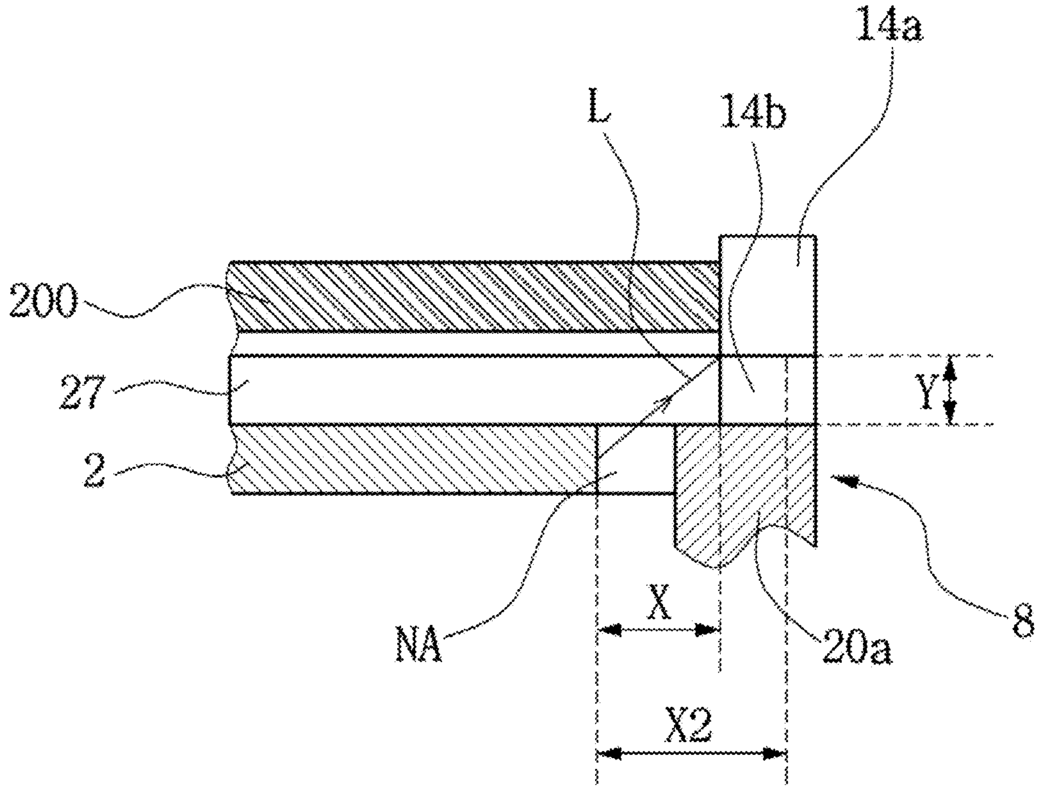

FIGS. 55 and 56 are diagrams illustrating an embodiment where an optical member is disposed between a display panel and an input unit.

According to the embodiment of FIG. 55, the thickness of the joint portion 20*a* protecting the side surface of the display panel is equal to the thickness of the protection means 14*a* for protecting the side surface of the input unit. In this case, the X value and the Y value are determined as shown.

Alternatively, the thickness of the protection means 14*b* for protecting the side surface of the optical member 27 may be smaller than that of the joint portion 20*a*. In this case, the X value is X2.

FIG. 56 is a diagram illustrating another embodiment of FIG. 55. According to this embodiment, the thickness of the protection means 14*a* for protecting the side surface of the input unit 200 is smaller than that of the joint portion 20*a* protecting the side surface of the display panel 2. In this case, the X value and the Y value are determined as shown.

On the other hand, the thickness of the protection means 14*b* for protecting the optical member may be smaller than that of the protection means 14*a* for protecting the side surface of the input unit. In this case, the X value is X2.

In this disclosure, the expression "a thickness is equal to another thickness" includes an error of +1 mm. The error is preferably less than +0.1 mm. However, even when the error increases to +1 mm, it does not mean that it exceeds the scope of the invention.

Figure 57:
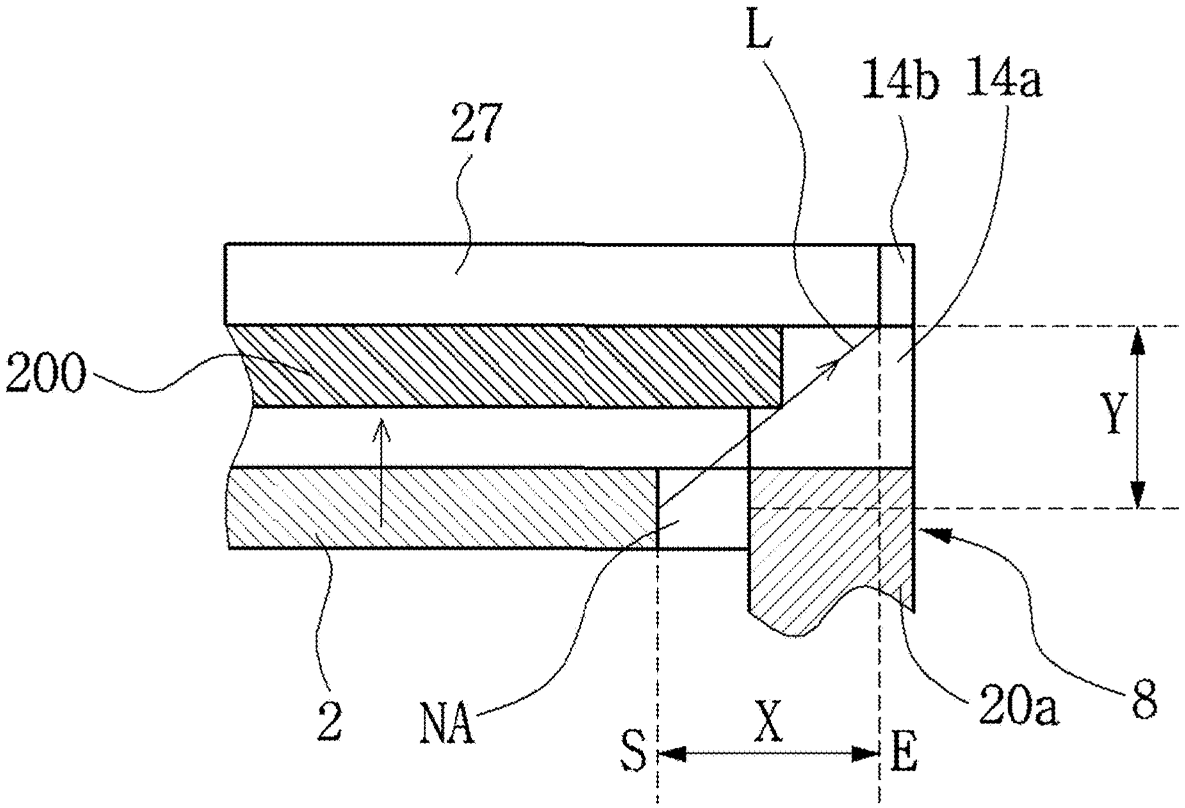
FIG. 57 is a diagram illustrating a Y value according to an embodiment of the invention.

FIG. 57 is a diagram illustrating an example of the Y value according to an embodiment of the invention.

When the optical member is formed of a single plate, a micro lens having an optical function may be located on the plate or may be located under the plate, as shown in the embodiment of FIG. 57. Then, the Y value is measured up to the bottom of the optical member 27. This may also be true of the embodiments of FIGS. 50 to 56.

When the thickness of the optical member is less than 0.3 mm or is several micrometers, the Y value does not vary, without depending on whether a tilted structure is located on or under the optical member.

Figure 58:
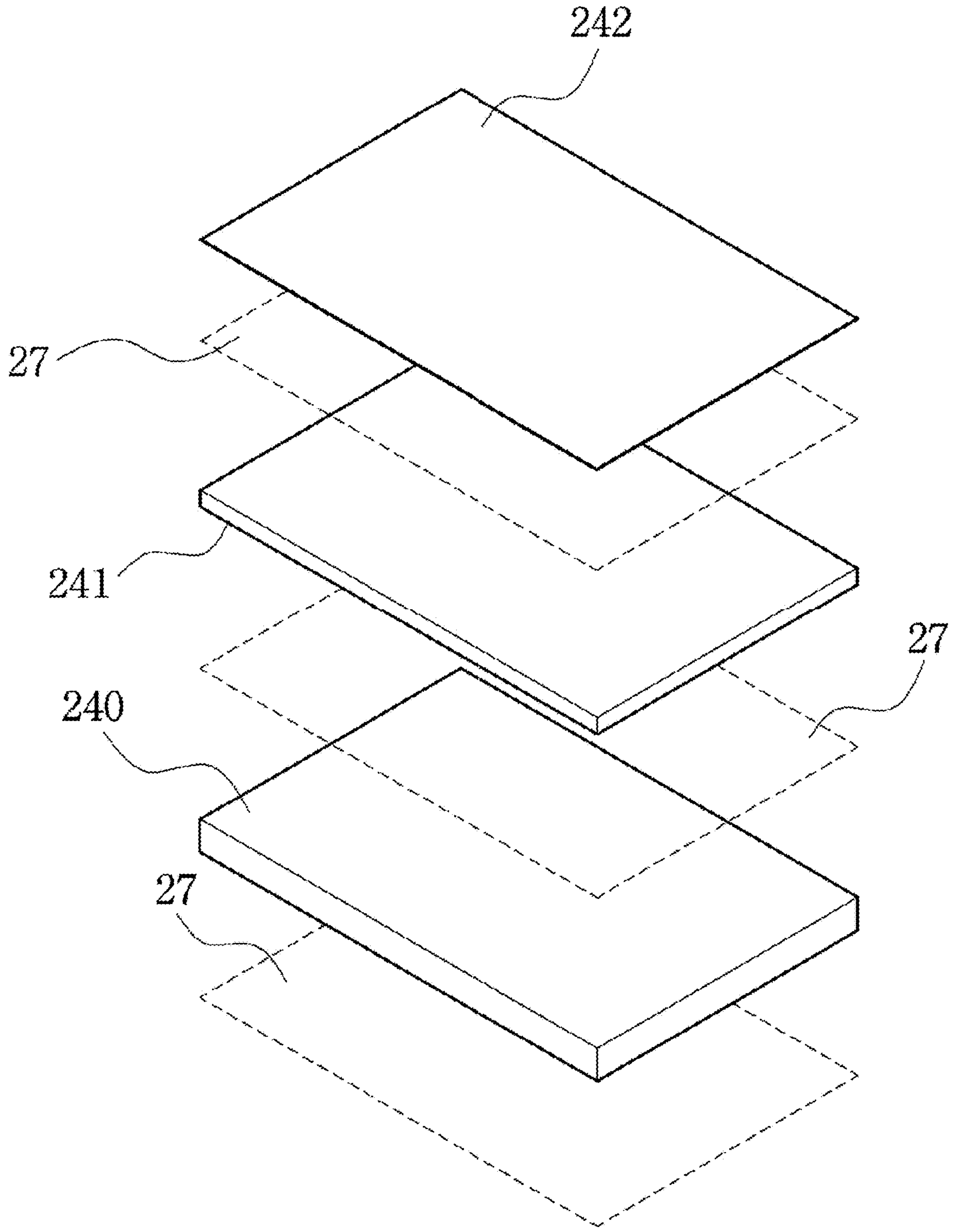
FIG. 58 is a diagram illustrating an embodiment of the invention where an optical member is disposed in an input unit.

FIG. 58 is a diagram illustrating an embodiment where an optical member is disposed in an input unit.

According to the embodiment of FIG. 58, the optical member can be disposed in the form of a film in the input unit including several plates or films. The positions in which the optical member can be disposed is represented by dotted lines.

That is, a protective plate may be disposed in the input unit and the optical member may be disposed on the surface of the protecting plate.

Embodiment 11

Figure 59:
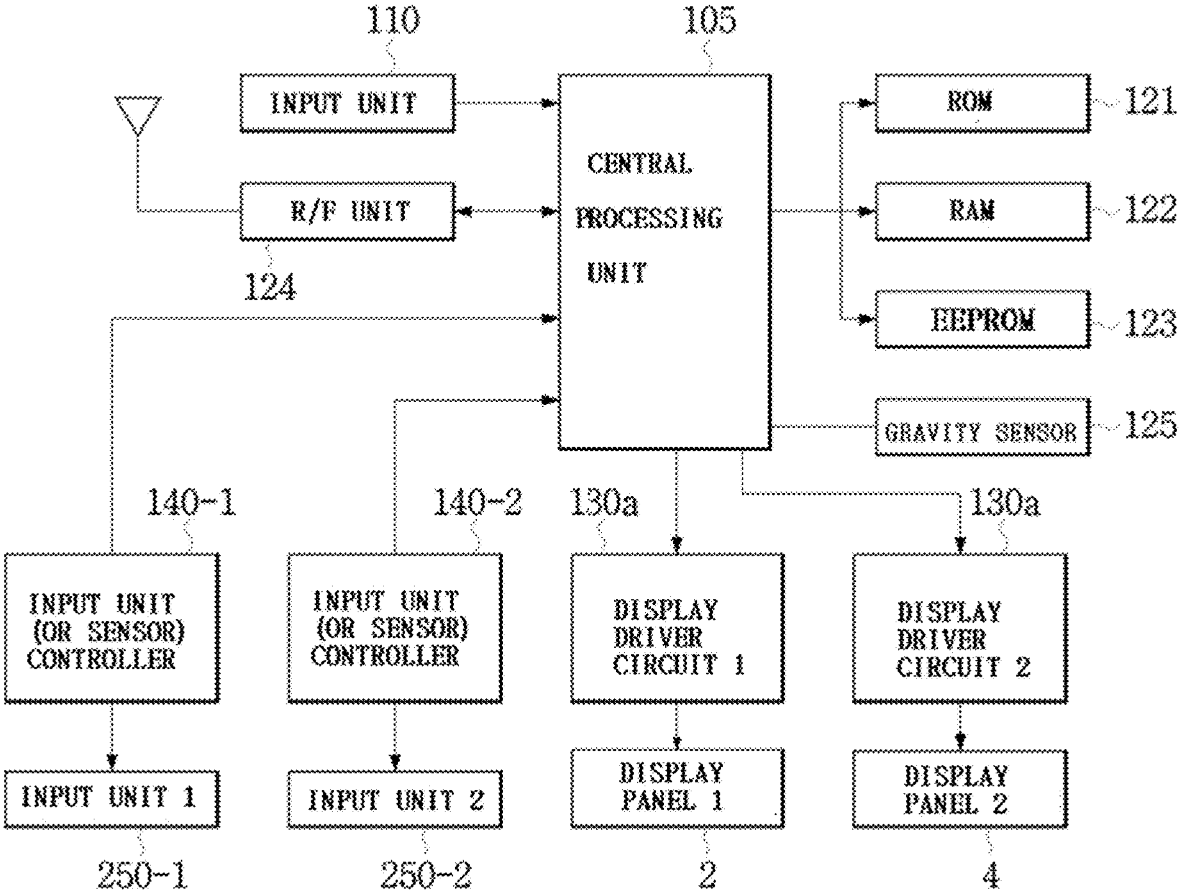
FIGS. 59 to 61 are block diagrams of an embodiment of the invention.
Figure 60:
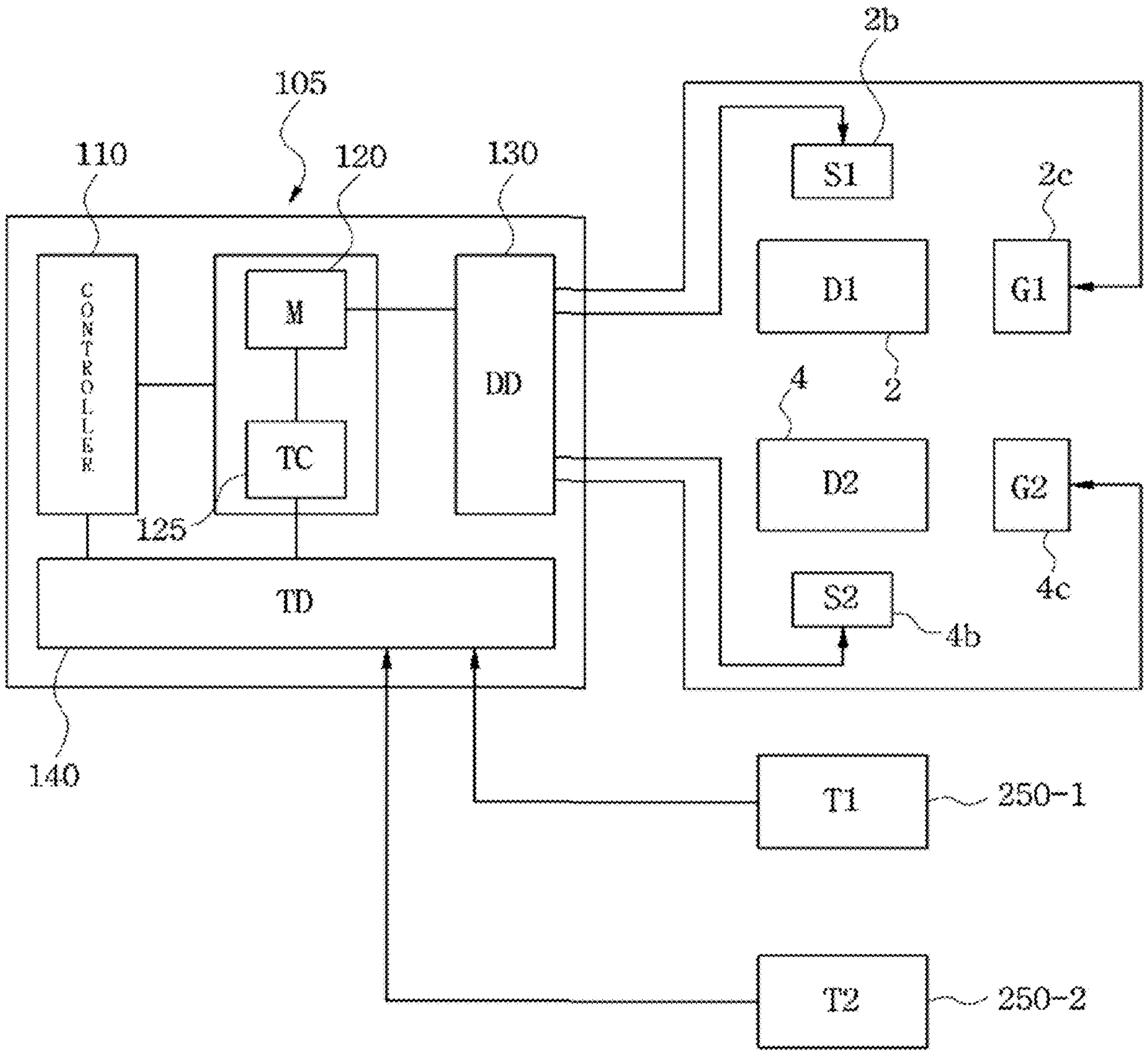
Figure 61:
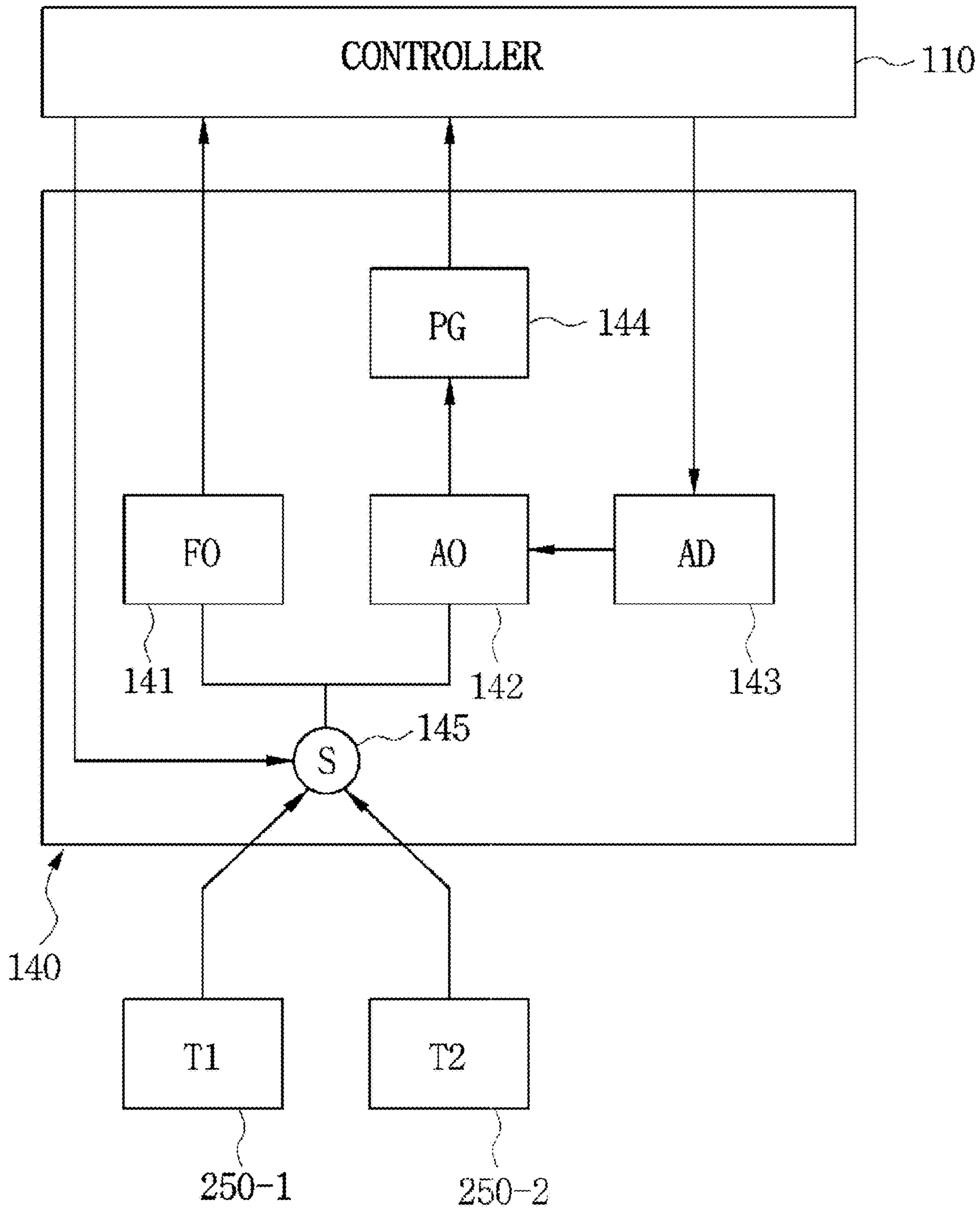

FIGS. 59 to 61 are block diagrams of a portable display device according to an embodiment of the invention.

According to this embodiment, the portable display device includes two display panels 2 and 4 and two input units 250-1 and 250-2, and input units are disposed on the display panels.

The input units may employ the input units 200 and 400 described various previous embodiments, or may be the input sensor shown in FIG. 4.

FIG. 59 is a block diagram illustrating the configuration of the portable display device according to an embodiment of the invention and shows a control flow of the display panels and the input units.

According to the embodiment of FIG. 59, a central processing unit 105 is a control unit that controls the overall operation of the portable display device. A ROM 121 controls programs executed by the display device, a RAM 122 stores data generated at the time of executing the programs, and an EEPROM 123 stores data necessary for a user or data necessary for processing the data.

The R/F unit 124 tunes an RF channel as a radio frequency, amplifies an input sound signal, and converts an RF signal received via an antenna into an intermediate frequency signal. An input unit 110 includes various input devices, ten keys, a menu key, and a selection key.

Display driving circuits 130*a* serve to drive the display panels on the basis of the output of the central processing unit 105. The first and second display panels 2 and 4 display information on the screens on the basis of the output signal of the driving circuits.

The display device further includes a gravity sensor 235 that determines whether two display panels 2 and 4 are located vertically or horizontally. That is, the central processing unit 105 determines whether two display panels 2 and 4 are arranged vertically or horizontally on the basis of the input signal from the gravity sensor 235. This determination is performed on the basis of the output of the gravity sensor by the use of a predetermined program.

The central processing unit controls the first and second input units 250-1 and 250-2 through the use of first and second input unit controllers 140-1 and 140-2. That is, since two input units 250-1 and 250-2 are disposed, two input unit controllers 140-1 and 140-2 are also disposed to control the corresponding input units.

In the embodiment shown in FIG. 4, the input unit controllers 140-1 and 140-2 are replaced with sensor controllers. The first and second input units are replaced with first and second sensors. The first and second sensors are sets of sensors disposed in the first display panel and the second display panel.

FIG. 60 shows another block diagram according to an embodiment of the invention.

According to the embodiment of FIG. 60, a central processing unit or a main controller 105 includes a control unit 110, a memory 120, a time controller 125, a display driver 130, and an input unit driver 140.

That is, a single component can be manufactured in which elements serving as the control unit 110, the memory 120, the time controller 125, the display driver 130, and the input unit driver 140 are all disposed in the main controller 105.

The display driver 130 supplies data, which an image is divided into, to the first display panel 2 and the second display panel 4. The input unit driver 140 corrects and adjusts signals to be output to the first input unit 250-1 and the second input unit 250-2.

To display an image on the display panels 2 and 4, source units 2*b* and 4*b* supplying data signals and gate units 2*c* and 4*c* supplying line selection signals are provided.

When dividing an image, a source signal and a gate signal can be divided. The signals may be divided at a ratio of 1:1, or may be divided at various ratios such as 2:1, 1.5:1, and 3:1. That is, the number of lines of the first display panel and the number of lines of the second display panel may be different from each other.

FIG. 61 is a diagram illustrating the input unit driver 140 in detail according to an embodiment of the invention.

According to the embodiment of FIG. 61, a calibration function executing unit 141 executes a function of calibrating the input units 250 at the time of starting up the system. A panel (part of the input unit to which information is directly input) signal corresponding to a correct coordinate value in the input units 250 is selected by the calibration function executed by the calibration function executing unit 141.

That is, the signal of the input unit 250 corresponding to the coordinate value is selected depending on the resolution (the numbers of source and gate lines) of the display panels 2 and 4, and the selected signal is supplied to the control unit 110. Accordingly, the control unit 110 stores and manages the coordinate value corresponding to the panel signal.

An average detection number adjusting unit 143 adjusts the number of times of detecting an average value for the panel signals output from the input unit 250 on the basis of the screen resolution information of the display panels 2 and 4 supplied from the control unit 110.

An average value detector 142 detects the average value of the panel signals transmitted from the input units 250 on the basis of the number of times of detecting an average value, which is adjusted by the average detection number adjusting unit 143. The detected average value is transmitted to a panel signal generator 144.

The panel signal generator 144 generates an adjusted panel signal on the basis of the changed screen resolution of the display panels 2 and 4 supplied from the control unit 110 or the position information of the display screen changed by a virtual scroll and the average value of the presently-input panel signal.

Since there are the first input unit 250-1 and the second input unit 250-2 in the invention, the input unit driver 140 performs the signal control on the first input unit 250-1 and the signal control on the second input unit 250-2.

That is, under the control of the time controller 125 and the control unit 110, a switching element 145 alternately connects the first input unit 250-1 and the second input unit 250-2 to the input unit driver 140.

Instead of using the switching element 145, input unit drivers corresponding to the number of the input units may be provided.

FIG. 61 shows an input unit which is used in an embodiment of the invention. However, the invention is not limited to the method performed by the input unit in FIG. 61, but can use any method of controlling the input unit as long as it is a method of controlling the input unit or input means.

Figure 62:
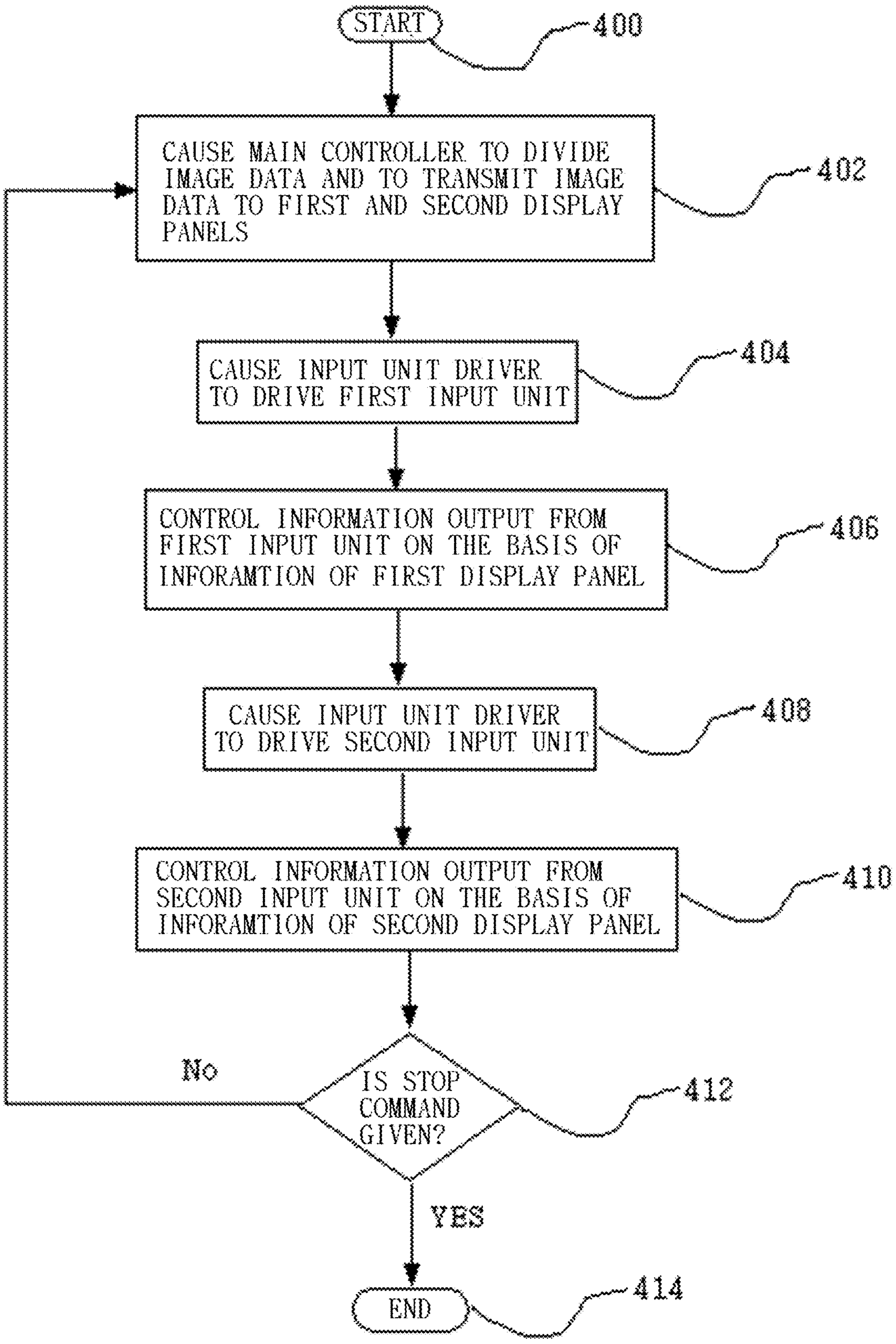
FIG. 62 is a flowchart of the process of an embodiment of the invention.

FIG. 62 is a flowchart illustrating the flow of processes according to an embodiment of the invention.

According to the embodiment of FIG. 62, when the portable display device is started up, the main controller 105 is started up to control the units thereof (400).

Accordingly, the main controller 105 divides an image and transmits the corresponding image data to the first display panel and the second display panel (402).

Then, the input unit driver 140 drives the first input unit 250-1. That is, information output from the first input unit is controlled (404). The information output from the first input unit is controlled on the basis of the image display information of the first display panel 2 (406).

Similarly, the input unit driver controls the output signal of the second input unit (408), and controls the output signal of the second input unit on the basis of the image display information of the second display panel (410).

When a stop command is not given, the main controller again divides an image and drives the respective input units (returning to 402). When a stop command is given, such functions are ended (412 and 414).

That is, the input unit driver in the invention controls the information output from the first input unit on the basis of the screen information of the first display and controls the information output from the second input unit on the basis of the screen information of the second display. By causing the input unit driver to repeatedly perform such control, two input units can be controlled as if they are a single input unit.

Embodiment 12

FIGS. 63 to 67 are diagrams illustrating an example of an input method according to an embodiment of the invention.

Figure 63:
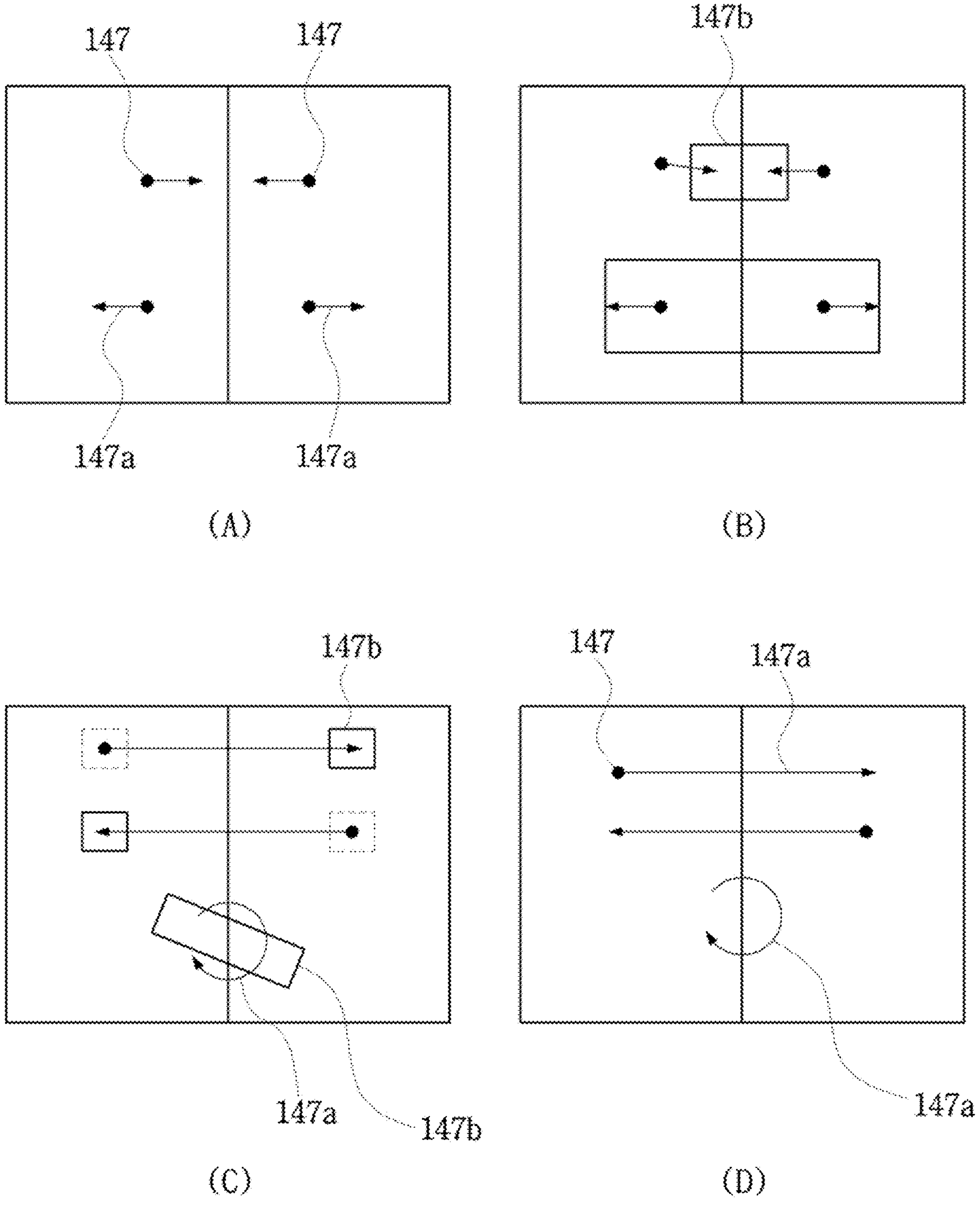
FIGS. 63 to 67 are diagrams illustrating an input method according to an embodiment of the invention.
Figure 64:
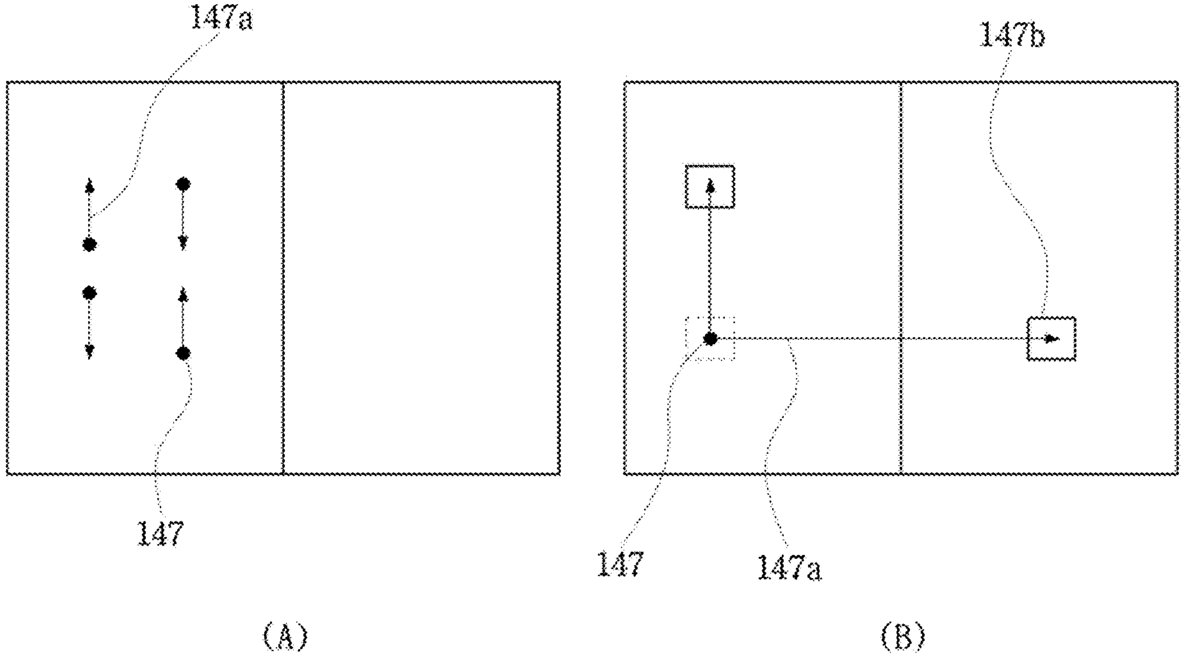

FIGS. 63 and 64 show an embodiment where information is inputted to the surface of the display panels 2 and 4 of the display device. FIG. 63 shows an embodiment where information is inputted in a single-screen mode in which two screens are used as a single screen. FIG. 64 shows an embodiment where information is inputted in a two-screen mode in which two screens are individually used.

According to the embodiment of FIG. 63, a point means a coordinate point in an input unit which is generated by designating a specific point in a screen to input information.

Specifically, in (A) of FIG. 63, two or more input points 147 are recognized and paths 147*a* in which the points 147 move are also recognized. Even when two points are present in each screen, the points are recognized as if they were present in a large single screen.

It is assumed that the screen is reduced when two points move inward and the screen is enlarged when two points move outward, in accordance with a predetermined program. Then, the central processing unit 105 or the control unit 110 transmit screen information, which indicates that the screen is enlarged or reduced with the movement 147*a* of two points 147, to the display drivers 130*a* and 130*a*. That is, two screens form a single screen and the single screen is enlarged or reduced.

In (B) of FIG. 63, a pattern (or an image) 147*b* which are present over two screens is selected using two points.

It is assumed that the pattern (or image) 147*b* is reduced when two points used to select the pattern or image move inward and the pattern (or image) is enlarged when two points move outward, in accordance with a predetermined program. Then, the central processing unit 105 or the control unit 110 transmits screen information, which represents that the pattern (or image) is enlarged or reduced with the movement of two points 147, to the display drivers 130*a* and 130*a*.

In (C) of FIG. 63, a pattern (or image) 147*b* is selected using a point 147, and the pattern (or image) 147*b* moves along the moving path of the point 147 when the point moves.

Similarly, when the movement is programmed, the central processing unit 105 or the control unit 110 causes the pattern (or image) 147*b* to move with the movement of the point, as if the movement of the pattern (or image) 147*b* occurred in a single screen.

In (C) of FIG. 63, the point 147 moves horizontally and rotates. At the time of rotation, the selected pattern (or image) 147*b* can be made to rotate.

In (D) of FIG. 63, a single point 147 moves. Even when the moving path 147*a* is present over two screens, the point is displayed to move in a single screen.

When a screen is programmed to change depending on the moving path of a point, the central processing unit 105 or the control unit 110 transmits information on the previous screen or the subsequent screen based on the movement of the point to the display drivers 130*a* and 130*a* so as to display a screen.

When the moving path 147*a* of the point 147 rotates, the screen can also be made to rotate.

FIG. 64 is a diagram illustrating an embodiment where information is inputted in a two-screen mode.

According to the embodiment of (A) of FIG. 64, when a point 147 moves on one screen, the result is displayed on only one screen along the moving path 147*a*.

On the screen, two points 147 can move inward or outward. The screen can be reduced or enlarged with the movement of two points. When a pattern (or image) is selected, the selected pattern (or image) 147*b* can be reduced or enlarged.

The movement result of the points is displayed on one screen.

According to the embodiment of (B) of FIG. 64, one pattern (or image) 147*b* is selected on one screen. The pattern (or image) 147*b* can move in one screen or can move to the other screen along the moving path 147*a* of the pattern 147.

Figure 65:
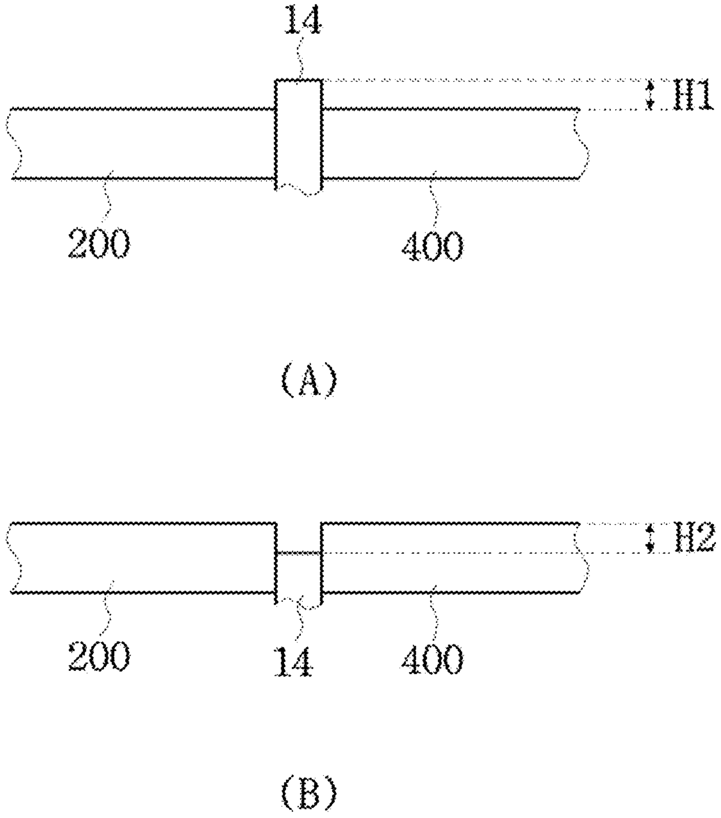

FIG. 65 is a diagram illustrating an embodiment where the height of the protection means 14 between two input units 200 and 400 (or two protective plates) is defined.

According to the embodiment of FIG. 65, the side walls of the panel housings 20 and 40 may be used instead of the protection means 14, or the cover side wall 24*d* or the side wall extension 24*a* extending from the cover frame (or frame) may be used.

That is, the height H1 in the drawing represents the height of the protection means (the cover side wall or the side wall extension). In the invention, when information is inputted onto the display panels 2 and 4, an input point moves over two display panels 2 and 4. Accordingly, when the height H1 is excessively large, it causes inconvenience to the information input.

When the protection means (or the side wall or the side wall extension) has a height smaller than that of the input unit (or the protective plate), the difference therebetween is defined as H2.

In this embodiment, the value of H1 or H2 is preferably set to be less than 2 mm or 3 mm, respectively. Both values are more preferably set to 0 mm or a value closer to 0 mm.

Figure 66:
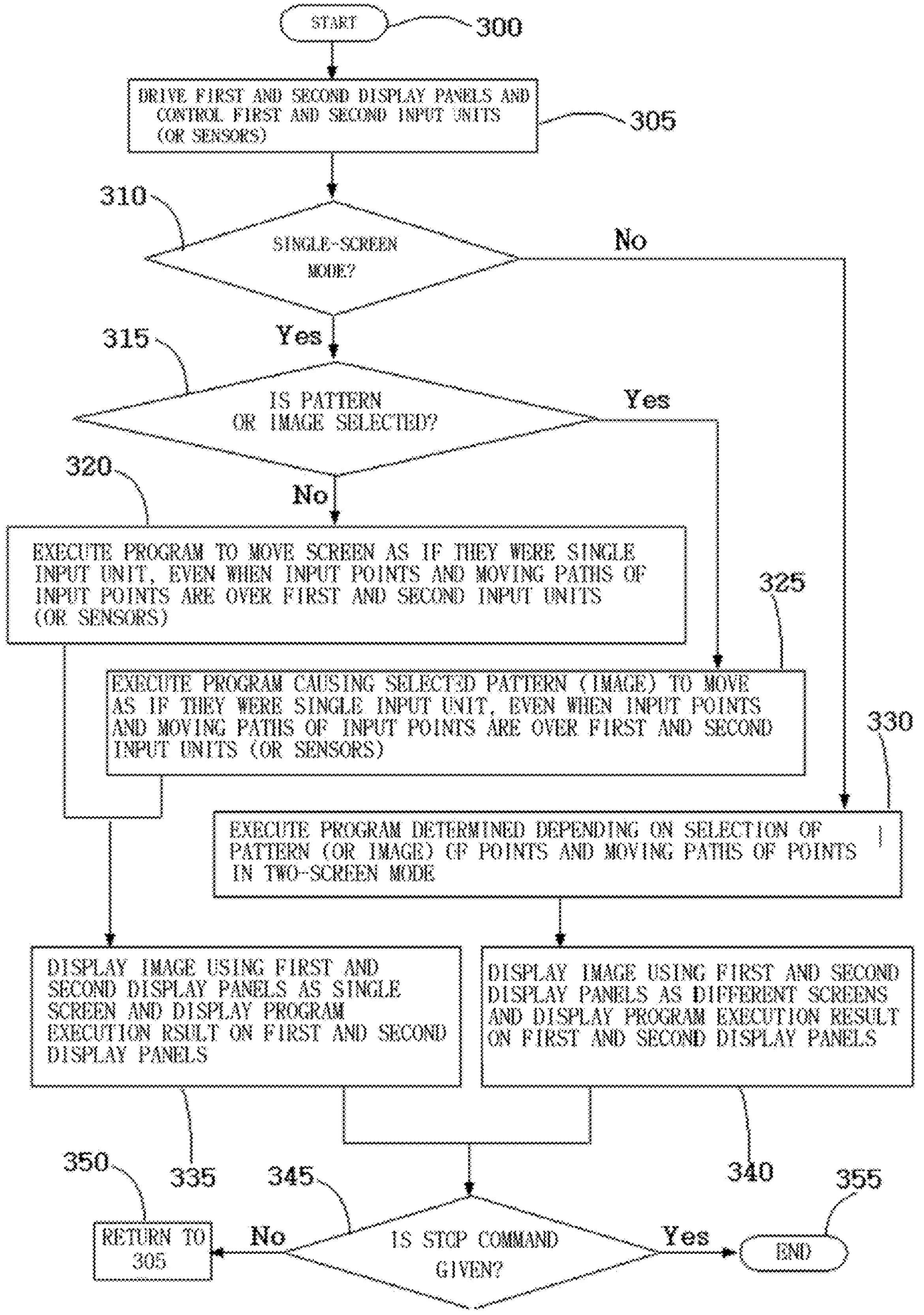

FIG. 66 is a flowchart illustrating the process flow of inputting information through the use of the input unit according to an embodiment of the invention.

According to the embodiment of FIG. 66, when the display device is started up (300), the first and second display panels are driven and the first and second input units (or input sensors) are controlled (305).

A single-screen mode or a two-screen mode is selected (310).

When a single-screen mode is selected, the first and second display panels are combined into a single screen, and a position corresponding to a coordinate value of the combined single screen is compared with a coordinate value input through the input unit (sensor).

In the single-screen mode, it is determined whether the coordinate value input through the input unit (or sensor) is a coordinate value in a pattern (or image) displayed on the display panels (315).

When the input coordinate value is not located in the pattern (or image) and the input point and the moving path of the input point are located in the first and second input units (or sensors), a program is executed as if the information were input through a single input unit, and the screen moves (320).

When the input coordinate value is located in the pattern (or image) and the input point and the moving path of the input point are located in the first and second input units (or sensors), a program is executed as if the information were input through a single input unit (325).

When a pattern is selected in a single-screen mode as described in the above-mentioned embodiment, the central processing unit or the control unit executes a predetermined program depending on the number of points or the moving path of a point.

When the two-screen mode is selected in 310, a predetermined program is executed depending on the selection of a pattern (or image) in the two-screen mode, the number of input points, and the moving path thereof (330).

The central processing unit or the control unit transmits a drive signal to the display driver in accordance with the program control result in the single-screen mode, and the first and second display panels display the result as if they were a single screen (335).

On the other hand, when a program is executed using the first and second display panels as a single screen, a program, determined depending on the input points and the moving paths of the points, is executed, and the execution result is displayed on the first and second display panels (340).

Once the program execution result is displayed on the screen, the process flow goes to 305 when a stop command is not given (350), and the process flow is ended when a stop command is given (355).

Figure 67:
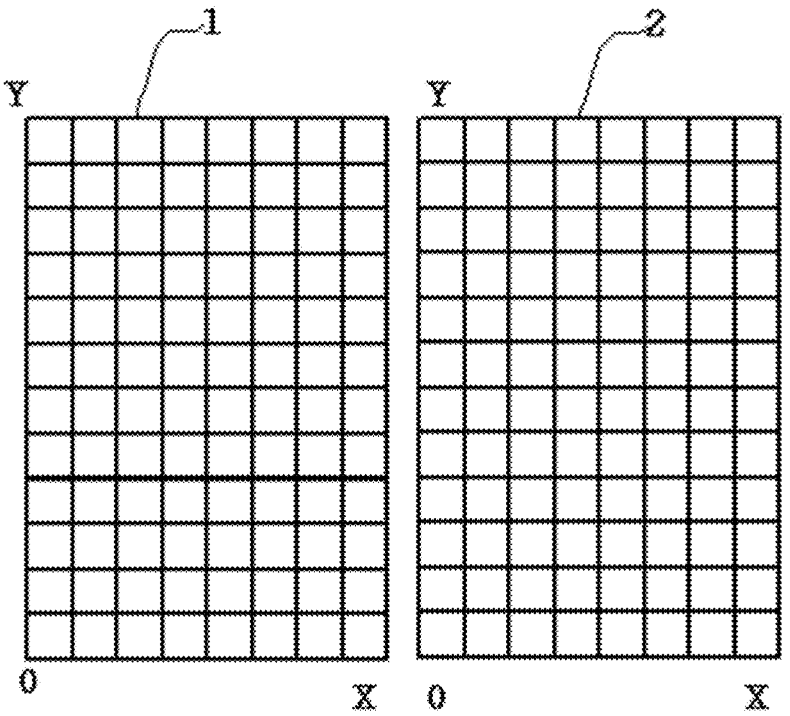
Figure 67:
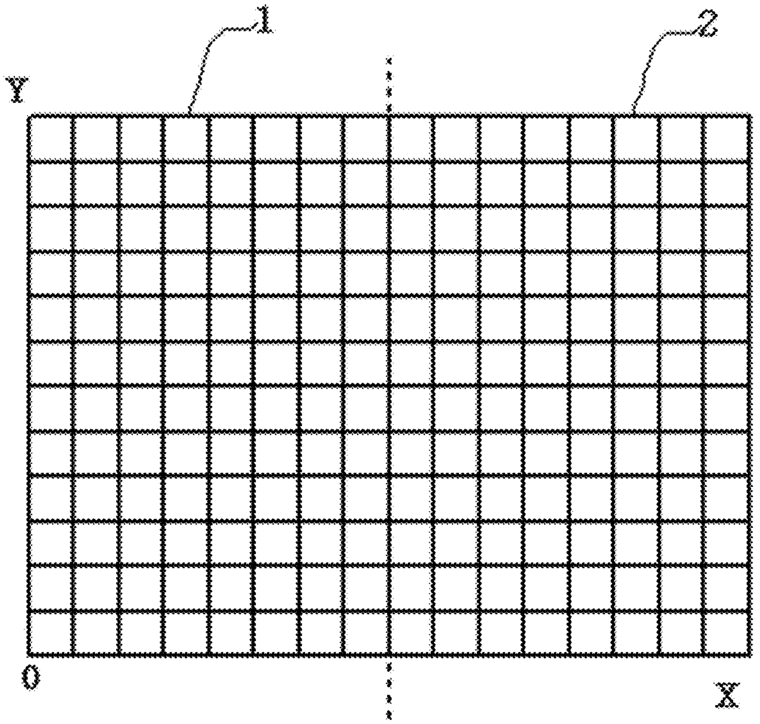

FIG. 67 is a diagram illustrating the principle for using two screens as a single screen according to an embodiment of the invention.

According to the embodiment of FIG. 67, the input units or the display panels have corresponding coordinate systems. In the invention, since the input units or the display panels are actually separated from each other, the corresponding coordinate systems are separated as shown in (A) of FIG. 67.

When two input units are controlled as a single input unit, the coordinate systems which are actually separated are connected as shown in (B) of FIG. 67. That is, the control unit or the central processing unit connects the separated coordinate systems and controls information in a single coordinate system.

Embodiment 13

Figure 68:
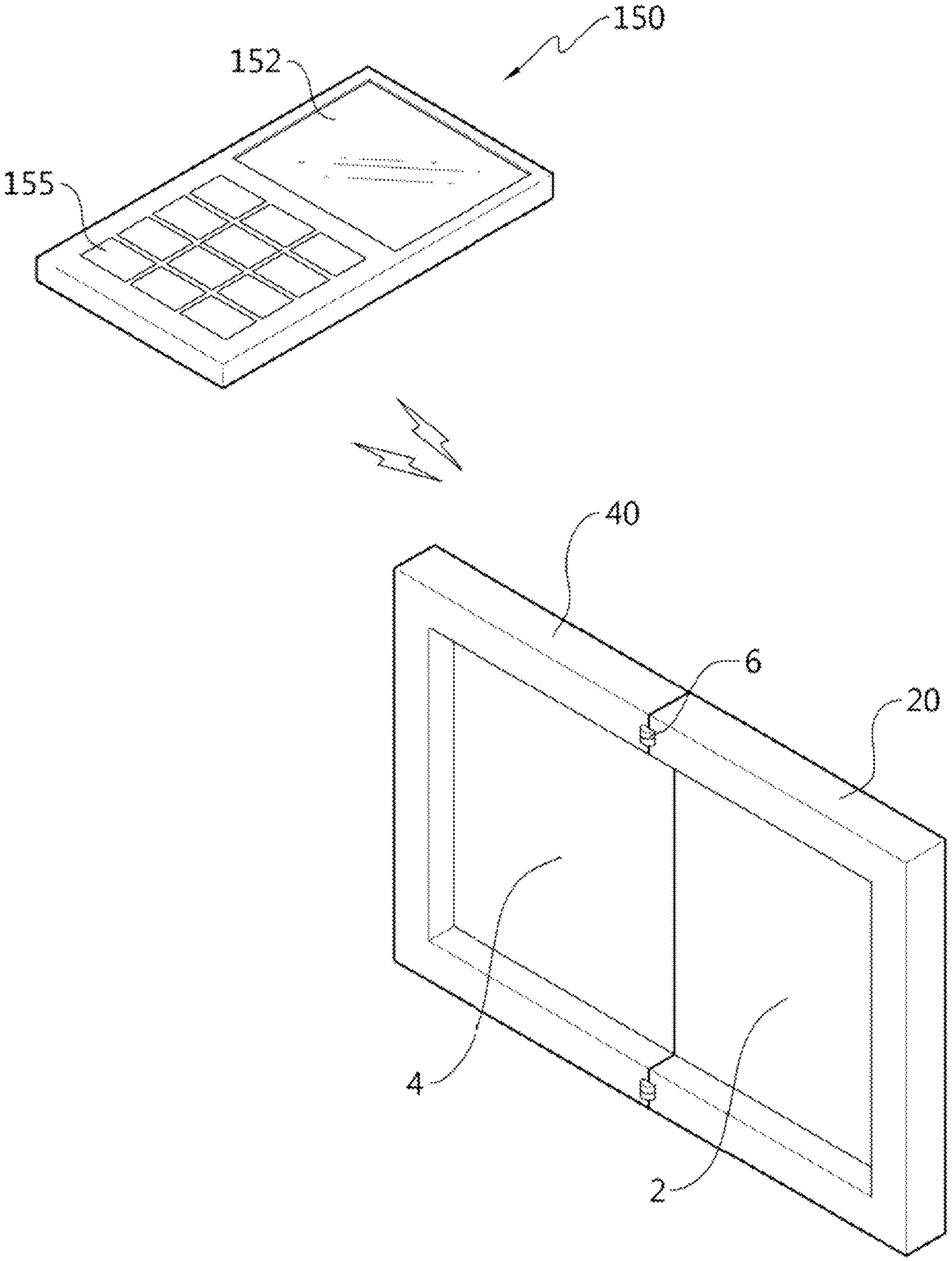
FIGS. 68 to 70 are diagrams illustrating an embodiment of the invention where a portable display device can be controlled in wired and wireless manners.
Figure 69:
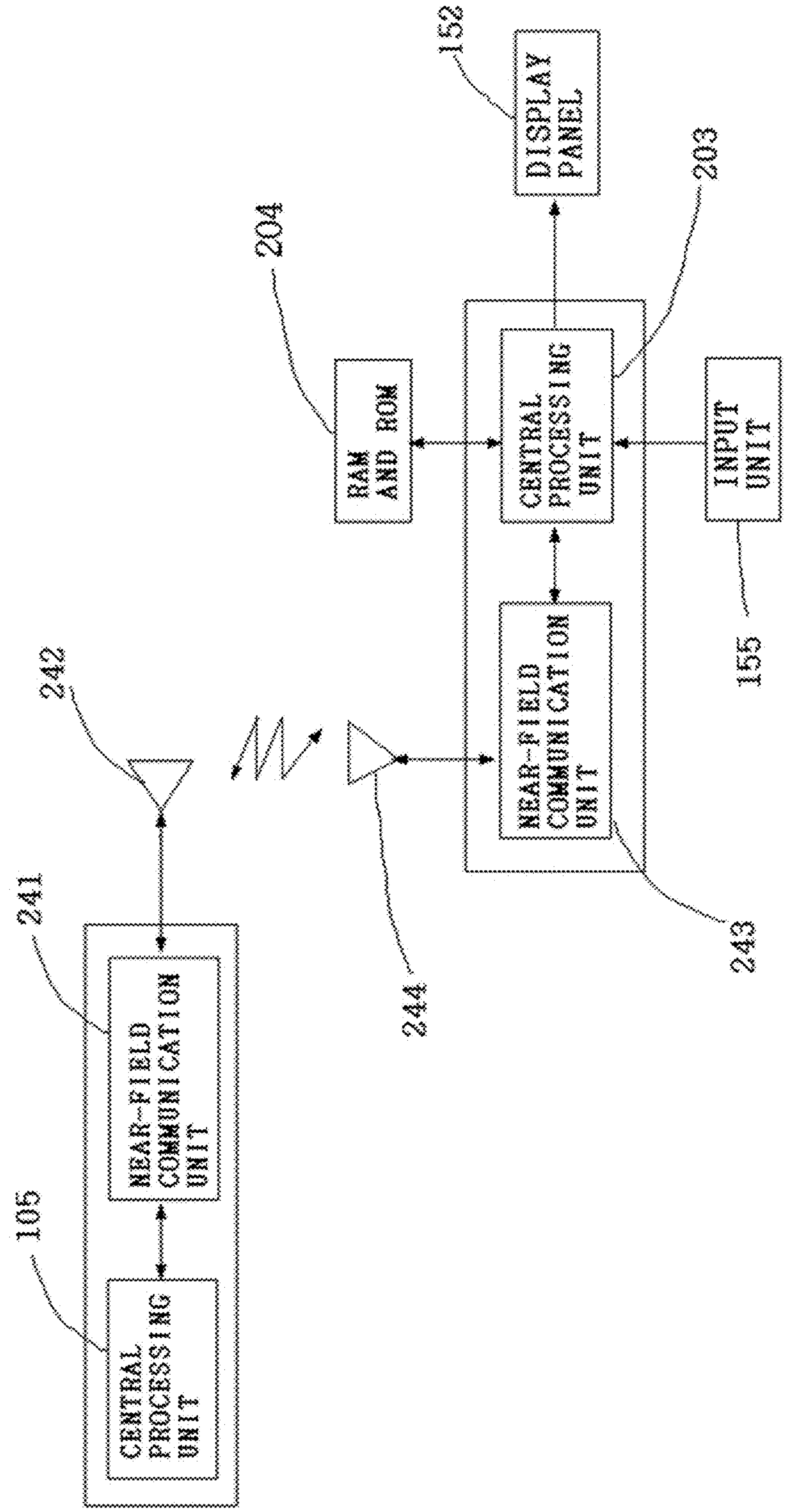
Figure 70:
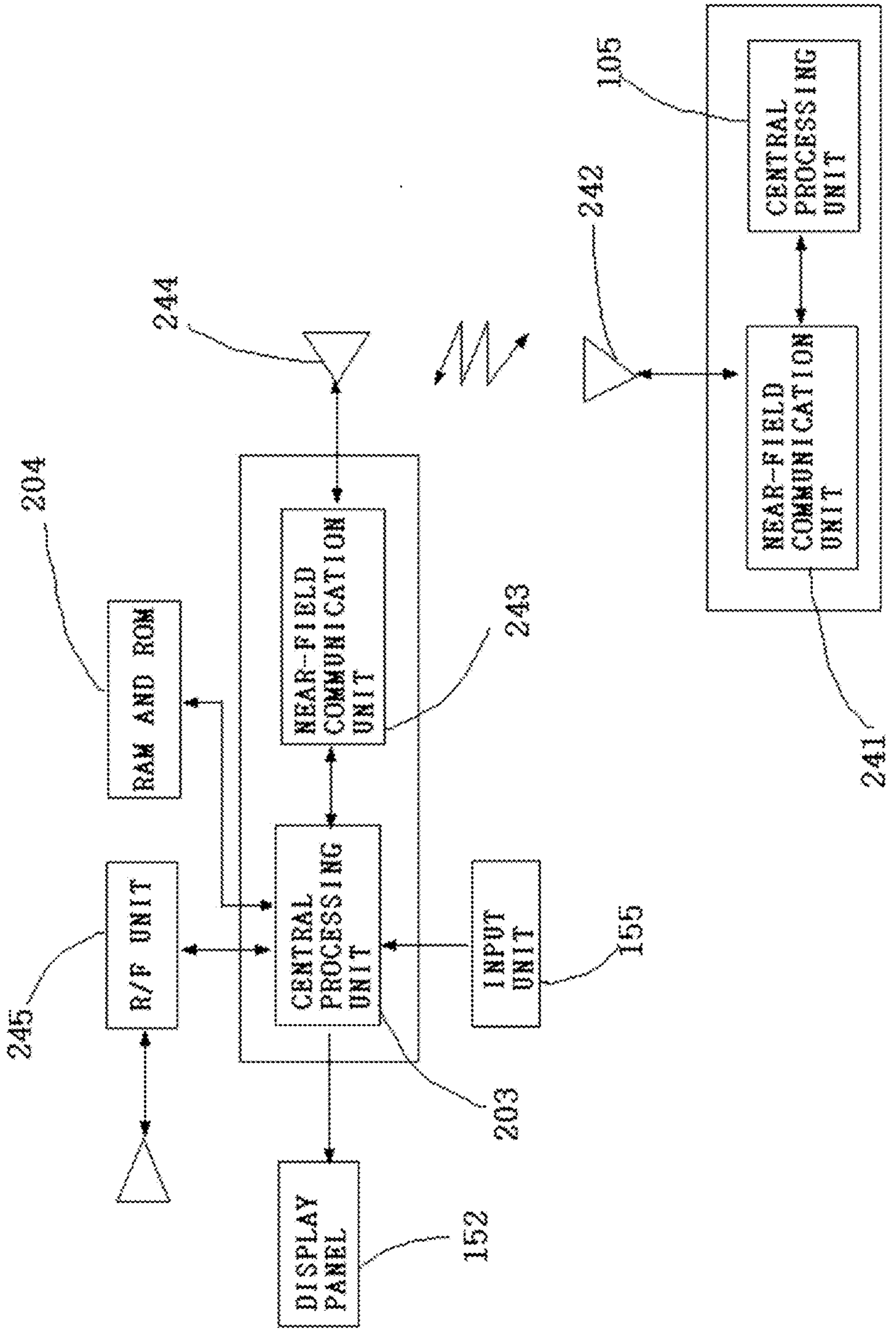

FIGS. 68 to 70 are diagrams illustrating an embodiment where the portable display device can be controlled in wired and wireless manners.

According to the embodiment of FIG. 68, when the display device is large, a particular terminal 150 serving as a mobile phone may be further provided. The particular terminal 150 includes an input unit 155 allowing numerals or characters to be inputted and a display unit 152 displaying simple information.

FIG. 69 is a block diagram illustrating an embodiment where the display device including two screens includes a telecommunication module.

According to the embodiment of FIG. 69, the central processing unit 105 shown in the drawing controls two screens as in the embodiments of FIGS. 59 and 60. The other components of FIGS. 59 and 60 are not depicted in FIG. 69. A near-field communication unit 241 and an antenna 242 which are additionally provided are depicted.

The near-field communication unit 241 can be unified with the central processing unit 105 to form a single module.

The particular terminal 150 includes a near-field communication unit 243 and an antenna 244 and may further include a RAM, a ROM, and an EEPROM 204. A particular central processing unit 203 used to control the memory 204, the display unit 152, and the input unit 155 (which may have a button type or a touch panel type) is provided.

Although not shown in the drawing for the purpose of facilitating the explanation, a microphone and a speaker for voice communication may be further provided.

The telecommunication module may be a normal communication module used to transmit and receive information to and from a wide area network. The near-field communication unit 241 may be a communication module for communication between the display panels 2 and 4 and the particular terminal 150.

Possible local area networks include but are not limited to all near-field communication means such as Bluetooth, UWB (Ultra-Wide Band), Zigbee, Wibree, binary CDMA, infrared communication, and RS-232 port.

The central processing unit 203 and the near-field radio communication unit 243 of the particular terminal 150 may be formed in a module.

At the time of transmitting information, the information is encoded, the encoded information is converted, and the converted information is sent via the antenna by a signal transmitting unit.

At the time of receiving information, the information received via the antenna is converted into a signal by a signal receiving unit and the signal is then decoded.

That is, the near-field radio communication units 241 and 243 include a signal transceiver, a signal converter, a signal decoder, and a signal encoder.

A signal distributor instead of the central processing unit 203 may be disposed in the terminal 150 so as to distribute and send the signal output from the radio communication unit 243 to the speaker or the display panel. That is, the central processing unit is not necessarily provided.

FIG. 70 is a diagram illustrating an embodiment where a telecommunication module is disposed in the particular terminal.

According to the embodiment of FIG. 70, a signal output from the telecommunication R/F unit 245 of the particular terminal 150 is transmitted to the central processing unit 203.

Among the information processed by the central processing unit 203 of the particular terminal 150, information to be displayed on the two display panels is transmitted to the large-screen display panels 2 and 4 via the near-field communication units 241 and 243. Then, the central processing unit 105 controls the display drivers to display the information on the display panels 2 and 4.

Information input via the input unit 110 and the input units 250-1 and 250-2 shown in the block diagram of FIG. 59 is transmitted to the central processing unit 203 of the particular terminal 150 via the near-field communication units 241 and 243.

The display device including two display panels 2 and 4 may serve as only a simple monitor. In this case, a signal distributor may be provided instead of the central processing unit 105 shown in FIG. 59. The information output from the near-field communication unit is transmitted to the corresponding display panel or the corresponding speaker.

The portable display device may not include the RAM, the ROM, and the EEPROM. In this case, the central processing unit 203 of the particular terminal 150 substantially controls two display panels 2 and 4 and two input units 250-1 and 250-2. The RAM, the ROM, and the EEPROM of the particular terminal 150 serve as high-capacity memories.

In an alternative embodiment, the display device may connect the two display panels and the particular terminal to each other in a wired manner, instead of a wireless manner.

Embodiment 14

FIGS. 71 to 79 are diagrams illustrating an example of the near-field communication according to an embodiment of the invention.

Figure 71:
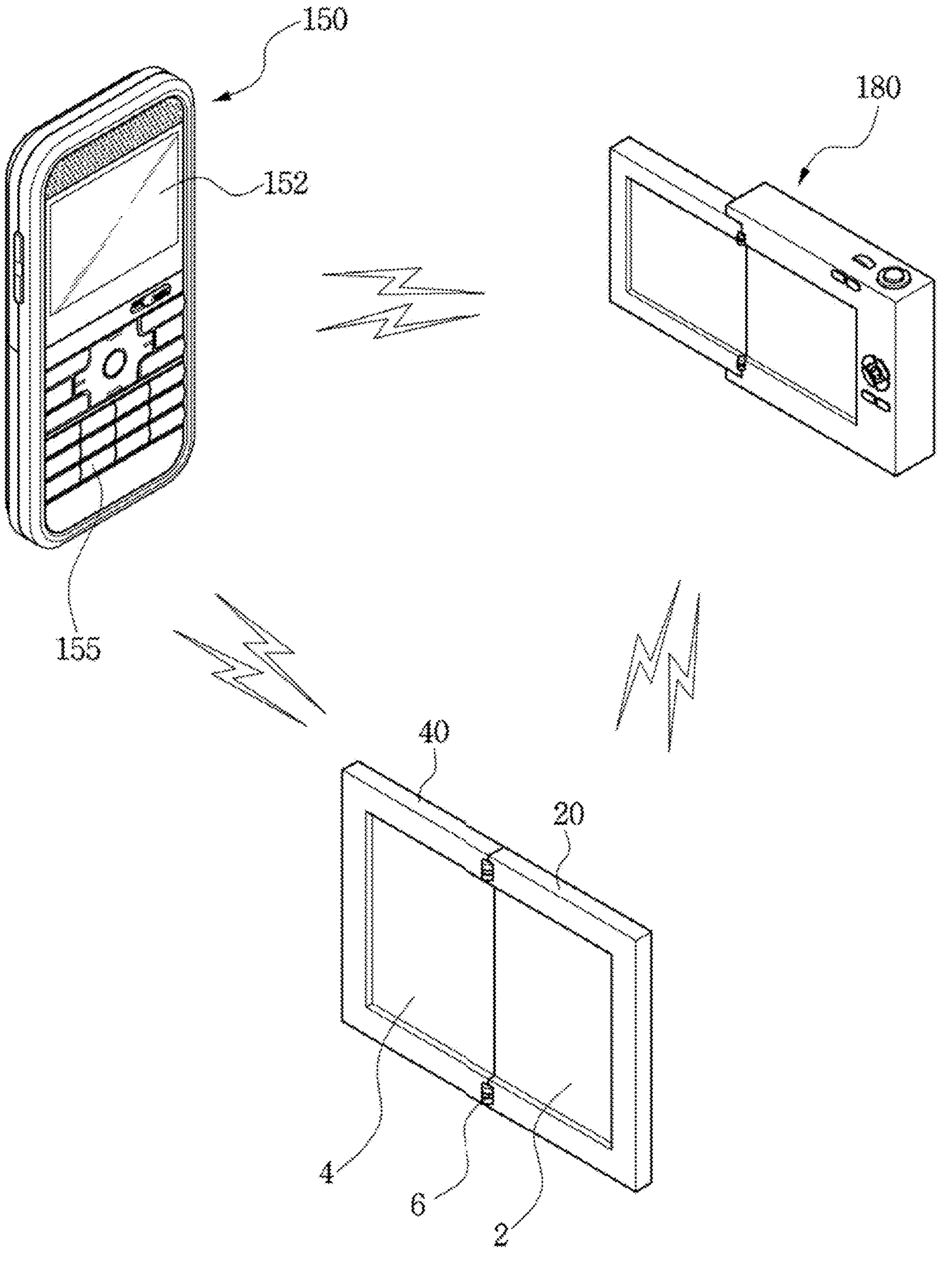
FIGS. 71 to 79 are diagrams illustrating near field communication according to an embodiment of the invention.

FIG. 71 shows an embodiment of a terminal that can perform near-field communication with the display device.

According to the embodiment of FIG. 71, a mobile phone 150 and a digital camera 180 can perform near-field communication with each other and various computers and various terminals can perform near-field communication with each other. The near-field communication is performed in the same way as in the embodiments of FIGS. 69 and 70.

Figure 72:
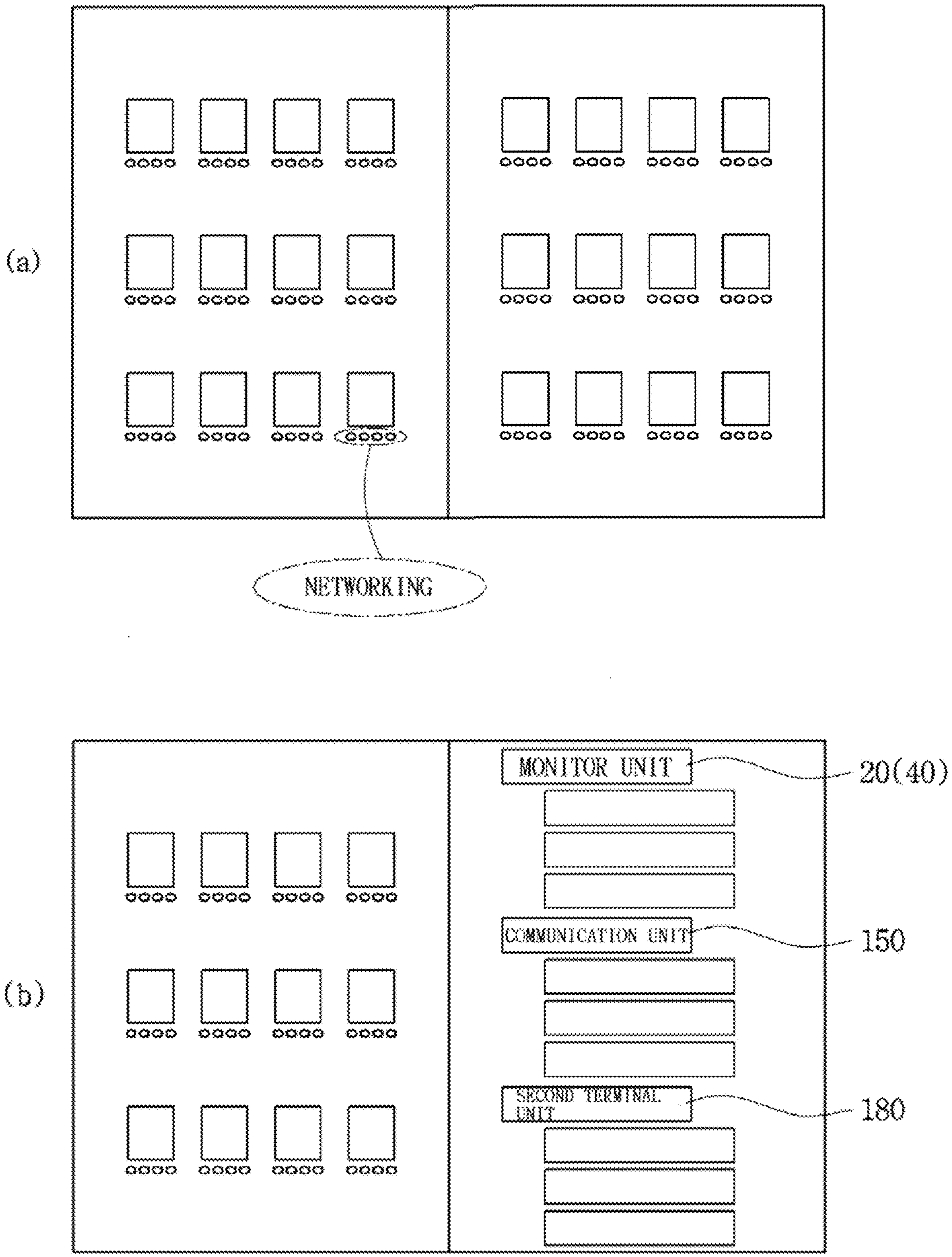

FIG. 72 shows an embodiment of a menu screen displayed on the display panels 2 and 4 of the invention.

That is, as shown in (a) of FIG. 72, a menu screen is displayed in the form of icons and functional names are marked below the corresponding icons. When "networking" is selected from the menu screen, information on terminals capable of performing near-field communication is displayed on the display panels 2 and 4 as shown in (b) of FIG. 72.

Since two display panels are present, the menu screen is displayed on one display panel and detailed information of the selected icon is displayed on the other display panel. That is, program information or stored data of a terminal capable of performing near-field communication with the portable display device according to the embodiment of FIG. 72 is displayed.

Figure 73:
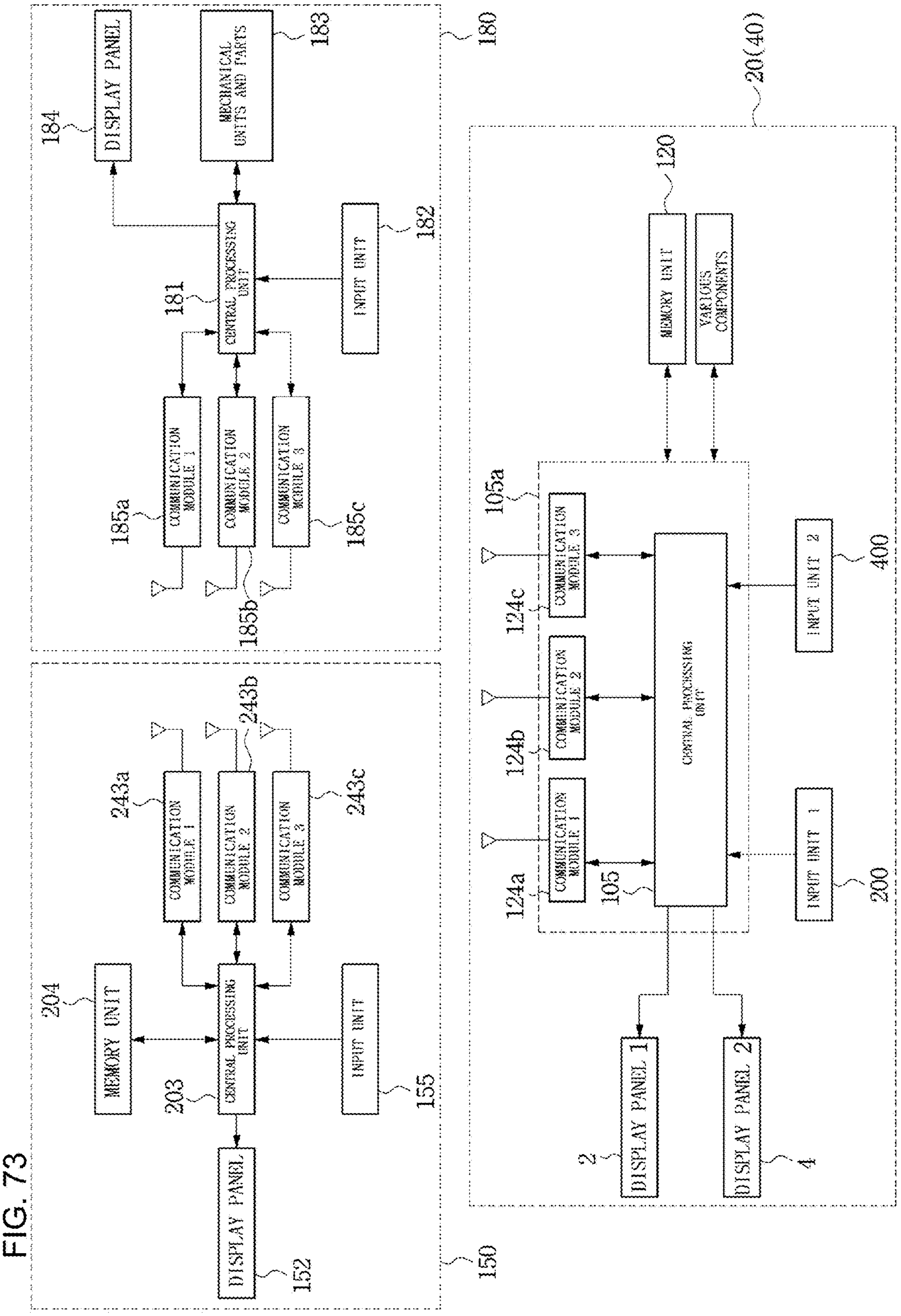
Figure 74:
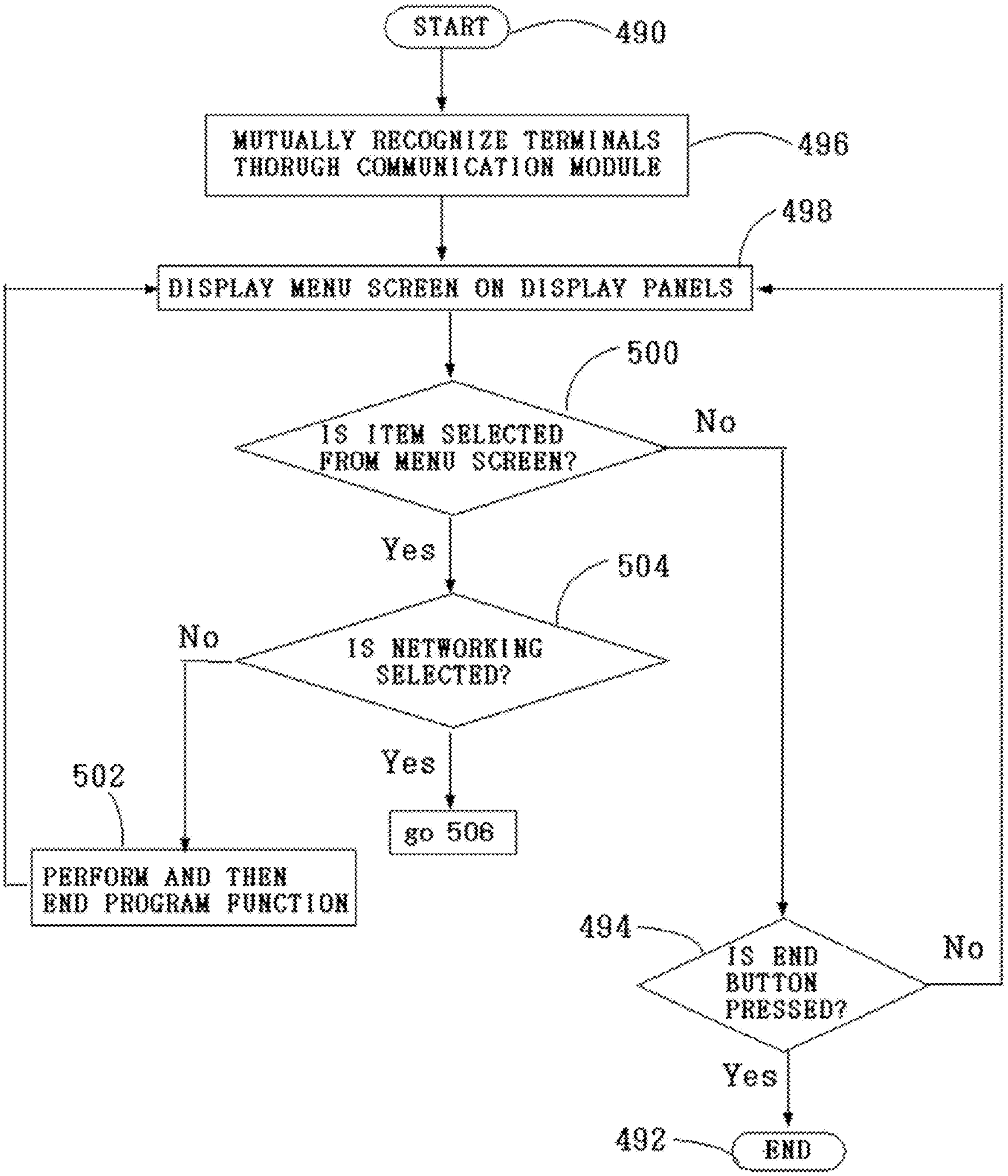

FIG. 73 is a block diagram illustrating multiple configurations of a terminal capable of performing near-field communication with the display device according to an embodiment of the invention.

The display panels 2 and 4 according to the embodiment of FIG. 73 are based on FIG. 59 and further include a first communication module 124*a*, a second communication module 124*b*, and a third communication module 124*c*. These communication modules can be formed as a single module 105*a* along with a central processing unit. The single module may further include a memory unit 120. The single module may further include an additional communication module if necessary.

A terminal 150 embodied in a mobile phone includes a central processing unit 203, an input unit 155, a display panel 152, and a memory unit 204 and further includes a first communication module 243*a*, a second communication module 243*b*, and a third communication module 243*c* for communications.

In the mobile phone terminal 150, the first communication module may be a mobile-phone communication module such as a CDMA, a GSM, and a TDMA and the second communication module may be a communication module related to high-speed data communication such as a WiFi and a WiBro. The third communication module is a communication module related to near-field communication. The third communication module is not limited to the near-field communication module described above, but may employ any module capable of performing near-field communication.

A terminal embodied in a digital camera 180 includes a central processing unit 181, an input unit 182, a display panel 184, and a mechanical units and parts 183. The mechanical units and parts are associated with a digital camera, are not associated with the subject matter of the invention, and thus will not be described in detail. Similarly, the digital camera includes a first communication module 185*a*, a second communication module 185*b*, and a third communication module 185*c*.

The above-mentioned three terminal embodiments necessarily include the third communication module capable of performing near-field communication, but do not necessarily include the first communication module and the second communication module. Other embodiments are also possible without departing from the scope of the invention.

Any of these terminals can perform telecommunication through the near field communication with a terminal capable of performing telecommunication.

FIGS. 74 to 79 are flowcharts illustrating process flows of a near-field communication method according to embodiments of the invention.

FIGS. 74 to 77 are flowcharts illustrating embodiments of process flows of near-field communication in accordance with programs. According to the embodiment of FIG. 74, when a terminal is turned on (490), a terminal capable of performing near-field communication through the third communication module can be recognized (496).

A program system in which a protocol is set up in advance and communication environments are set up should be constructed to mutually recognize the terminal capable of near-field communication and this is typically known.

A menu screen indicating the functions as shown in FIG. 72 is displayed on the display panels 2 and 4 (498). When an item is selected from the menu screen (500), a function performing operation is performed. When an item is not selected from the menu screen, it is determined whether the process flow should be stopped (494). When an end button is pressed, the process flow is ended (492). Otherwise, the process flow is returned to an execution operation.

When a normal program is selected from the menu screen, the process flow is returned to the initial operation after performing a function (502). When a networking function is selected (504), a networking operation is prepared and the process flow goes to 506.

Figure 75:
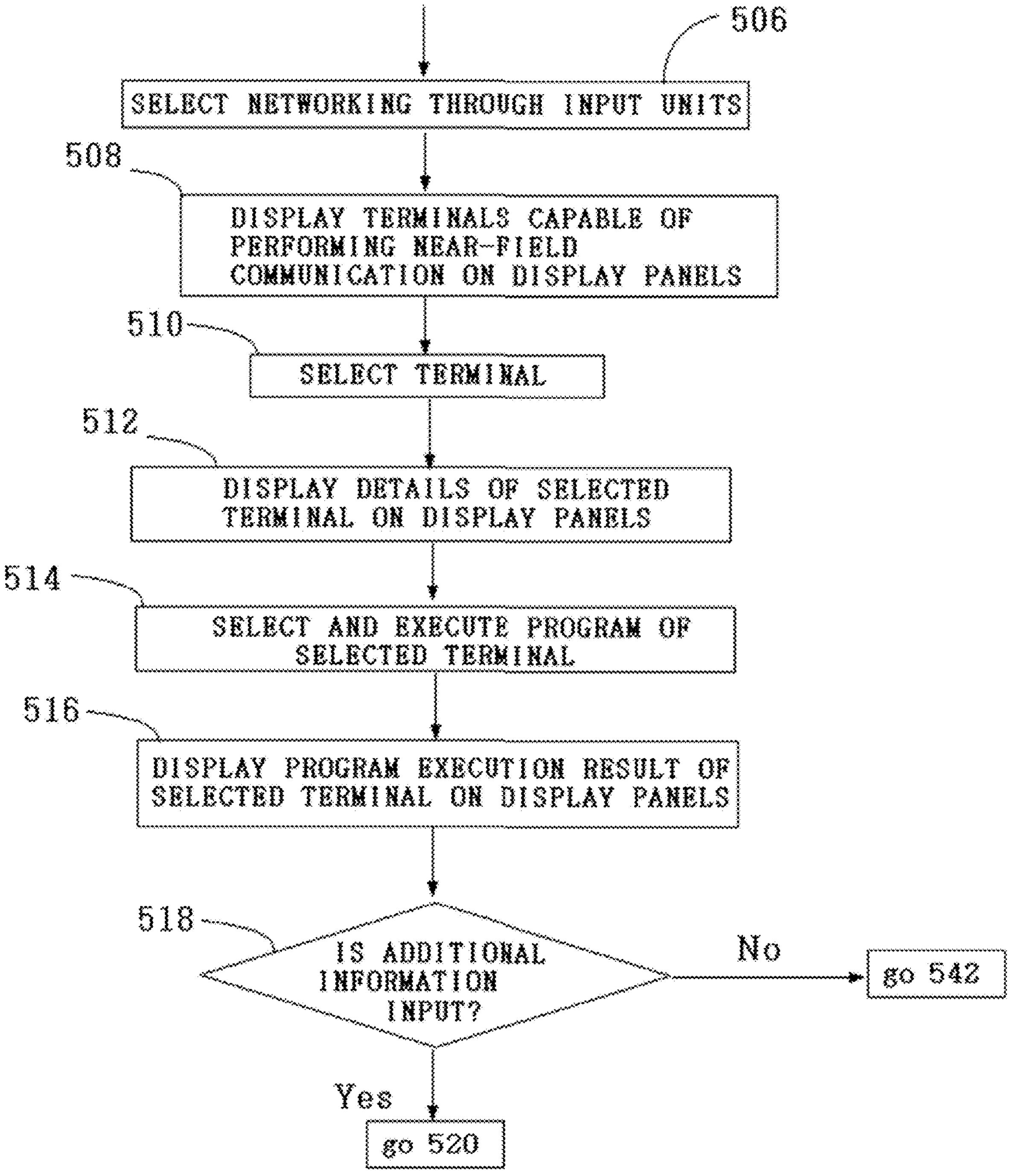

According to the embodiment of FIG. 75, when a networking function is selected through the use of the input units 200 and 400 of the invention, a control command corresponding to a coordinate value determined by the input unit driver is carried out and this function is performed by the input unit driver and the central processing unit 105. The central processing unit 105 displays its results on a terminal capable of performing near-field communication on the display panels 2 and 4 (508).

Here, when a specific terminal, for example the mobile phone terminal 150, is selected (510), information on the selected terminal 150 is displayed in detail on the display panels 2 and 4.

Details of the selected terminal can be displayed on the basis of information stored in advance through the following process. That is, when information is inputted through the input units 200 and 400, the central processing unit 105 processes information and transmits a command via the third communication module 105*a* which is a near-field communication module.

Then, the third communication module 243*c* of the terminal 150 receives the information and sends the received information to the central processing unit 203. The central processing unit 203 sends the information on the terminal 150 stored in the memory unit 204 to the display panels 2 and 4 of the invention. The central processing unit 105 of the display panels 2 and 4 display the information received from the terminal 150 on the display panels 2 and 4.

One of the functions of the terminal 150 displayed on the display panels 2 and 4 is performed (514). In this case, a command is inputted through the use of the input units 200 and 400. The inputted command is transmitted to the central processing unit 203 of the terminal 150 in the same way as described in 512 and the central processing unit 203 performs the selected program function.

When the program function is performed, the central processing unit 203 transmits the result thereof to the central processing unit 105 of the display device via the third communication module. The central processing unit 105 in the invention controls the display driver to display the result of the program function on the display panels 2 and 4 (516).

The process flow goes to 520 when additional information for executing a program is inputted, and the process flow goes to 542 when additional information is not inputted (518).

Figure 76:
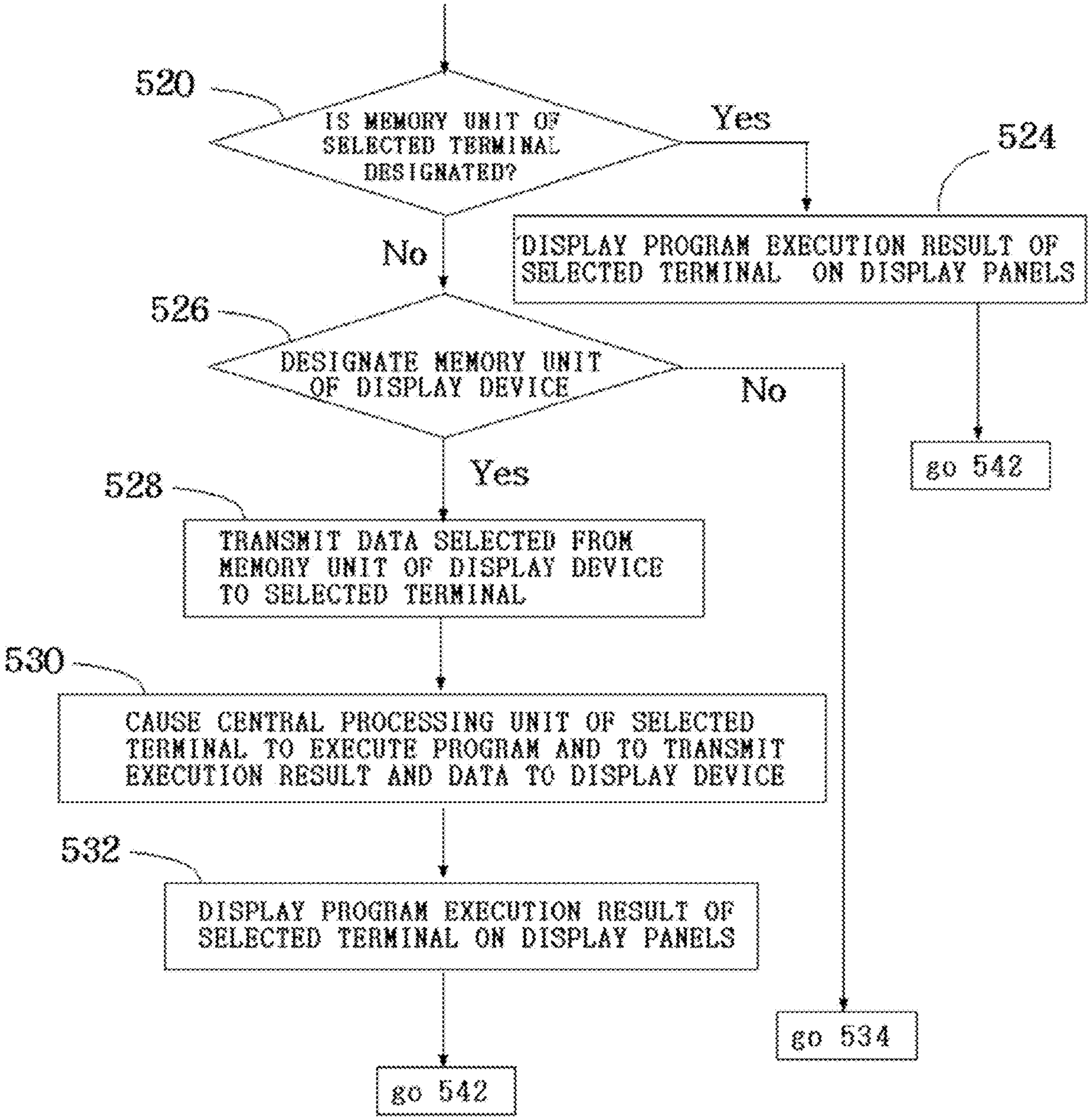

Subsequently, according to the embodiment of FIG. 76, new information may be inputted at the time of inputting the additional information, but information stored in the memory unit of the terminal 150 is used (520). That is, when additional information stored in the memory unit 204 in the terminal 150 is inputted, a program is executed on the basis of the input information and the execution result is displayed on the display panels 2 and 4. Then, the process flow goes to 542.

On the other hand, when data stored in the memory unit 120 of the display panels 2 and 4 of the invention is selected (526), the central processing unit 105 transmits the information selected from the memory unit 120 to the terminal 150 via the third communication module 124*c* (528), and the central processing unit 203 of the terminal 150 executes a program on the basis of the received data. When the execution result is transmitted to the display panels 2 and 4 of the invention, the execution result is displayed on the display panels 2 and 4 and the process flow goes to 542.

Figure 77:
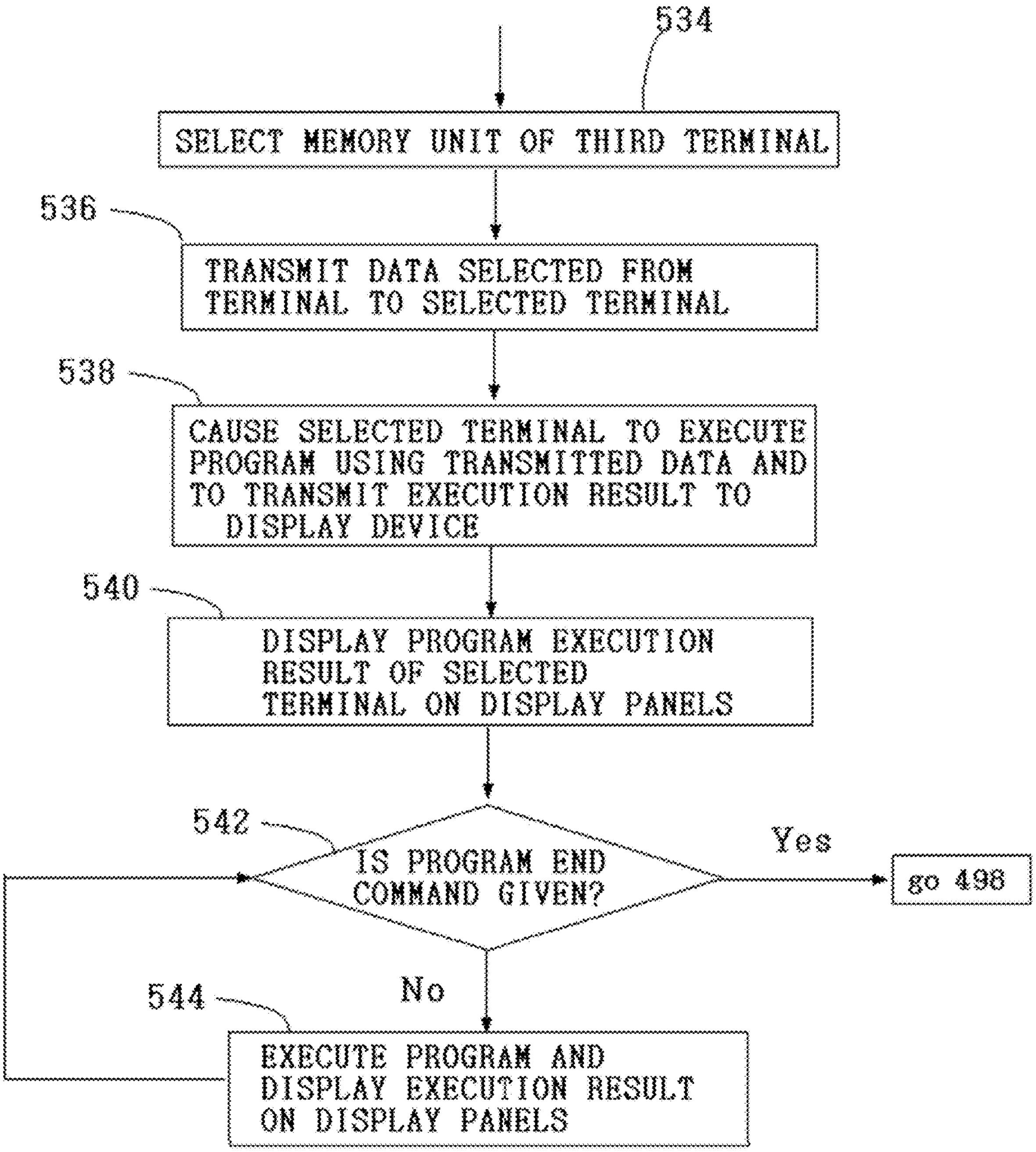

According to the embodiment of FIG. 77, when the third terminal (terminal 180) is designated in 526, the process flow goes to 534. That is, when the information stored in the terminal 180 (534), the central processing unit 105 transmits a signal (signal representing that the information stored in the terminal 180 is selected) to the terminal 180 via the third communication module.

Then, the central processing unit 181 of the terminal 180 transmits the selected information to the terminal 150 via the third communication module 185*c* (536). The terminal 150 receives the information via the third communication module 243*c*, executes a program on the basis of the received information, and transmits the result to the display panels 2 and 4 of the invention (538).

The central processing unit 105 displays the received result on the display panels 2 and 4 (540). Then, the process flow goes to 542.

On the basis of a program end command is given (542), the program execution result is continuously displayed when the end command is not given (544), and the process flow goes to 498 when the end command is given.

In the flowcharts and block diagrams described above, a terminal (for example, 150 or 180) capable of performing near-field communication is further provided to the display panels 2 and 4 of the invention, a program of the terminal capable of performing near-field communication can be controlled and information can be inputted through the use of the input units 200 and 400 disposed in the display device, the program execution result of the terminal capable of performing near-field communication can be displayed on the display panels 2 and 4 of the display device.

When a program of the terminal 150 is performed through the use of the input units 200 and 400 of the display device, information stored in the terminal 180 capable of performing near-field communication can be selected and utilized.

Figure 78:
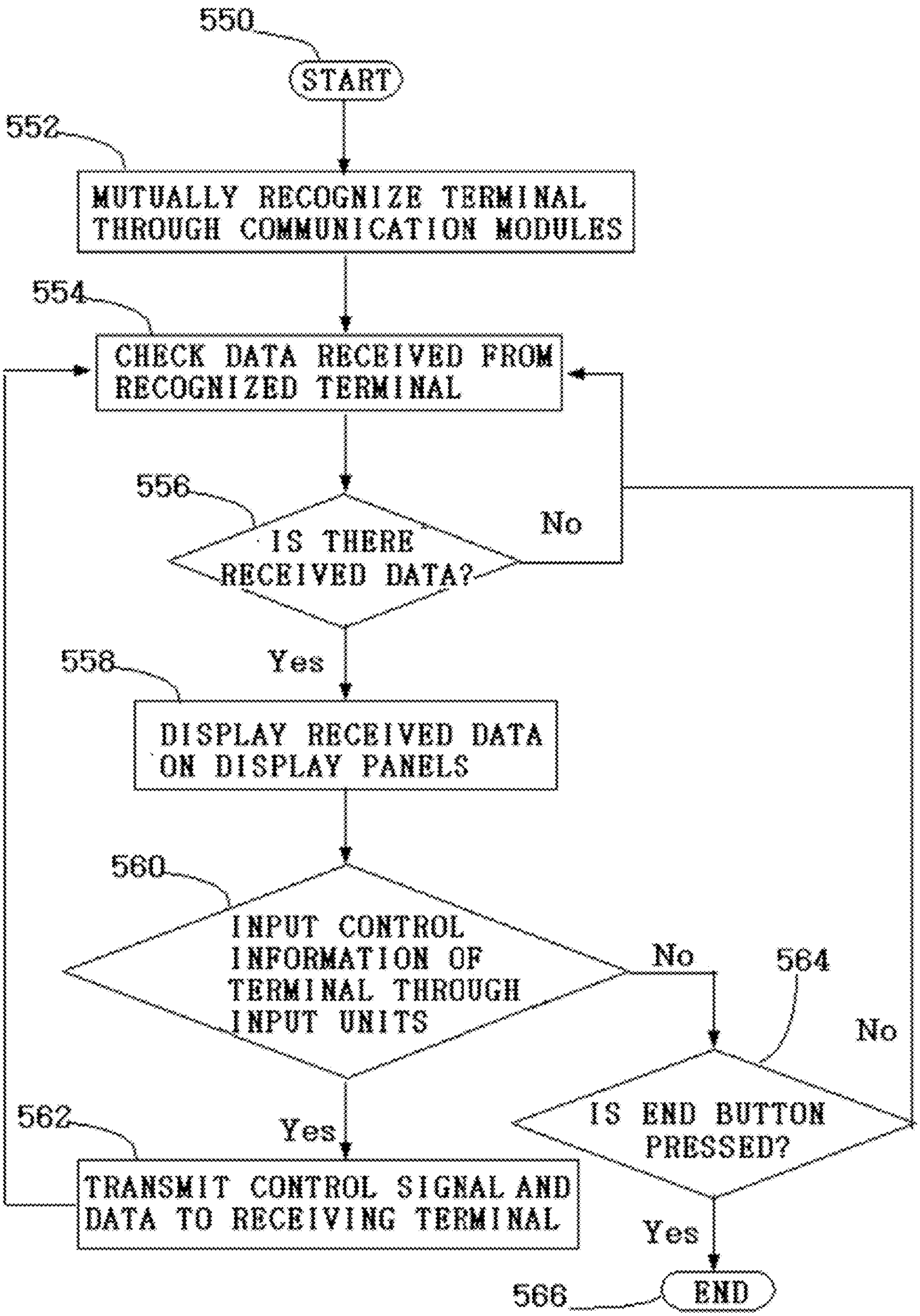

FIG. 78 is a flowchart illustrating one embodiment of a process flow of automatic reception of a near-field communication terminal. According to the embodiment of FIG. 78, when the display device is started up (550), near-field communication terminals can be mutually recognized (552). This function is enabled by the third communication module capable of performing near-field communication, a predetermined protocol, and an open systems interconnection (OSI) system. Possible OSI systems include but are not limited to an TCP/IP, an HTTP, and an FTP. In addition, protocols determined to transmit and receive information through near-field communication may be used in the invention.

Then, the received data is checked (554). For example, when the terminal 150 receives a specific signal or executes a program (556), a signal is sent to the display panels 2 and 4 of the invention in accordance with a predetermined rule, and the central processing unit 105 displays the signal on the display panels 2 and 4 in accordance with a predetermined rule on the basis of the signal received via the third communication module 124*c* (558). When data is not received, the checking operation is performed again.

For example, when the terminal 150 receives a call, the display panels 2 and 4 may be turned on.

When information is inputted through the input units 200 and 400 or the input unit 110 of the display panels 2 and 4 (560), the input information is transmitted to the terminal 150 (562). The terminal 150 executes a program on the basis of the transmitted information again, and this execution result is displayed on the display panels 2 and 4 of the display device as shown in the flowchart.

On the other hand, when information is not inputted, the process flow is ended (566) or is returned to the received data check operation depending on whether an end command is given or not.

That is, the display device can automatically display the program execution result of the terminal capable of performing near-field communication on the display panels 2 and 4 and can additionally control the program execution through the use of the input units 200 and 400 of the invention or the input units.

Figure 79:
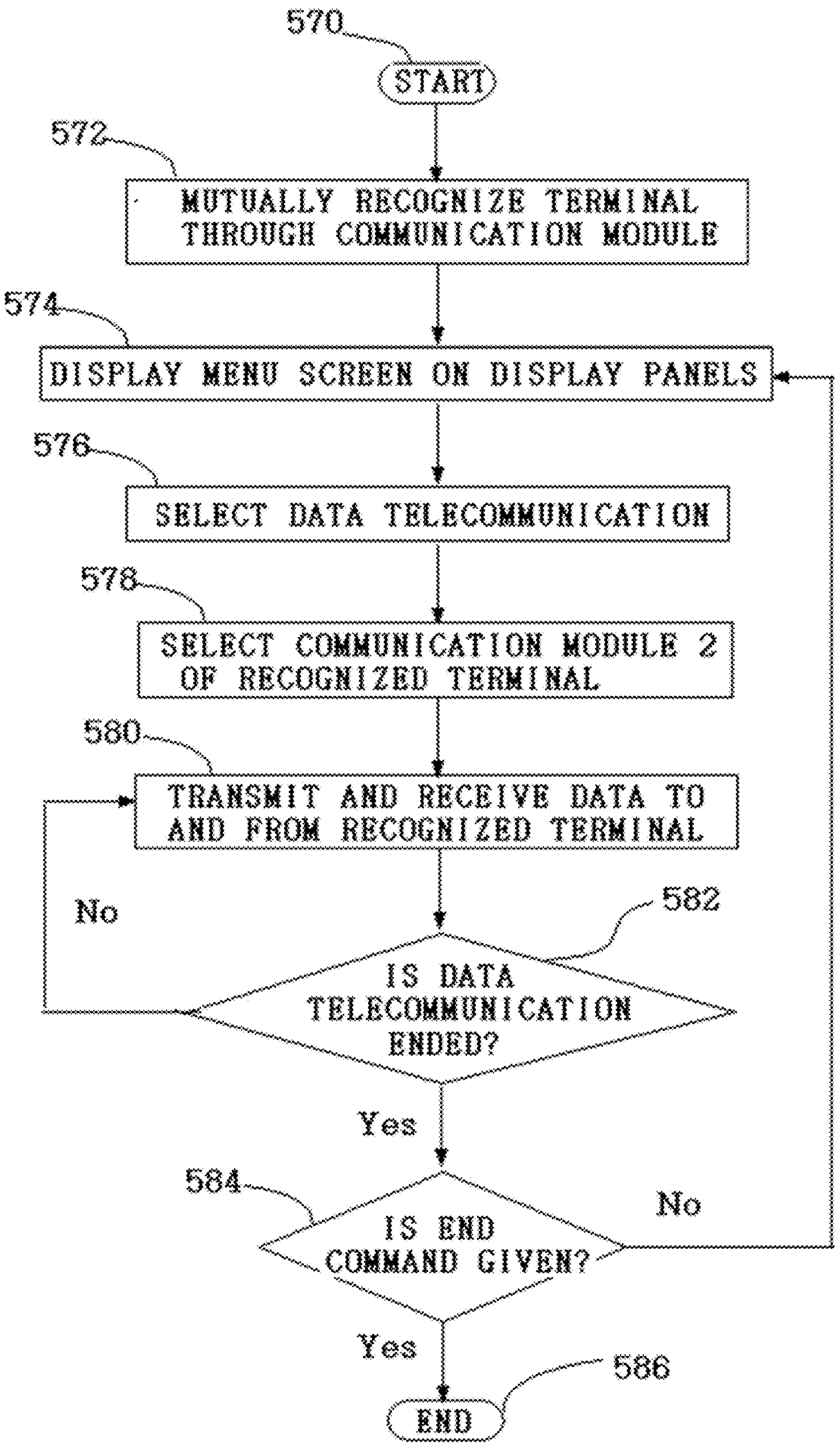

FIG. 79 is a flowchart illustrating an embodiment of a data telecommunication process. According to the embodiment of FIG. 79, when a power supply is turned on or a start button is pressed (570), terminals capable of performing near-field communication can be mutually recognized through the use of the near-field communication module 124*c* (572). The terminals capable of performing near-field communication include the terminal 150, the terminal 180, and other terminals capable of performing near-field communication.

For example, the terminal 150 capable of performing near-field communication is displayed on the menu screen of the display panels 2 and 4 (574) and telecommunication with the terminal 150 is selected (576), detailed information of the terminal capable of performing near-field communication is displayed and the communication mode of the terminal capable of performing near-field communication is selected (578).

That is, when the second communication module 243*b* of the communication modules of the terminal 150 is selected through the use of the input units 200 and 400 of the display device, the display device can perform telecommunication through the use of the second communication module 243*b* of the terminal 150.

Although not described herein, a program to be executed when the first communication module of the terminal 150 is selected and a program to be executed when the second communication module thereof is selected may be different from each other.

Embodiment 15

FIGS. 80 to 85 are diagrams illustrating embodiments where folded display panels are unfolded to be contiguous to each other.

Figure 80:
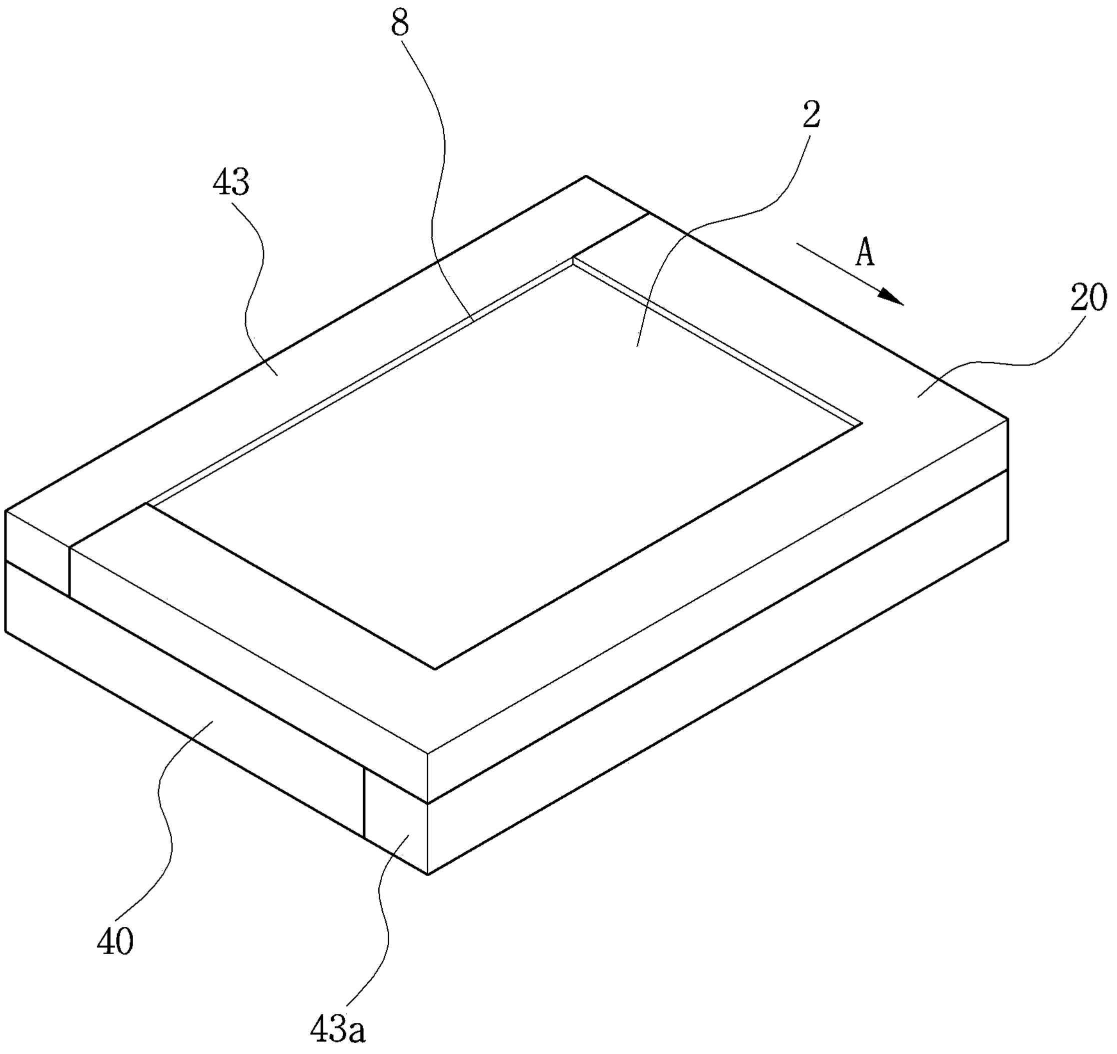
FIGS. 80 to 85 are diagrams illustrating embodiments of the invention where folded display panels are unfolded to be contiguous to each other.
Figure 81:
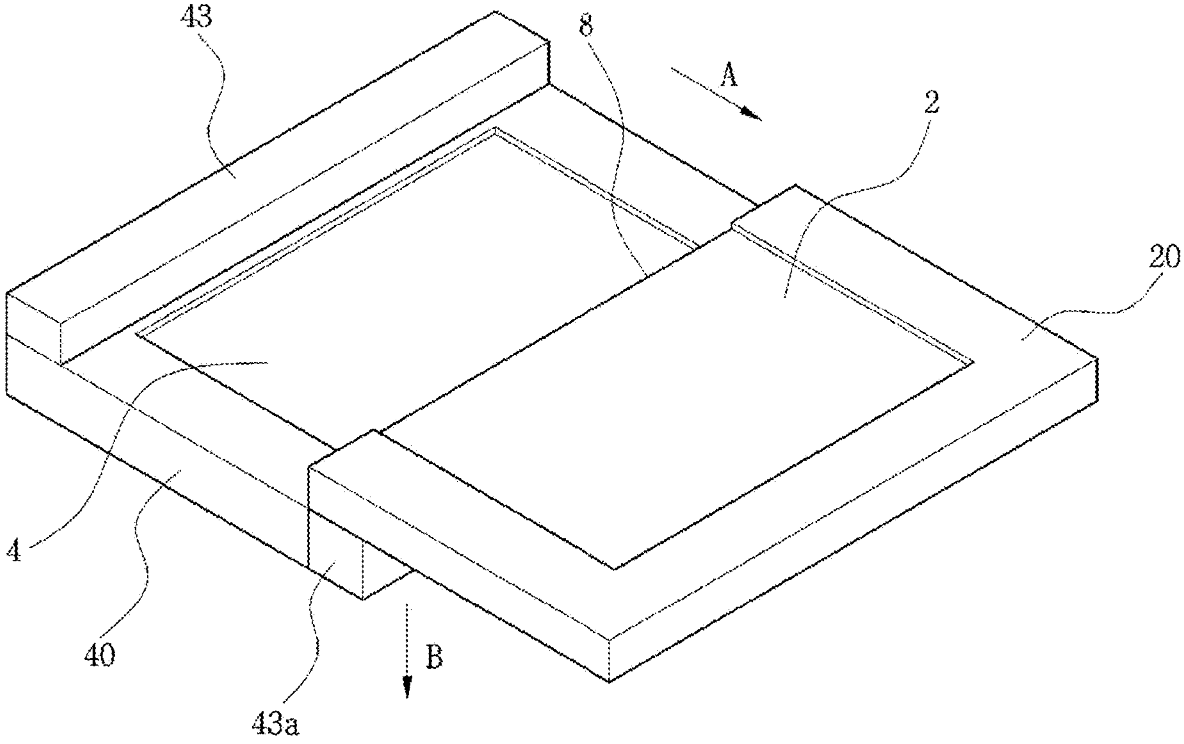
Figure 82:
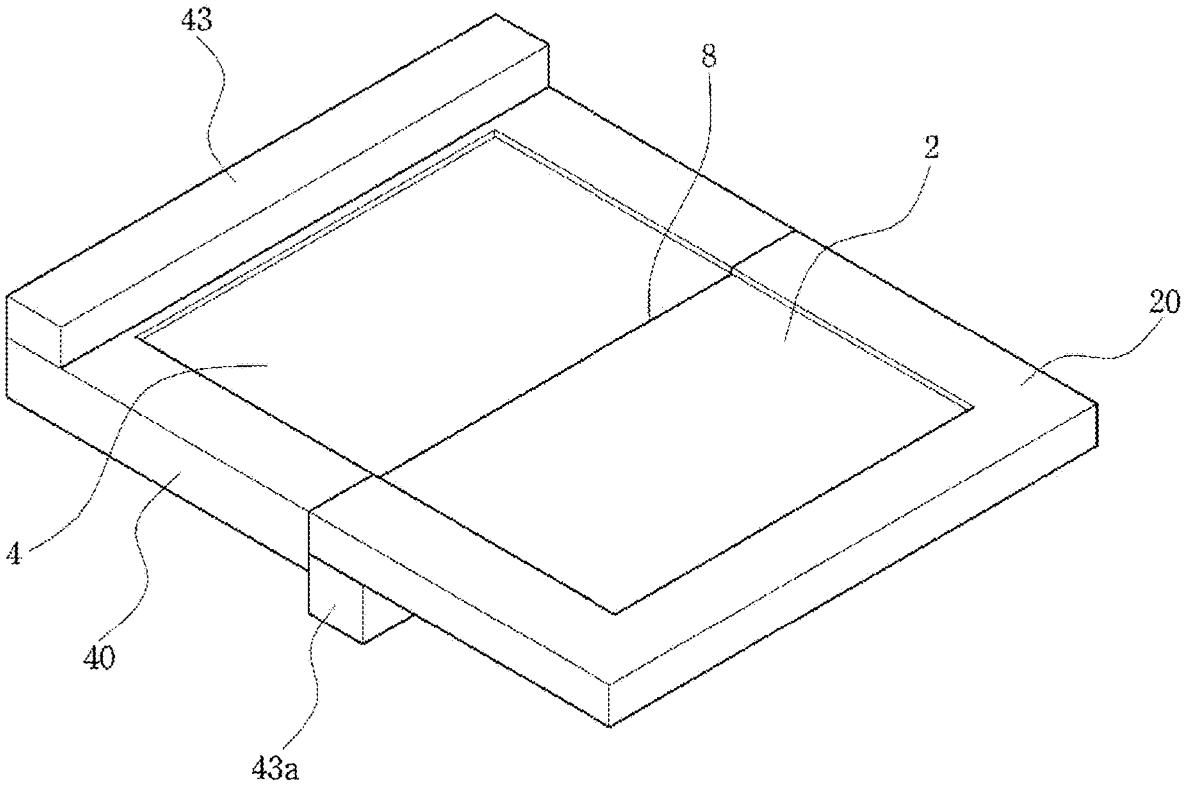

According to the embodiment of FIGS. 80 to 82, when the panel housings 20 and 40 having the display panels 2 and 4 mounted thereon are unfolded in the horizontal direction (A) from a folded state (FIG. 80), the panel housings are changed to the state shown in FIG. 81. When the panel housings further move vertically, the panel housings are changed to the state shown in FIG. 82. Then, the display panels 2 and 4 are contiguous to each other.

Figure 83:
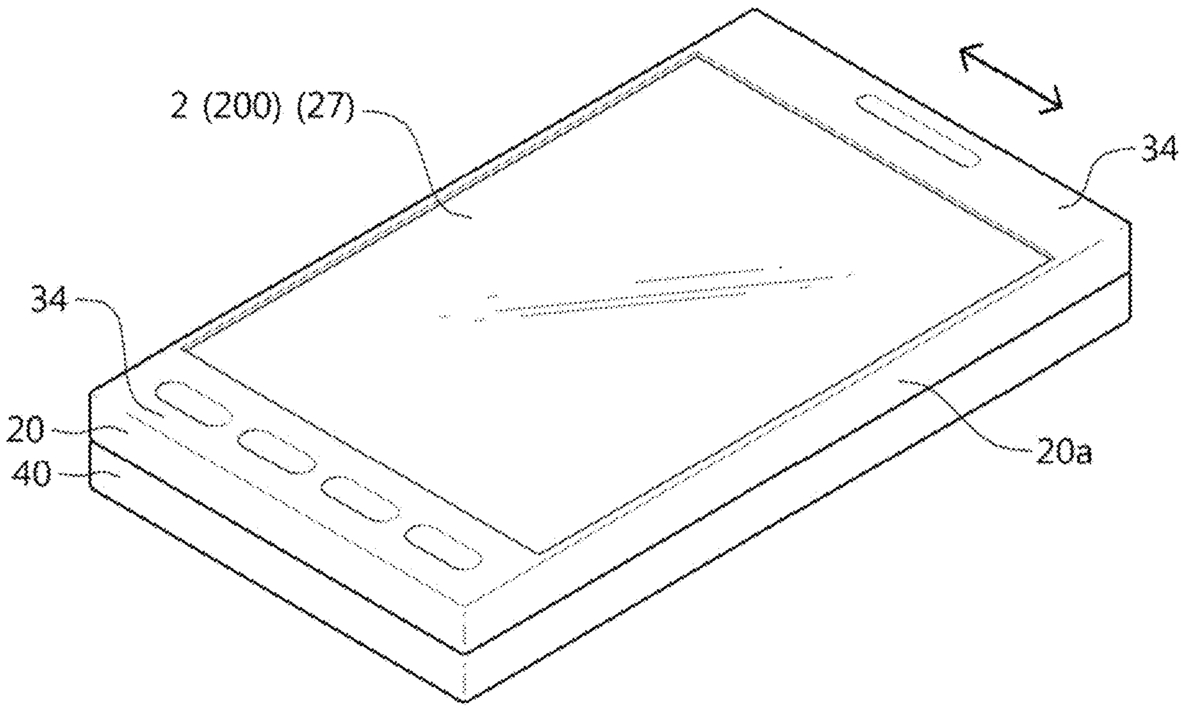
Figure 84:
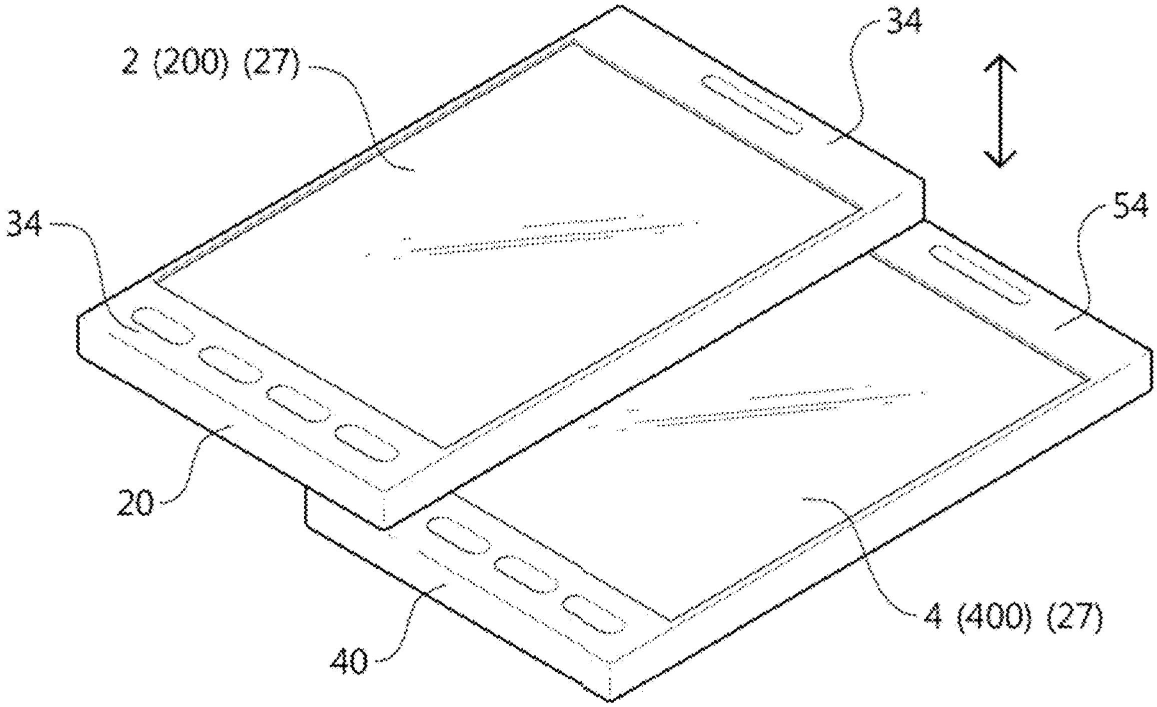
Figure 85:
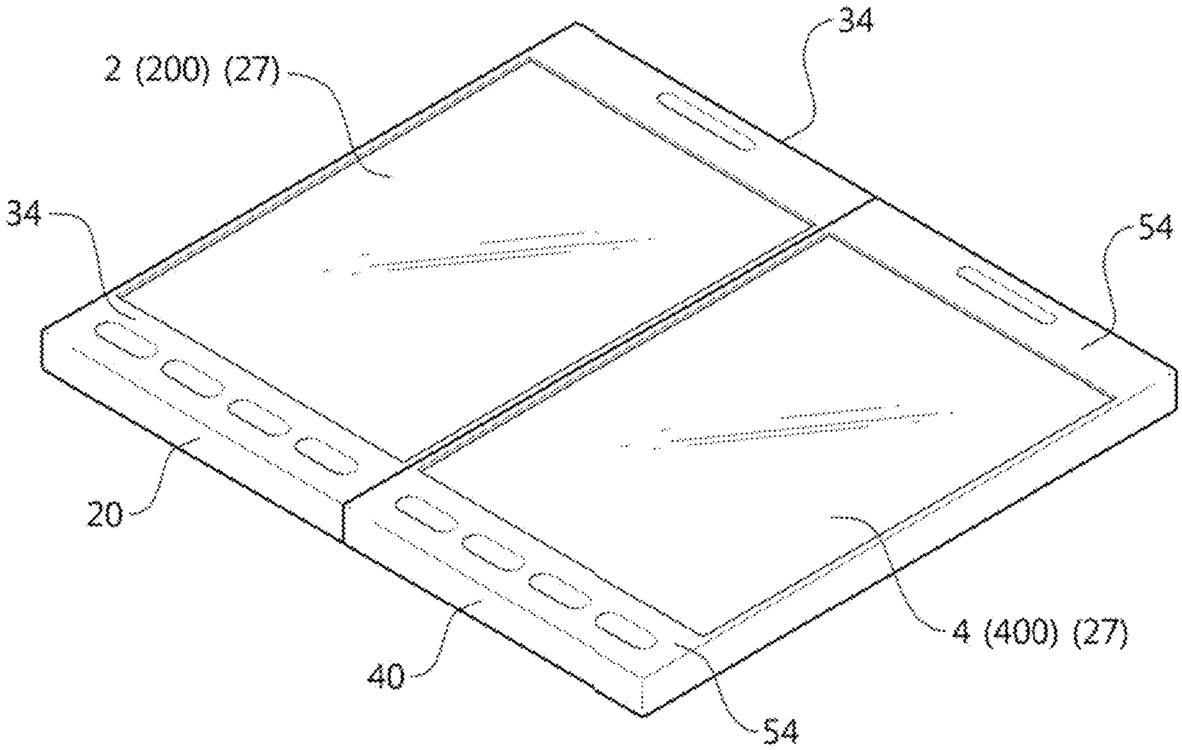

FIGS. 83 to 85 show another embodiment of the display device.

According to the embodiment of FIGS. 83 to 85, cover frames 34 and 54 having a rectangular shape are provided and have thin left and right sides and thick upper and lower sides. Similarly to the embodiment of FIGS. 80 to 82, this display device can be in a folded state (FIG. 83), a horizontally-moved state (FIG. 84), and a display-panel contiguous state (FIG. 85).

In the various above embodiments, the thickness of the frames on the side in which the display panels are contiguous to each other may be smaller than the thickness in the opposite side.

Embodiment 16

FIGS. 86 to 91 are diagrams illustrating an embodiment where display panels are directed to the outside when a display device is folded.

Figure 86:
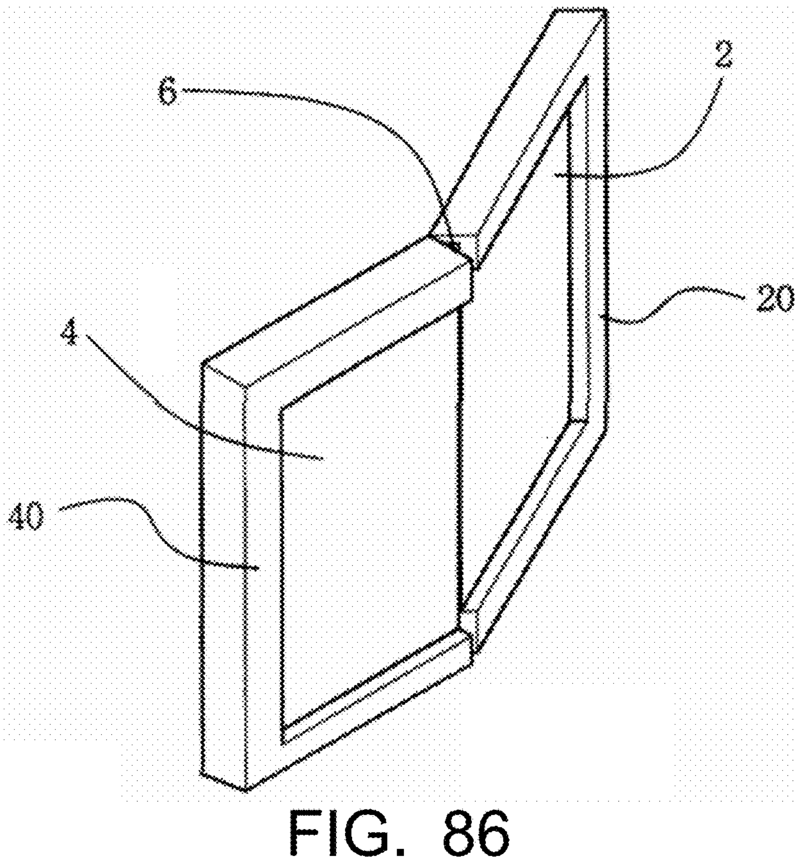
FIGS. 86 to 91 are diagrams illustrating an embodiment of the invention where display panels are located outside when a display device is folded.
Figure 87:
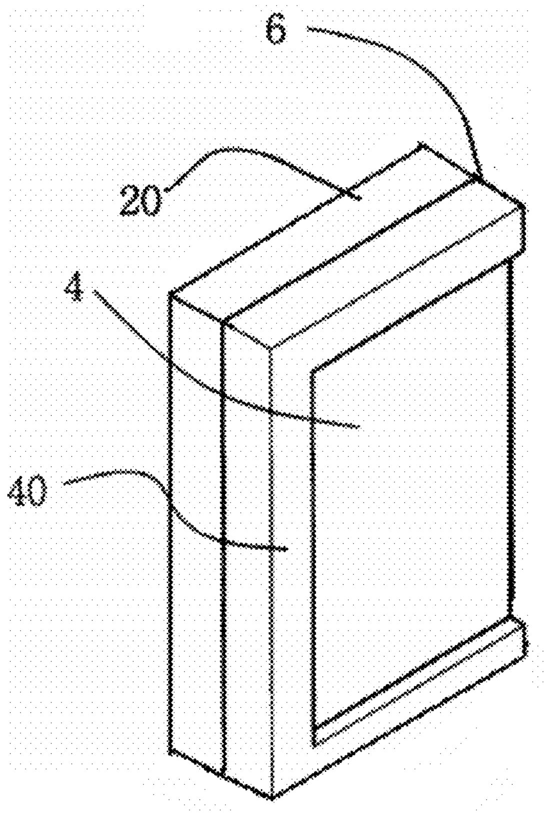

According to the embodiment of FIGS. 86 and 87, the panel housings 20 and 40 having the display panels 2 and 4 mounted thereon are folded so as to direct the surfaces of the display panels to the outside. This display device can be in a partially-folded state (FIG. 86) and a completely-folded state (FIG. 87).

Possible methods of causing the display panels to be contiguous to each other, of mounting the input units or the protection means, and of inputting information through the input units (or sensors) have been described previously.

Figure 88:
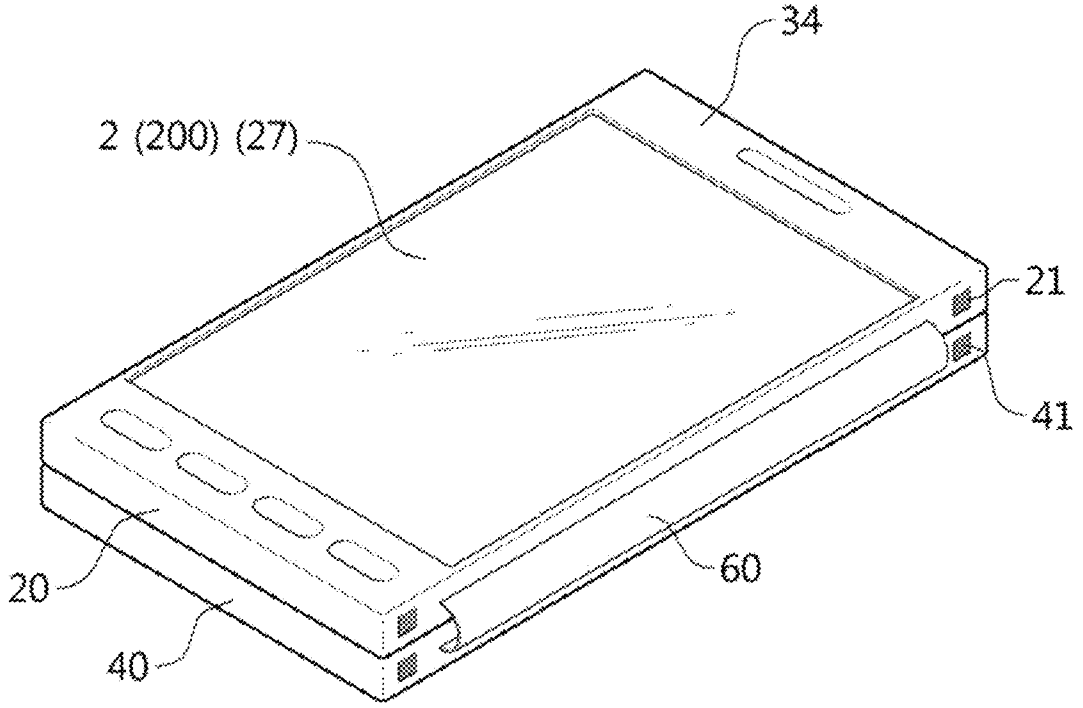
Figure 89:
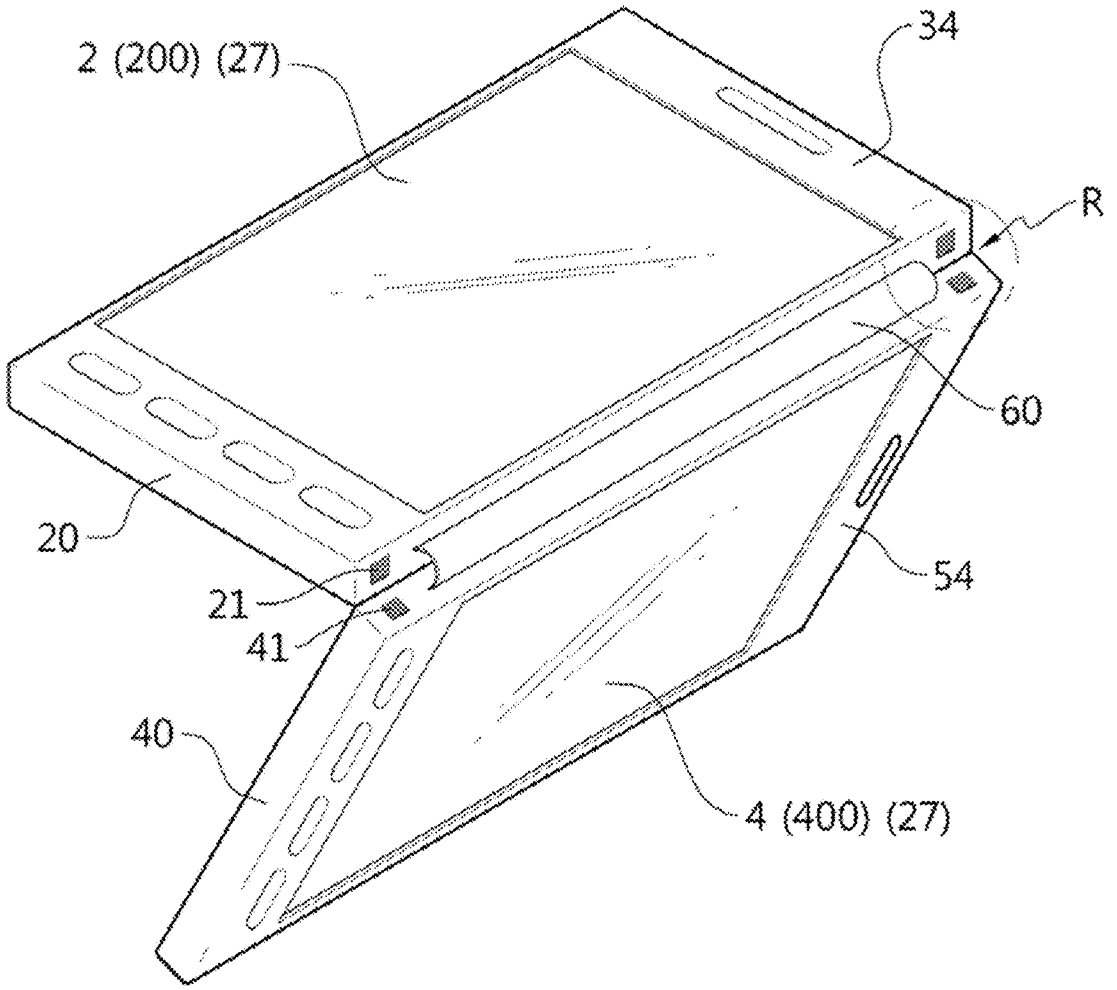

According to the embodiment of FIGS. 88 and 89, cover frames 34 and 54 having a rectangular shape are provided and have thin left and right sides and thick upper and lower sides.

FIG. 88 shows a completely-folded state and FIG. 89 shows a partially-folded state. The thickness of the frame on the joint side may be smaller than that of the frame on the side opposite to the joint.

Figure 90:
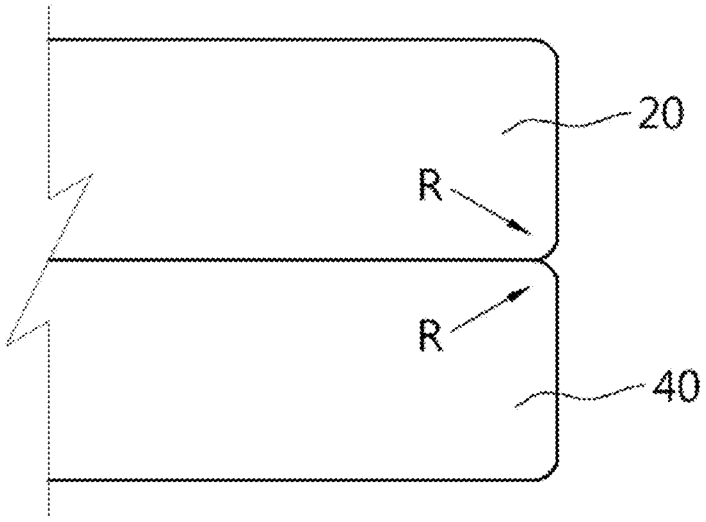

FIG. 90 is a cross-sectional view illustrating a folded state according to an embodiment of the invention. Since the corners come in contact with each other at the time of folding and unfolding, the corners of the panel housings are rounded (R).

Figure 91:
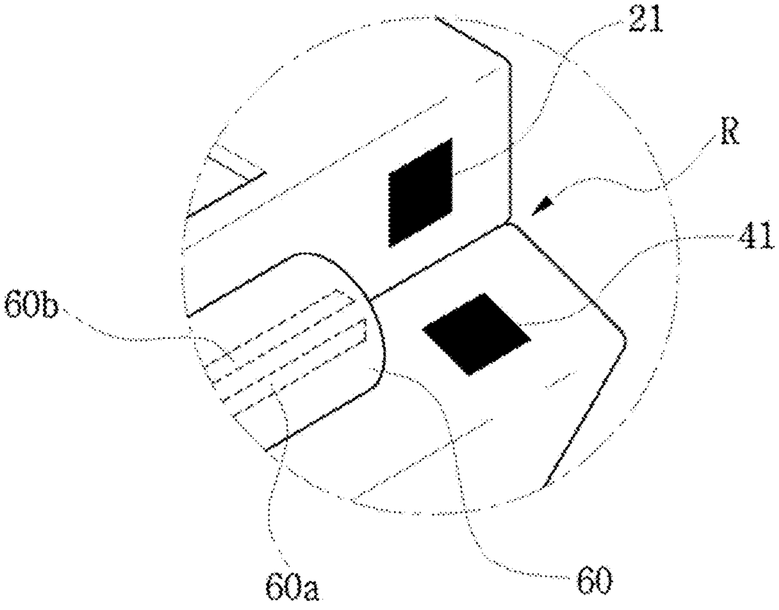

According to the embodiment of FIG. 91, coupling units 21 and 41 may be disposed so as to fix the unfolded panel housings to each other. The coupling units 21 and 41 may include magnets having N and S poles or may include grooves and protrusions.

A connection shaft 60 has a structure surrounding a first shaft 60*a* and a second shaft 60*b* disposed in the panel housings 20 and 40. That is, the folding and unfolding operations are carried out using two shafts.

As already shown in the embodiment of FIGS. 1 and 2, the folding and unfolding operations may be carried out using a single shaft.

Embodiment 17

FIGS. 92 to 95 are diagrams illustrating a method where two panel housings are coupled according to an embodiment of the invention.

Figure 92:
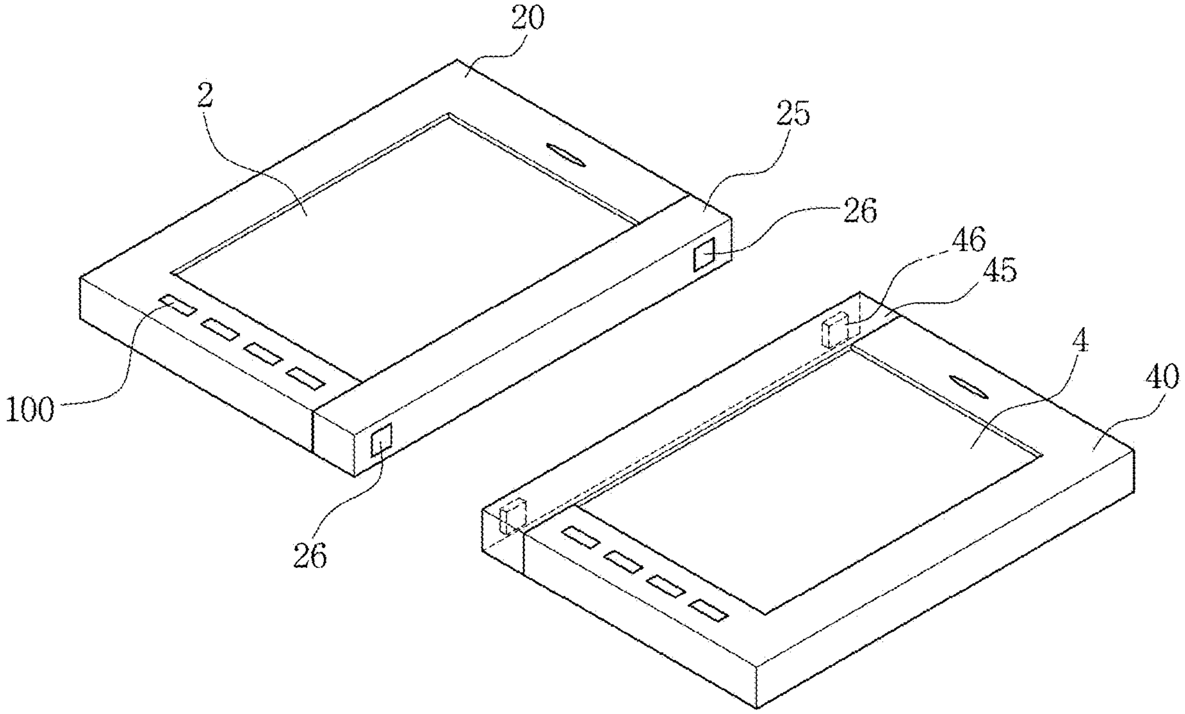
FIGS. 92 to 95 are diagrams illustrating a method of coupling two panel housings according to an embodiment of the invention.
Figure 93:
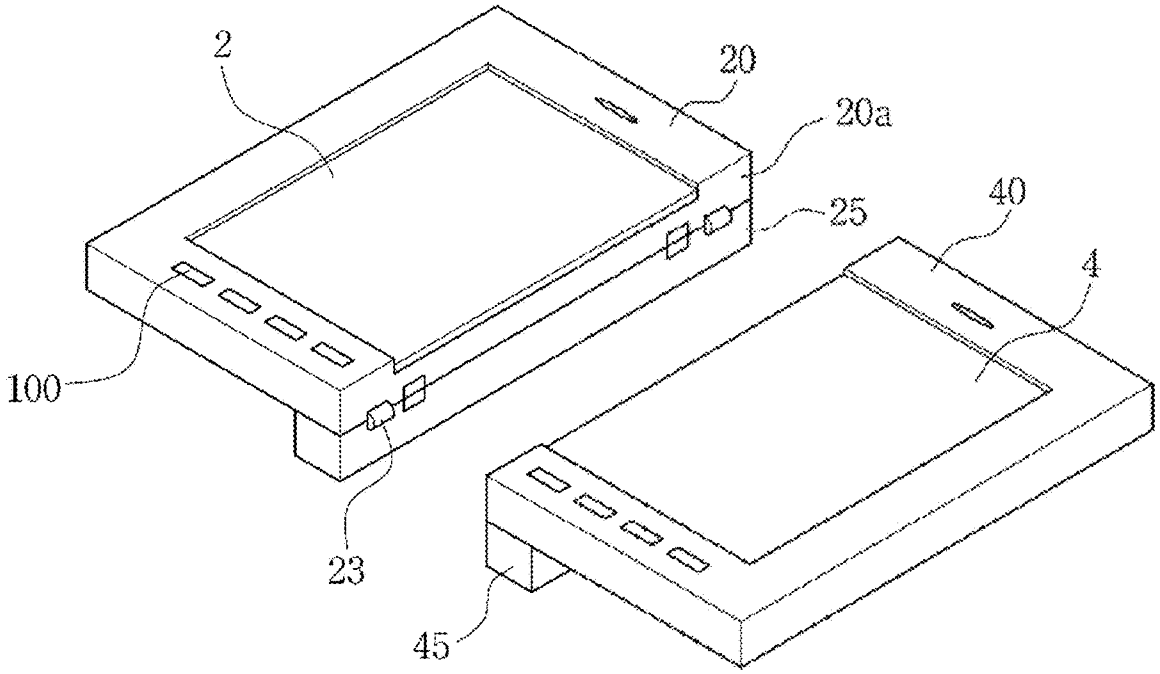
Figure 94:
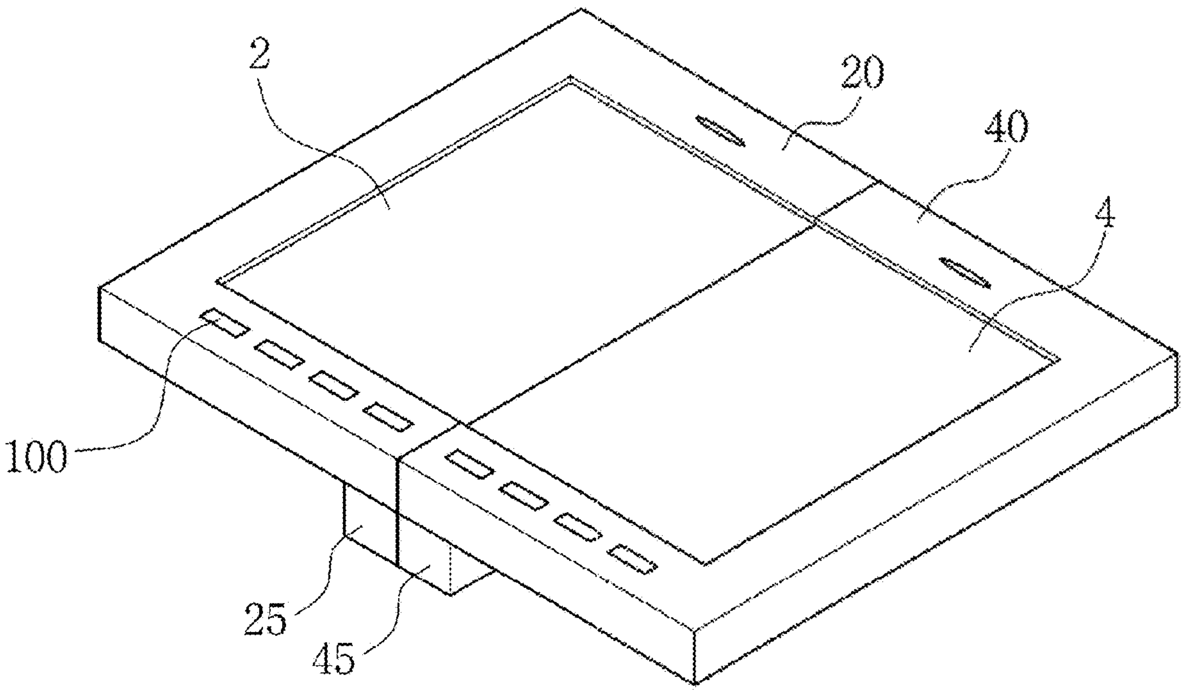

FIG. 92 shows an embodiment where panel housings 20 and 40 having display panels 2 and 4 mounted thereon, and including coupling means 26 and 46 and covers 25 and 45, may be separated from each other. The covers 25 and 45 connected to the panel housings with shafts 23 may then be opened (FIG. 93), and then the panel housings 20 and 40 may be coupled to each other so as to cause the display panels 2 and 4 to be contiguous to each other (FIG. 94).

Figure 95:
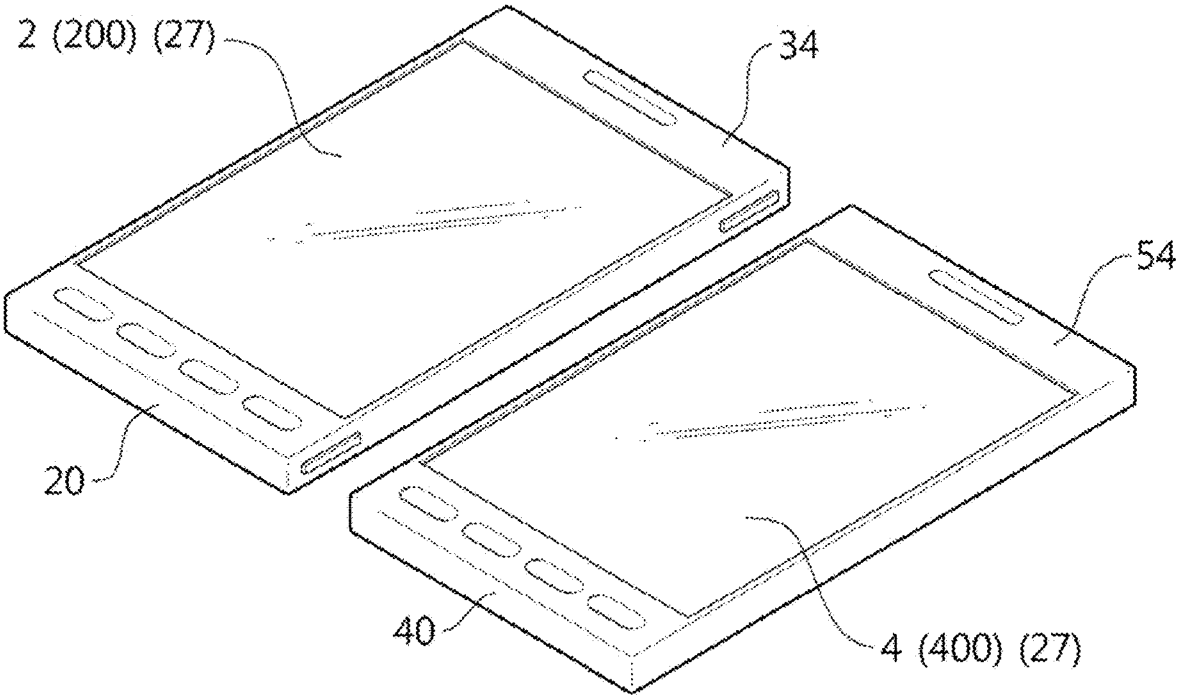

FIG. 95 shows an embodiment where cover frames 34 and 54 having a rectangular shape are provided and have thin left and right sides and thick upper and lower sides. The thickness of the frame on the joint side may be smaller than that of the frame on the side opposite to the joint. The two panel housings 20 and 40 may be coupled to each other with coupling means without using a cover as shown in the embodiment of FIG. 85.

Embodiment 18

FIGS. 96 to 99 are diagrams illustrating embodiments where a third display panel and panel housing are additionally provided.

Figure 96:
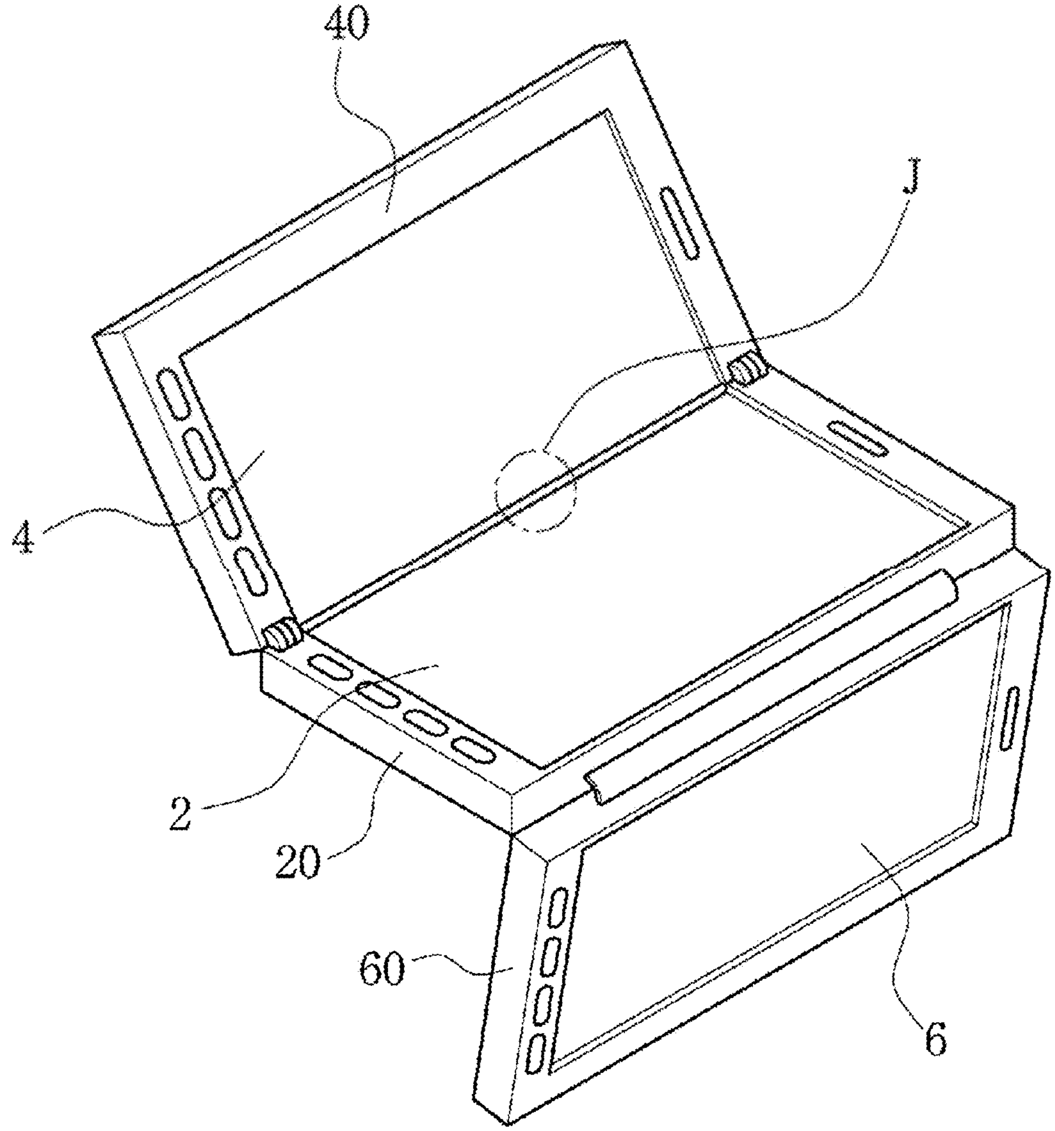
FIGS. 96 to 99 are diagrams illustrating embodiments of the invention where three display panels and three panel housings are provided.
Figure 97:
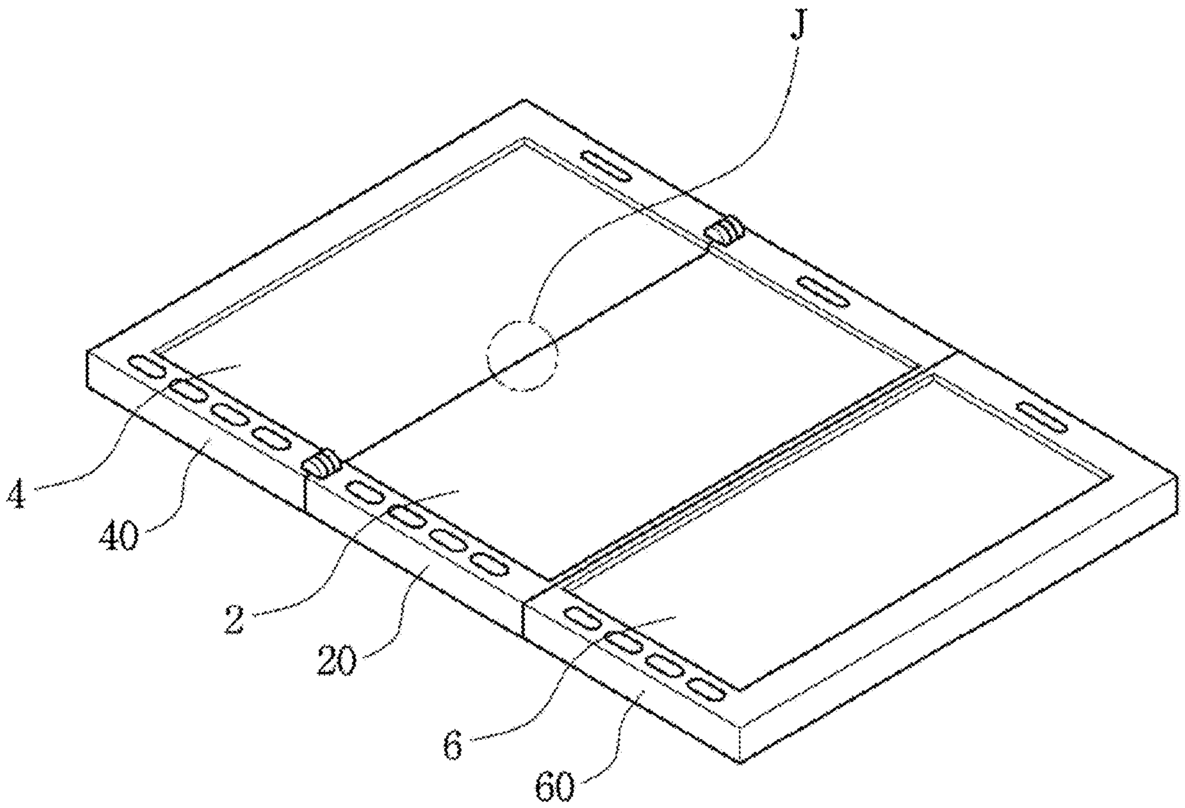

FIGS. 96 and 97 show one embodiment in which three panel housings 20, 40, and 60 having display panels 2, 4, and 6, respectively, can be completely folded and completely unfolded.

According to the embodiment of FIGS. 96 and 97, when the first panel housing 20 and the second panel housing 40 are folded, the display panels 2 and 4 are folded to face the inside. When the second panel housing 40 and the third panel housing 60 are folded, the display panels thereof are folded to face the outside.

That is, a structure in which the display panels are folded to face the inside and a structure in which the display panels are folded to face the outside are alternately arranged. By employing this folding type, four or five or more display panels may be used. Previously disclosed embodiments of joints may be applied to the joint portion represented by J.

For an embodiment comprising three display panels, FIG. 96 shows a partially-folded state, and FIG. 97 shows a state where the display panels are unfolded to be contiguous to each other.

Figure 98:
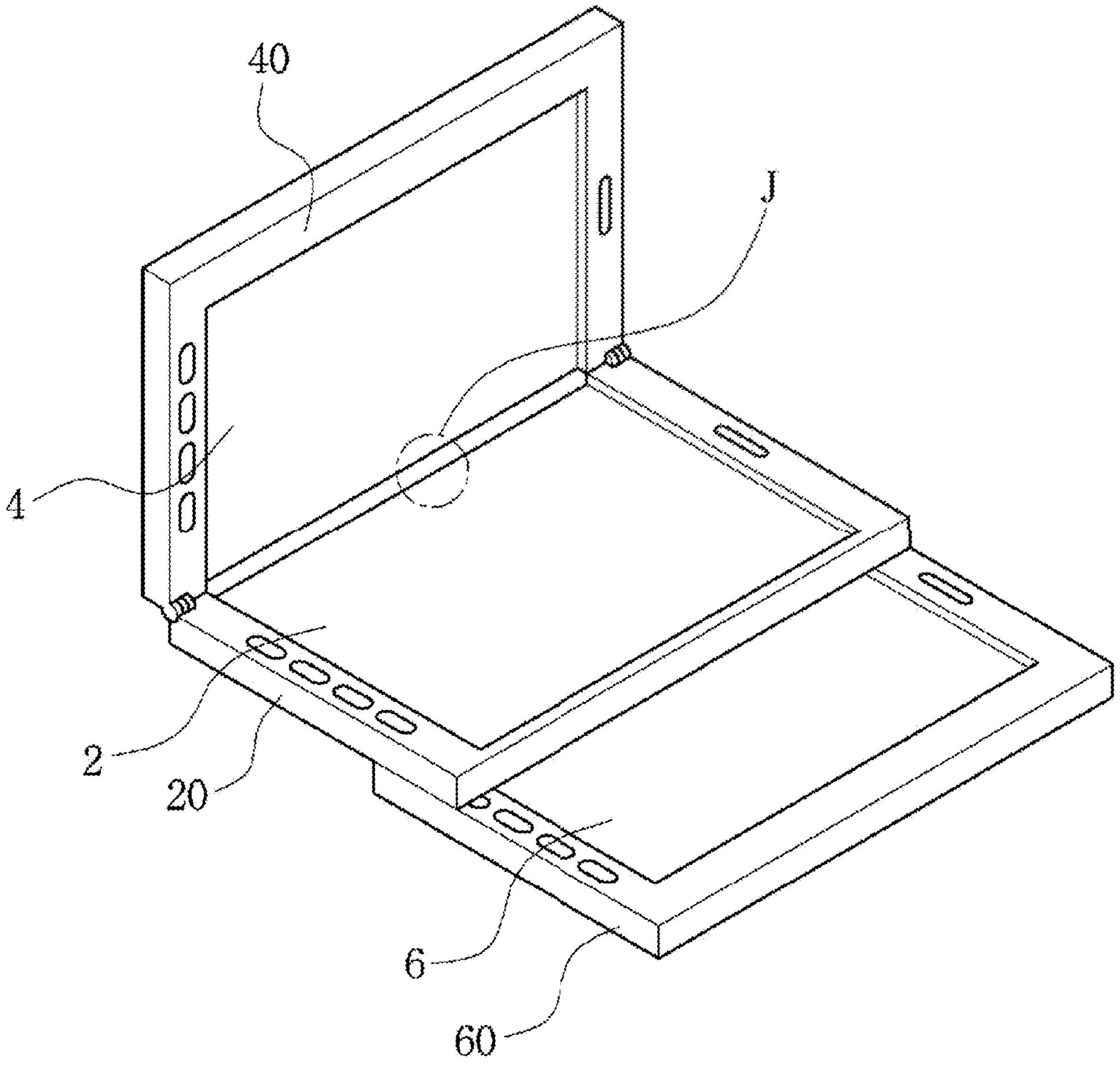
Figure 99:
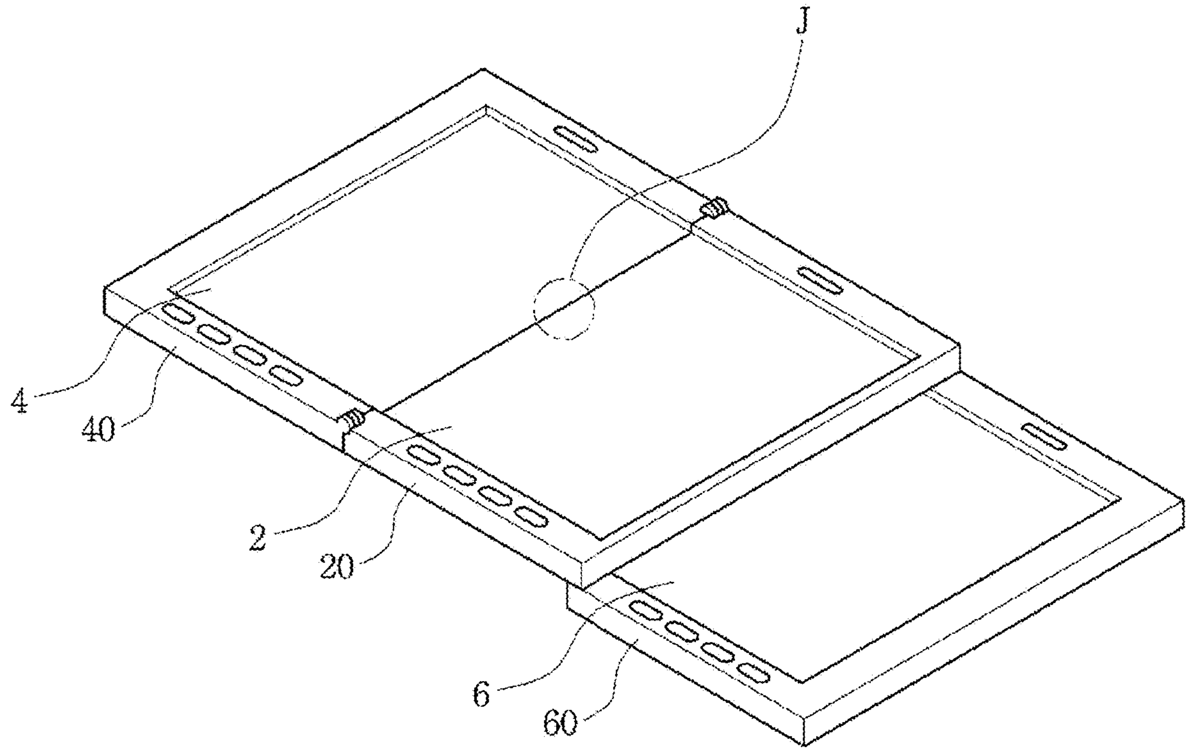

FIGS. 98 and 99 are diagrams illustrating an embodiment where a sliding structure and a folding structure are combined.

According to the embodiment of FIGS. 98 and 99, the first panel housing 20 and the second panel housing 40 are configured to fold and unfold the display panels 2 and 4, and the second panel housing 40 and the third panel housing 60 are configured to slide each other.

FIG. 98 shows a state where the panel housings are partially folded and partially move in a sliding manner. FIG. 99 shows a state where the folded display panels are unfolded to be contiguous to each other and the sliding movement further proceeds. When the second panel housing 40 and the third panel housing 60 are completely unfolded, a state resembling that of FIG. 97 is obtained. Previously disclosed embodiments of joints may be applied to the joint portion represented by J.

According to various embodiments of the invention, when panel housings are unfolded, two display panels can be joined to each other to form a single screen. Structures and designs of display panels and input units thereof are also provided.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A portable display device comprising:

a first case and a second case, which are foldable and unfoldable in a folding portion;

a display provided on the first case, which is OLED type;

an input device provided on the first case, which is adapted to input information; and a frame (side wall) 20*b* is provided in the first case, which is used for mounting the display and the input device, and is provided on three edges of the first case, wherein the frame (side wall) 20*b* is provided on one edge opposite to the folding portion and two edges perpendicular to the folding portion, the input device and the display are integrated, and three edges of the integrated input device and the display are mounted on the frame (side wall) 20*b*, and a mask print is provided on one edge opposite to the folding portion and two edges perpendicular to the folding portion to make the edge of the input device opaque.

2. The portable display device according to claim 1, wherein a connector functioning as a connection or a flexible printed circuit (FPC) functioning as a signal line is provided in the first case, and the display and the input device are connected via the connector or the flexible printed circuit (FPC) on the opposite side of the folding portion.

3. The portable display device according to claim 1, wherein a central processing unit (CPU) is further provided, an image is displayed on the display and the image is selected using a point, and when the selected point moves, the central processing unit (CPU) causes the image selected using the point to also move.

4. The portable display device according to claim 1, wherein a width of at least one side of the mask printing is within 3 mm.

5. The portable display device according to claim 1, wherein a third case is further provided between the first case and the second case, the first case and the third case are foldable and unfoldable with respect to each other, and the second case and the third case are also foldable and unfoldable with respect to each other.

6. A portable display device comprising:

a first case and a second case, which are foldable and unfoldable in a folding portion;

a display provided on the second case, which is OLED type;

an input device provided on the second case, which is adapted to input information; and a frame (side wall) 20*b* is provided in the second case, which is used for mounting the display and the input device, and is provided on three sides of the second case, wherein the frame (side wall) 20*b* is provided on one edge opposite to the folding portion and two edges perpendicular to the folding portion, the input device and the display are integrated, and three edges of the integrated input device and the display are mounted on the frame (side wall) 20*b*, and a mask print is provided on one edge opposite to the folding portion and two edges perpendicular to the folding portion to make the edge of the input device opaque.

7. The portable display device according to claim 6, wherein a connector functioning as a connection or a flexible printed circuit (FPC) functioning as a signal line is provided in the second case, and the display and the input device are connected via the connector or the flexible printed circuit (FPC) on the opposite side of the folding portion.

8. The portable display device according to claim 6, wherein a central processing unit (CPU) is further provided, an image is displayed on the display and the image is selected using a point, and when the selected point moves, the central processing unit (CPU) causes the image selected using the point to also move.

9. The portable display device according to claim 6, wherein a width of at least one side of the mask printing is within 3 mm.

10. The portable display device according to claim 6, wherein a third case is further provided between the first case and the second case, the first case and the third case are foldable and unfoldable with respect to each other, and the second case and the third case are also foldable and unfoldable with respect to each other.

* * * * *